(12) United States Patent
Harding et al.

(10) Patent No.: US 12,474,957 B2
(45) Date of Patent: *Nov. 18, 2025

(54) DISTRIBUTED ACTOR-BASED INFORMATION SYSTEM AND METHOD

(71) Applicant: Grokit Data, Inc., Issaquah, WA (US)

(72) Inventors: James A. Harding, Issaquah, WA (US); Scott Thibault, Colchester, VT (US); Jason A. Boatman, Georgetown, TX (US); Phillip A. Quinn, Seattle, WA (US)

(73) Assignee: GROKIT DATA, INC., Issaquah, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,038

(22) Filed: May 5, 2023

(65) Prior Publication Data

US 2023/0359808 A1    Nov. 9, 2023

Related U.S. Application Data

(60) Provisional application No. 63/338,717, filed on May 5, 2022.

(51) Int. Cl.
  *G06F 40/143* (2020.01)
  *G06F 9/44* (2018.01)
  (Continued)

(52) U.S. Cl.
  CPC .............. *G06F 9/4881* (2013.01); *G06F 9/44* (2013.01); *G06F 9/5044* (2013.01); *G06F 9/505* (2013.01); *G06F 9/5055* (2013.01); *G06F 9/5072* (2013.01); *G06F 40/143* (2020.01); *H04L 63/10* (2013.01)

(58) Field of Classification Search
  CPC ........ G06F 40/143; G06F 9/4881; G06F 9/44; G06F 9/5044; G06F 9/505; G06F 9/5055; G06F 9/5072; H04L 63/10
  See application file for complete search history.

(56) References Cited

U.S. PATENT DOCUMENTS

| 6,845,390 B1 | 1/2005 | Jorgenson et al. |
| 10,311,360 B1 | 6/2019 | Ares |

(Continued)

FOREIGN PATENT DOCUMENTS

| CA | 3216776 A1 | 11/2022 |
| CN | 115373831 A | 11/2022 |

(Continued)

OTHER PUBLICATIONS

Non-Final Office Action is issued in related U.S. Appl. No. 18/313,011, filed Jul. 17, 2023.

(Continued)

*Primary Examiner* — Keith D Bloomquist
(74) *Attorney, Agent, or Firm* — Brian J. Colandreo; Heath M. Sargeant; Holland & Knight LLP

(57) ABSTRACT

A computer-implemented method, executed on a computing device, comprising: enabling a browsing session between a distributed actor and a web-browser; performing a code-driven replication of the browsing session for a third party, thus generating a replicated browsing session; and rendering the replicated browsing session for the third party.

28 Claims, 36 Drawing Sheets

(51) Int. Cl.
    *G06F 9/48*     (2006.01)
    *G06F 9/50*     (2006.01)
    *H04L 9/40*     (2022.01)

(56)               References Cited

U.S. PATENT DOCUMENTS

| | | | |
|---|---|---|---|
| 10,353,720 | B1 | 7/2019 | Wich-Vila |
| 11,272,056 | B2 | 3/2022 | Shwartz et al. |
| 2002/0107914 | A1 | 8/2002 | Charisius et al. |
| 2003/0195853 | A1 | 10/2003 | Mitchell |
| 2005/0124320 | A1 | 6/2005 | Ernst et al. |
| 2006/0061806 | A1 | 3/2006 | King et al. |
| 2007/0118538 | A1* | 5/2007 | Ahern .................. G06F 40/174 |
| 2008/0183585 | A1 | 7/2008 | Vianello |
| 2008/0208907 | A1 | 8/2008 | Tolve et al. |
| 2012/0173966 | A1* | 7/2012 | Powell .................... H04L 67/02 715/234 |
| 2012/0331375 | A1* | 12/2012 | Fanning ................ G06F 16/986 715/234 |
| 2014/0108079 | A1 | 4/2014 | Wright et al. |
| 2014/0122362 | A1 | 5/2014 | Vianello |
| 2014/0164317 | A1 | 6/2014 | Lynch et al. |
| 2014/0214503 | A1 | 7/2014 | Chircorian |
| 2014/0278634 | A1 | 9/2014 | Horvitz et al. |
| 2015/0006214 | A1 | 1/2015 | Lavoie et al. |
| 2016/0085738 | A1 | 3/2016 | Briggs |
| 2017/0063965 | A1 | 3/2017 | Grenader |
| 2017/0064079 | A1 | 3/2017 | Skiba et al. |
| 2017/0111507 | A1 | 4/2017 | Mcgann et al. |
| 2017/0111509 | A1 | 4/2017 | McGann et al. |
| 2017/0264634 | A1 | 9/2017 | Carter et al. |
| 2017/0323026 | A1* | 11/2017 | Le Bras .............. G06F 16/2358 |
| 2018/0046731 | A1* | 2/2018 | Peretz .................. G06F 40/143 |
| 2018/0198917 | A1 | 7/2018 | Ristock et al. |
| 2018/0260481 | A1 | 9/2018 | Rathod |
| 2019/0215424 | A1 | 7/2019 | Adato et al. |
| 2020/0019616 | A1 | 1/2020 | Sukhija et al. |
| 2020/0039071 | A1 | 2/2020 | Sarkar et al. |
| 2020/0050996 | A1 | 2/2020 | Generes, Jr. et al. |
| 2020/0073644 | A1 | 3/2020 | Shankar et al. |
| 2020/0073654 | A1 | 3/2020 | Jeong et al. |
| 2021/0042368 | A1 | 2/2021 | Liu et al. |
| 2021/0092161 | A1 | 3/2021 | Crabtree et al. |
| 2021/0209563 | A1 | 7/2021 | Skiba et al. |
| 2021/0216349 | A1* | 7/2021 | Munro ..................... G06F 3/011 |
| 2021/0279305 | A1 | 9/2021 | Goldston et al. |
| 2022/0004576 | A1 | 1/2022 | Harding et al. |
| 2022/0005087 | A1 | 1/2022 | Harding et al. |
| 2022/0006787 | A1 | 1/2022 | Bursell et al. |
| 2023/0026599 | A1 | 1/2023 | Galtsev |
| 2023/0342202 | A1 | 10/2023 | Radha et al. |

FOREIGN PATENT DOCUMENTS

| | | | |
|---|---|---|---|
| WO | 2023038381 | A1 | 3/2023 |
| WO | 2023/191968 | A1 | 10/2023 |

OTHER PUBLICATIONS

Non-Final Office Action is issued in related U.S. Appl. No. 18/312,988, filed Jul. 25, 2023.
Byrd, R.J., Smith, S.E.& deJong, S.P. (1982, June). An actor-based programming systems. In Proceedings of the SIGOA conference on Office information systems (pp. 67-78). (Year: 1982).
International Search Report and Written Opinion issued in related Application Serial No. PCT/US2023/066702 on Aug. 15, 2023.
International Search Report and Written Opinion issued in related Application Serial No. PCT/US2023/066704 on Jul. 27, 2023.
International Search Report and Written Opinion issued in related Application Serial No. PCT/US2023/066689 on Agust 9, 2023.
International Search Report and Written Opinion issued in related Application Serial No. PCT/US2023/066691 on Sep. 28, 2023.
International Search Report and Written Opinion issued in related Application Serial No. PCT/US2023/066695 on Sep. 21, 2023.
International Search Report and Written Opinion issued in related Application Serial No. PCT/US2023/066698 on Oct. 5, 2023.
Non-Final Office Action issued in related U.S. Appl. No. 18/313,011, filed Oct. 30, 2024.
Final Office Action issued in related U.S. Appl. No. 18/312,988 on issue Date; May 7, 2024.
Non-Final Office Action issued in related U.S. Appl. No. 18/312,988, filed Dec. 11, 2024.
Final Office Action issued in related U.S. Appl. No. 18/312,961, filed Aug. 27, 2024.
A. Campos, P. Pina and R. Neves-Silva, "Supporting Distributed Collaborative Work in Manufacturing Industry," 2006 International Conference on Collaborative Computing: Networking, Applications and Worksharing, Atlanta, GA, USA, 2006, pp. 1-6 (Year: 2006).
C. Hill, R. Yates, C. Jones and S. L. Kogan, "Beyond predictable workflows: Enhancing productivity in artful business processes," in IBM Systems Journal, vol. 45, No. 4, pp. 663-682, 2006 (Year: 2006).
Final Office Action issued in related U.S. Appl. No. 18/312,988, filed Apr. 17, 2025.
Final Office Action issued in related U.S. Appl. No. 18/313,011, filed Mar. 31, 2025.
I. Djordjevic and C. Phillips, "Architecture for secure work of dynamic distributed groups," First IEEE Consumer Communications and Networking Conference, 2004. CCNC 2004., Las Vegas, NV, USA, 2004, pp. 495-500. (Year: 2004).
L. Trappeniers, M. Roelands, M. Godon, J. Criel and P. Dobbelaere, "Towards abundant DiY service creativity," 2009 13th International Conference on Intelligence in Next Generation Networks, Bordeaux, France, 2009, pp. 1-6, doi: 10.1109/ICIN.2009.5357076. (Year: 2009).
Non-Final Office Action issued in related U.S. Appl. No. 18/143,953, filed Apr. 2, 2025.
Non-Final Office Action issued in related U.S. Appl. No. 18/143,994, filed Apr. 15, 2025.
Non-Final Office Action issued in related U.S. Appl. No. 18/144,018, filed Apr. 15, 2025.
Non-Final Office Action issued in related U.S. Appl. No. 18/144,041, filed Mar. 21, 2025.
Non-Final Office Action issued in related U.S. Appl. No. 18/312,892, filed Apr. 2, 2025.
Non-Final Office Action issued in related U.S. Appl. No. 18/312,917, filed May 9, 2025.
Non-Final Office Action issued in related U.S. Appl. No. 18/312,946, filed May 9, 2025.
Non-Final Office Action issued in related U.S. Appl. No. 18/312,961, filed Jun. 3, 2025.
Non-Final Office Action issued in related U.S. Appl. No. 18/313,007, filed Apr. 15, 2025.
Non-Final Office Action issued in related U.S. Appl. No. 18/313,096, filed May 15, 2025.
Non-Final Office Action issued in the related U.S. Appl. No. 18/312,961, filed Dec. 20, 2023.
Final Office Action issued in related U.S. Appl. No. 18/313,011 on issue Date; Jan. 29, 2024.
Extended European Search Report and Search Opinion issued in related Application Serial No. 23800274.5 on Jul. 14, 2025.
Final Office Action issued in related U.S. Appl. No. 18/144,018 on Aug. 18, 2025.
Final Office Action issued in related U.S. Appl. No. 18/144,041 on Jul. 31, 2025.
Non-Final Office Action issued in related U.S. Appl. No. 18/312,988 on Jul. 31, 2025.
Final Office Action issued in related U.S. Appl. No. 18/143,953 on Oct. 3, 2025.
Final Office Action issued in related U.S. Appl. No. 18/312,892 on Oct. 1, 2025.

* cited by examiner

DISTRIBUTED ACTOR-BASED INFORMATION SYSTEM AND METHOD

RELATED APPLICATION(S)

This application claims the benefit of U.S. Provisional Application No. 63/338,717, filed on 5 May 2022, the entire contents of which are incorporated herein by reference.

TECHNICAL FIELD

This disclosure relates to information systems and methods and, more particularly, to information systems and methods that utilize distributed actors to effectuate various functionality.

BACKGROUND

Conventional machine-to-machine communication is generally defined by specific communication protocols across various application, transport, and Internet layers (e.g., Hypertext Transfer Protocol (HTTP), Transmission Control Protocol (TCP), Internet Protocol (IP), etc.). However, for online web resources, communication between machines is generally limited to application programming interfaces (APIs) preprogrammed for particular purposes, and the presentation of webpages on a browser designed for a human user to navigate and perform operations thereon. Unfortunately, APIs are not standardized and are hard-coded for particular purposes, and websites are written to display a browser for human interpretability; not machine interpretability. Accordingly, conventional approaches to processing internet-based resources & data do not allow machines to effectively communicate and gather information is an automated & distributed manner.

SUMMARY OF DISCLOSURE

AATP Code-Driven Replication

A computer-implemented method, executed on a computing device, comprising: enabling a browsing session between a distributed actor and a web-browser; performing a code-driven replication of the browsing session for a third party, thus generating a replicated browsing session; and rendering the replicated browsing session for the third party.

One or more of the following features may be included. The browsing session may be initiated by the distributed actor. The distributed actor may be a human distributed actor. The distributed actor may be a non-human distributed actor. Performing a code-driven replication of the browsing session for a third party may include: copying at least a portion of the code associated with the browsing session to generate at least a portion of the replicated browsing session. The code associated with the browsing session may include at least a portion of the document object model associated with the browsing session. The code associated with the browsing session may include at least a portion of webpage structure associated with the browsing session. The third party may be a human distributed actor. The third party may be a non-human distributed actor. The third party may be enabled to interact with the replicated browsing session, thus defining one or more third party interactions with the replicated browsing session. The one or more third party interactions with the replicated browsing session may be limited. The one or more third party interactions with the replicated browsing session may be provided to the browsing session. The replicated browsing session may be managed by the distributed actor in response to receiving the one or more third party interactions with the replicated browsing session. The browsing session may be an active browsing session.

In another implementation, a computer program product resides on a computer readable medium and has a plurality of instructions stored on it. When executed by a processor, the instructions cause the processor to perform operations including enabling a browsing session between a distributed actor and a web-browser; performing a code-driven replication of the browsing session for a third party, thus generating a replicated browsing session; and rendering the replicated browsing session for the third party.

One or more of the following features may be included. The browsing session may be initiated by the distributed actor. The distributed actor may be a human distributed actor. The distributed actor may be a non-human distributed actor. Performing a code-driven replication of the browsing session for a third party may include: copying at least a portion of the code associated with the browsing session to generate at least a portion of the replicated browsing session. The code associated with the browsing session may include at least a portion of the document object model associated with the browsing session. The code associated with the browsing session may include at least a portion of webpage structure associated with the browsing session. The third party may be a human distributed actor. The third party may be a non-human distributed actor. The third party may be enabled to interact with the replicated browsing session, thus defining one or more third party interactions with the replicated browsing session. The one or more third party interactions with the replicated browsing session may be limited. The one or more third party interactions with the replicated browsing session may be provided to the browsing session. The replicated browsing session may be managed by the distributed actor in response to receiving the one or more third party interactions with the replicated browsing session. The browsing session may be an active browsing session.

In another implementation, a computing system includes a processor and a memory system configured to perform operations including enabling a browsing session between a distributed actor and a web-browser; performing a code-driven replication of the browsing session for a third party, thus generating a replicated browsing session; and rendering the replicated browsing session for the third party.

One or more of the following features may be included. The browsing session may be initiated by the distributed actor. The distributed actor may be a human distributed actor. The distributed actor may be a non-human distributed actor. Performing a code-driven replication of the browsing session for a third party may include: copying at least a portion of the code associated with the browsing session to generate at least a portion of the replicated browsing session. The code associated with the browsing session may include at least a portion of the document object model associated with the browsing session. The code associated with the browsing session may include at least a portion of webpage structure associated with the browsing session. The third party may be a human distributed actor. The third party may be a non-human distributed actor. The third party may be enabled to interact with the replicated browsing session, thus defining one or more third party interactions with the replicated browsing session. The one or more third party interactions with the replicated browsing session may be limited. The one or more third party interactions with the replicated browsing session may be provided to the browsing session. The replicated browsing session may be managed by the distributed actor in response to receiving the one or more third party interactions with the replicated browsing session. The browsing session may be an active browsing session.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
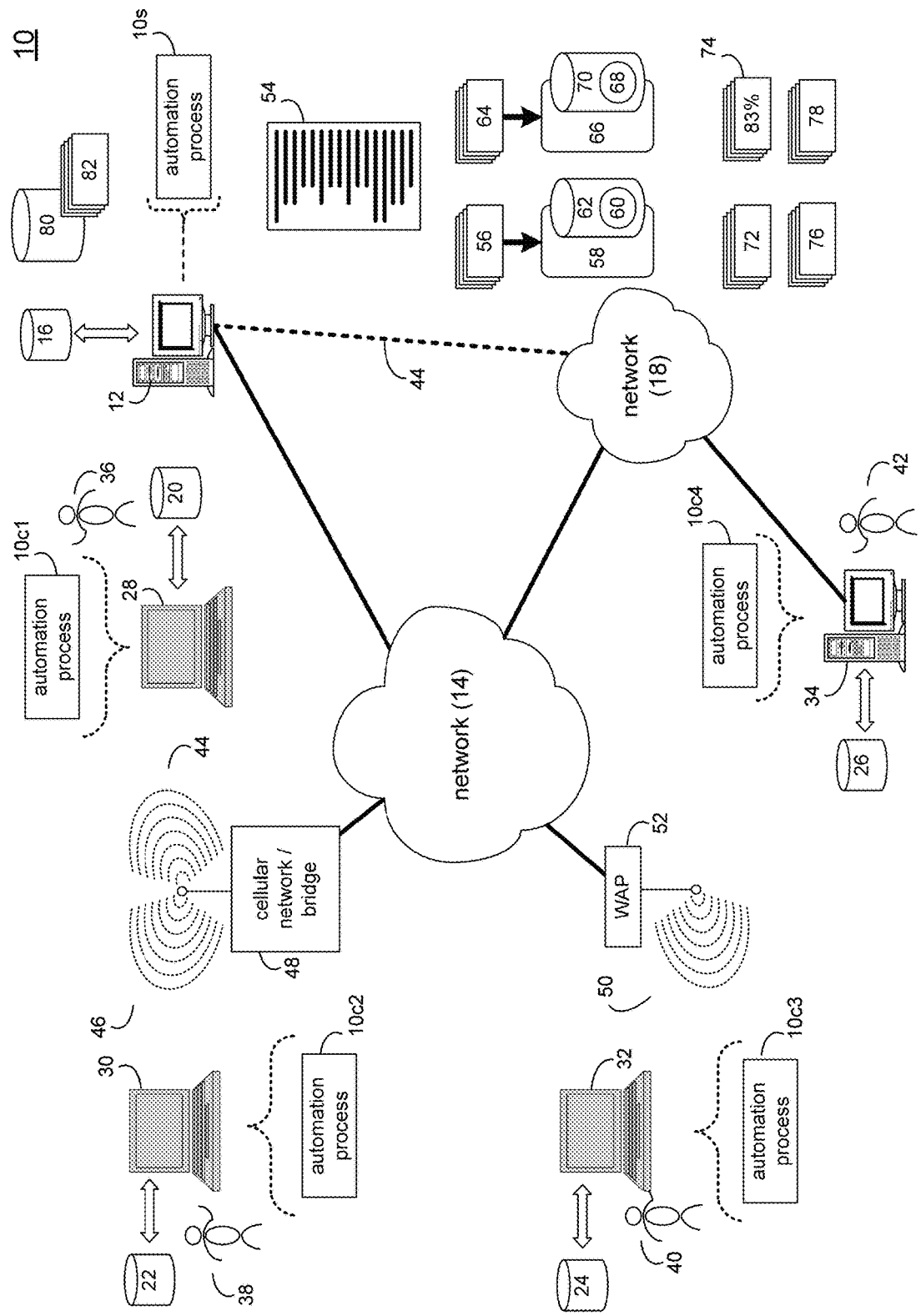
FIG. 1 is a diagrammatic view of a distributed computing network including a computing device that executes an information process according to an embodiment of the present disclosure.

Referring to FIG. 1, there is shown information process 10. Information process 10 may be implemented as a server-side process, a client-side process, or a hybrid server-side/client-side process. For example, information process 10 may be implemented as a purely server-side process via information process 10s. Alternatively, information process 10 may be implemented as a purely client-side process via one or more of information process 10c1, information process 10c2, information process 10c3, and information process 10c4. Alternatively still, information process 10 may be implemented as a hybrid server-side/client-side process via information process 10s in combination with one or more of information process 10c1, information process 10c2, information process 10c3, and information process 10c4. Accordingly, information process 10 as used in this disclosure may include any combination of information process 10s, information process 10c1, information process 10c2, information process 10c3, and information process 10c4.

Information process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a cloud-based computing platform.

The instruction sets and subroutines of information process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of information processes 10c1, 10c2, 10c3, 10c4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of information processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; RAID devices; random access memories (RAM); read-only memories (ROM), and all forms of flash memory storage devices.

Examples of client electronic devices 28, 30, 32, 34 may include, but are not limited to, a smartphone (not shown), a personal digital assistant (not shown), a tablet computer (not shown), laptop computers 28, 30, 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, iOS™, Linux™, or a custom operating system.

Users 36, 38, 40, 42 may access information process 10 directly through network 14 or through secondary network 18. Further, information process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, laptop computer 28 and laptop computer 30 are shown wirelessly coupled to network 14 via wireless communication channels 44, 46 (respectively) established between laptop computers 28, 30 (respectively) and cellular network/bridge 48, which is shown directly coupled to network 14. Further, laptop computer 32 is shown wirelessly coupled to network 14 via wireless communication channel 50 established between laptop computer 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between laptop computer 32 and WAP 52. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

Information Process Overview

As will be discussed below in greater detail, information process 10 may be configured to allow for the automated processing of websites (generally) and ecommerce websites (specifically) so that these websites may effectuate the functionality of a database with respect to the products/services that are available for purchase through these websites. By enabling such functionality, complex tasks may be automatically effectuated at a holistic level, thus allowing automated searching to occur across multiple websites so that the purchases effectuated across these multiple websites may cumulatively satisfy the complex task.

Figure 2:
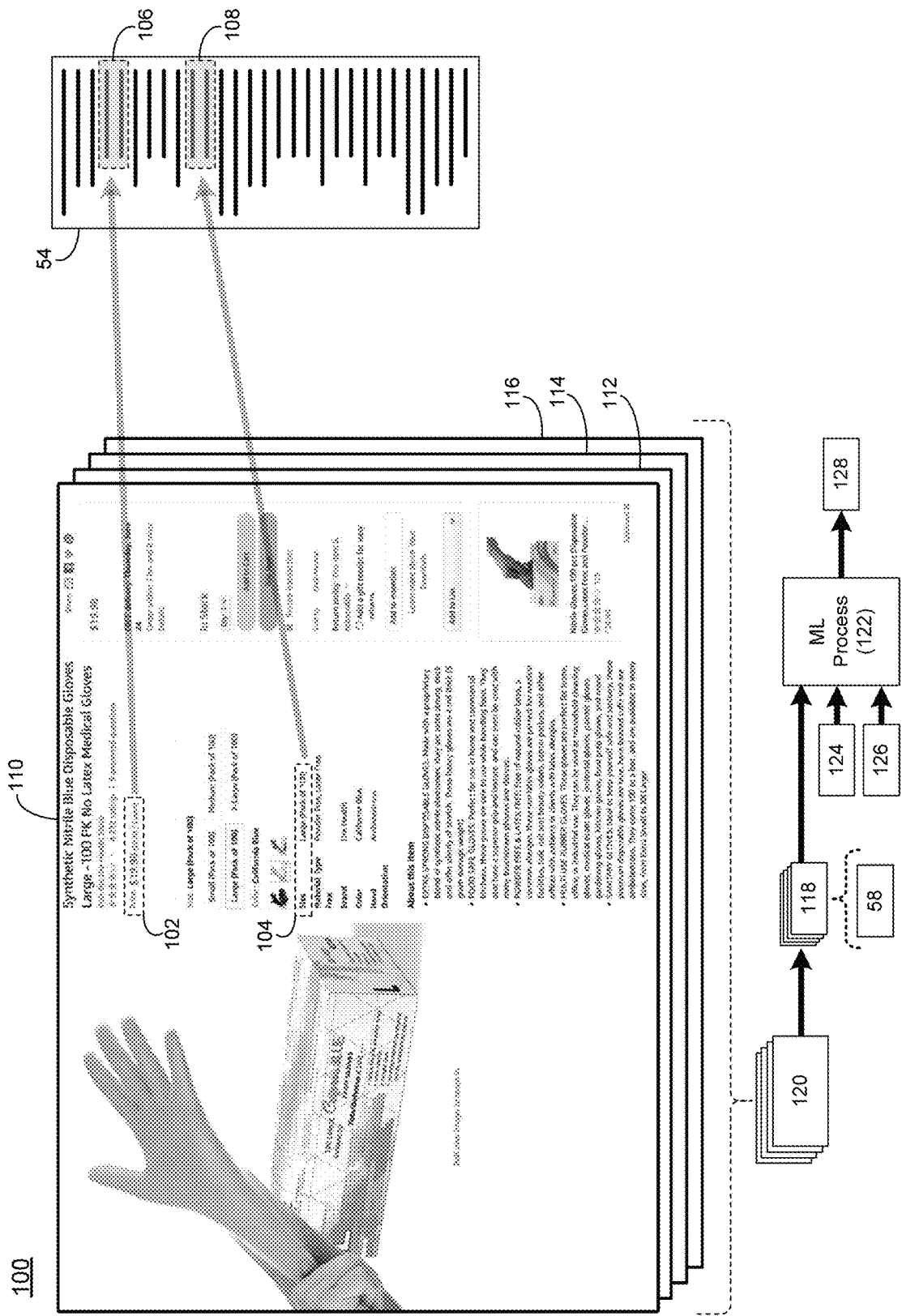
FIG. 2 is a diagrammatic view of a website for processing by the information process of FIG. 1 according to an embodiment of the present disclosure.
Figure 3:
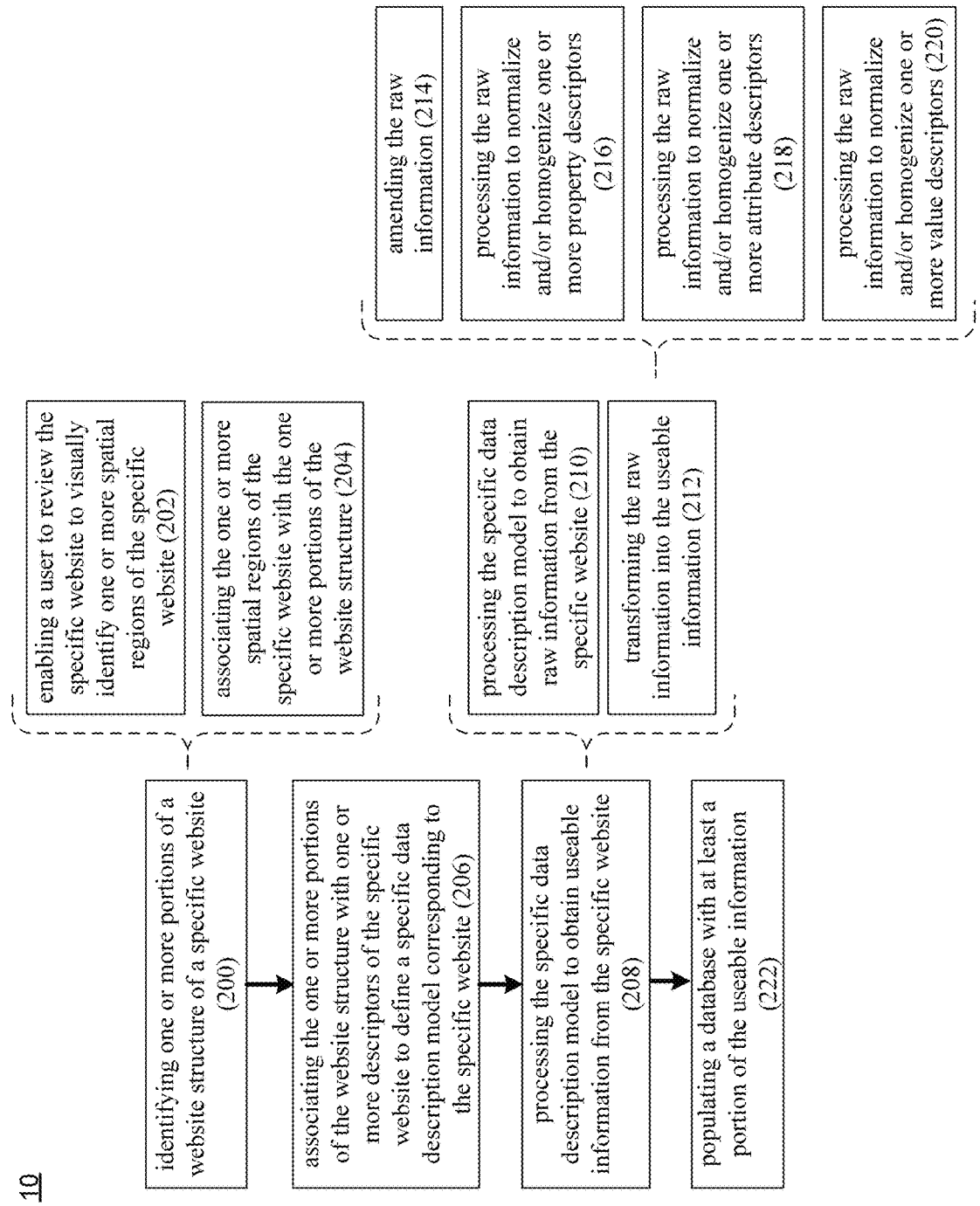
FIG. 3 is a flowchart of the information process of FIG. 1 according to an embodiment of the present disclosure.

DataFi (General):

Referring also to FIGS. 2-3 and in order to enable such automated processing of websites, information process 10 may enable a user (e.g., user 36) to review various websites (e.g., website 100), examples of which may include but are not limited to ecommerce websites that enable users to purchase various products/services.

For example, information process 10 may identify 200 one or more portions of a website structure (e.g., website structure 54) of a specific website (e.g., website 100). Examples of such a website structure (e.g., website structure 54) may include one or more of: a HTML website structure; a javascript website structure; and a CSS website structure.

HTML Website Structure: The HyperText Markup Language (i.e., HTML) is the standard markup language for documents designed to be displayed in a web browser. It may be assisted by technologies such as Cascading Style Sheets (CSS) and scripting languages. Web browsers may receive HTML documents from a web server or from local storage and render the documents into multimedia web pages. HTML may describe the structure of a web page semantically and originally included cues for the appearance of the document. HTML elements may be the building blocks of HTML pages. With HTML constructs, images and other objects such as interactive forms may be embedded into the rendered page. HTML may provide a means to create structured documents by denoting structural semantics for text such as headings, paragraphs, lists, links, quotes and other items. HTML elements may be delineated by tags, written using angle brackets. Tags such as <img /> and <input /> directly introduce content into the page. Other tags such as <p> may surround and provide information about document text and may include other tags as sub-elements. Browsers do not display the HTML tags, but use them to interpret the content of the page.

Javascript Website Structure: JavaScript (JS) is a programming language that conforms to the ECMAScript specification. JavaScript is high-level, often just-in-time compiled, and multi-paradigm. It may have curly-bracket syntax, dynamic typing, prototype-based object-orientation, and first-class functions. Alongside HTML and CSS, JavaScript is one of the core technologies of the World Wide Web. Over 97% of websites use it client-side for web page behavior, often incorporating third-party libraries. All major web browsers have a dedicated JavaScript engine to execute the code on the user's device. As a multi-paradigm language, JavaScript may support event-driven, functional, and imperative programming styles. It may have application programming interfaces (APIs) for working with text, dates, regular expressions, standard data structures, and the Document Object Model (DOM).

CSS Website Structure: Cascading Style Sheets (CSS) is a style sheet language used for describing the presentation of a document written in a markup language such as HTML. CSS is a cornerstone technology of the World Wide Web, alongside HTML and JavaScript. CSS is designed to enable the separation of presentation and content, including layout, colors, and fonts. This separation can improve content accessibility, provide more flexibility and control in the specification of presentation characteristics, enable multiple web pages to share formatting by specifying the relevant CSS in a separate .css file which reduces complexity and repetition in the structural content as well as enabling the .css file to be cached to improve the page load speed between the pages that share the file and its formatting. Separation of formatting and content may make it feasible to present the same markup page in different styles for different rendering methods, such as on-screen, in print, by voice (via speech-based browser or screen reader), and on Braille-based tactile devices. CSS may also have rules for alternate formatting if the content is accessed on a mobile device.

When identifying 200 one or more portions of a website structure (e.g., website structure 54) of a specific website (e.g., website 100), information process 10 may: enable 202 a user (e.g., user 36) to review the specific website (e.g., website 100) to visually identify one or more spatial regions of the specific website (e.g., website 100); and associate 204 the one or more spatial regions of the specific website (e.g., website 100) with the one or more portions of the website structure (e.g., website structure 54). For example, information process 10 may enable 202 user 36 to review website 100 to visually identify spatial regions 102, 104 of website 100 (via selection with a mouse, not shown) and associate 204 spatial regions 102, 104 of website 100 with structure portions 106, 108 (respectively) of website structure 54. Specifically, when user 36 visually identifies a spatial region (e.g., one of spatial regions 102, 104) of website 100, information process 10 may automatically associate 204 the identified spatial region (e.g., one of spatial regions 102, 104) with the corresponding portion (e.g., one of structure portions 106, 108 respectively) of the website structure (e.g., website structure 54) of the specific website (e.g., website 100).

Information process 10 may associate 206 the one or more portions (e.g., structure portions 106, 108) of the website structure (e.g., website structure 54) with one or more descriptors (e.g., descriptors 56) of the specific website (e.g., website 100) to define a specific data description model (e.g., specific data description model 58) corresponding to the specific website (e.g., website 100).

The one or more descriptors (e.g., descriptors 56) may include one or more:

Property Descriptors: A property descriptor may identify the field/area/region name of highly pertinent portion of a website, wherein these fields/areas/regions are common on a particular type of website. Accordingly, if website 100 is an ecommerce website, examples of such property descriptors may include but are not limited to: a title field/area/region; a picture field/area/region; a description field/area/region; and a price field/area/region. A property descriptor may be user-defined and/or automatically defined for a particular domain. For example, a domain may generally describe a type of website. Examples of domains may include but are not limited to: ecommerce websites; news websites; social media websites; and information websites. The property descriptor may be domain-specific such that each domain may include one or more property descriptors that represent highly pertinent portions of the website for that domain. The property descriptors for each domain may be defined in a domain ontology.

Attribute Descriptors: An attribute descriptor may identify the field/area/region name of supplemental portion of a website, wherein these fields/areas/regions supplement the above-described property descriptors. Accordingly, if website 100 is an ecommerce website, examples of such attribute descriptors may include but are not limited to: a size field/area/region; a color field/area/region; a material field/area/region; and a brand field/area/region.

Value Descriptors: A value descriptor may identify a value for one of the above-described property descriptors and/or attribute descriptors. For example and with respect to website 100, the value descriptor for the "size" attribute descriptor may be "Large"; the value descriptor for the "color" attribute descriptor may be "California Blue"; the value descriptor for the "price" property descriptor may be "$19.98"; and the value descriptor for the "title" property descriptor may be "Synthetic Nitrile Blue Disposable Gloves".

Information process 10 may provide a user interface or overlay on a web browser as user 36 interacts with website 100. For example, the user interface may be an extension of a web browser, built-into a web browser, and/or may be executed separately from a web browser that provides the ability to access websites. When identifying 200 one or more portions of website structure 54 of website 100, the domain associated with website 100 may be determined. For example, a user 36 may provide (e.g., using the user interface) an indication or selection of the domain for website 100. In another example, the domain may be automatically defined by information process 10 e.g., when loading website 100. In this example, suppose website 100 is an ecommerce website. Accordingly, website 100 may be associated with the ecommerce domain and automated process 10 may provide (e.g., within the user interface) a list of one or more property descriptors specific to the ecommerce domain for the user to visually identify within website 100.

Associating 206 the structure portions 106, 108 of website structure 54 with descriptors 56 of website 100 to define a specific data description model may include defining, using the user interface, descriptors for structure portion corresponding to the identified spatial regions. For example, information process 10 may provide, using the user interface, user 36 with the ability to define or select a descriptor type (e.g., a property descriptor, an attribute descriptor, or a value descriptor) for each structure portion corresponding to the identified spatial region(s). For example, information process 10 may associate 206 structure portion 106 of website structure 54 with a price property descriptor and may associate 206 structure portion 108 of website structure 54 with a size attribute descriptor. In this manner, information process 10 may define or generate the specific data description model for website 100 by associating or mapping particular specific structure portions of the website structure with one or more descriptors of the data description model corresponding to website 100.

Associating 206 the structure portions 106, 108 of website structure 54 with descriptors 56 of website 100 to define a specific data description model may include defining, within the data description model, how to navigate between particular portions of the specific website (e.g., webpages of the specific website). For example and when defining specific data description model 58 corresponding to website 100, information process 10 may define a "home" webpage to initialize processing of website 100. Suppose the home webpage of website 100 includes a list of webpages organized into a plurality of categories (i.e., on a category page). In this example, suppose the category page includes one or more links or other references to particular webpages based upon the category of each webpage. Information process 10 may enable 202 a user to visually select the one or more spatial regions of the category page including the one or more links. Information process 10 may associate 204 the selected spatial regions with the one or more corresponding portions of the webpage structure for the category page with the one or more links. Information process 10 may associate 206 particular structure portions of the category page with one or more descriptors for the one or more links of the category webpage. The processing of a category page as described above may be repeated recursively for a plurality of category pages with links to each webpage of a website. Accordingly, defining the specific data description model with one or more category webpages may allow a computing device to navigate and process each webpage of website 100.

When identifying 200 the one or more portions of the website structure of a specific website, the one or more portions (e.g., structure portions 106, 108) of website structure (e.g., website structure 54) may be generated or exposed in response to a user's interactions with the website (e.g., website 100). For example and as is known in the art, some websites may include portions of website structure or code that are generated dynamically as a user interacts with the website. Accordingly, information process 10 may enable 202 a user (e.g., user 36) to interact with a website (e.g., website 100) to visually identify spatial regions of website 100 and associate 204 the spatial regions with the portions of webpage structure generated or exposed in response to user 36's interaction with website 100. Accordingly, information process 10 may associate 206 the generated or exposed structure portions of the website structure with one or more descriptors of website 100 to define a specific data description model. As will be discussed in greater detail below, information process 10 may define a function description model based upon, at least in part, the user's interactions with the website that result in the dynamic generation of website structure.

The specific data description model (e.g., specific data description model 58) corresponding to the specific website (e.g., website 100) may be configured to allow for the above-described automated accessing of (in this example) website 100. For example and as discussed above, since specific data description model 58 locates the various data-related portions (e.g., structure portions 106, 108) within the website structure (e.g., website structure 54) of the specific website (e.g., website 100), the specific website (e.g., website 100) may be accessed and utilized in an automated fashion (since specific data description model 58 eliminates the need for a human being to visually-navigate website 100).

Once the user (e.g., user 36) and information process 10 processes (in this example) webpage 110 of website 100, the user (e.g., user 36) and information process 10 may process (in this example) additional webpages (e.g., webpages 112, 114, 116) of website 100 to obtain additional data for inclusion within (and further refinement of) data description model 58. For example, information process 10 may enable 202 user 36 to review additional webpages (e.g., webpages 112, 114, 116) of website 100 to visually identify one or more spatial regions of these webpages (e.g., webpages 112, 114, 116) and associate 204 these spatial regions with one or more portions of the website structure (e.g., website structure 54) to obtain additional data for inclusion within (and further refinement of) the specific data description model (e.g., specific data description model 58) corresponding to the specific website (e.g., website 100).

When enabling 202 a user to review additional webpages, information process 10 may provide, via the user interface, one or more suggestions for particular spatial regions of the additional webpages to identify as descriptors within the specific data description model. For example, suppose user 36 is reviewing webpage 112. In this example, as user 36 hovers a mouse (not shown) adjacent to the same spatial region (e.g., spatial region 102) that was associated with e.g., a price property descriptor for webpage 110, the user interface may display a hint or suggestion to associate 204 the same spatial region of webpage 112 with the structure portion of webpage 112 and to associate 206 the structure portion with the e.g., price property descriptor. Similarly, as user 36 hovers a mouse (not shown) adjacent to the same spatial region (e.g., spatial region 104) that was associated with e.g., a size attribute descriptor for webpage 110, the user interface may display a hint or suggestion to associate 204 the same spatial region of webpage 112 with the structure portion of webpage 112 and to associate 206 the structure portion with the e.g., size attribute descriptor. In this manner, information process 10 may provide automated suggestions for defining specific data description model 58 based upon, at least in part, a user's interactions with the webpages of website 100.

Once a sufficient quantity of webpages (e.g., webpages 110, 112, 114, 116) of website 100 are processed (e.g., ten or more), information process 10 may process 208 the specific data description model (e.g., specific data description model 58) to obtain useable information from the specific website (e.g., website 100). For example and when processing 208 the specific data description model (e.g., specific data description model 58) to obtain useable information from the specific website (e.g., website 100), information process 10 may process 210 the specific data description model (e.g., specific data description model 58) to obtain raw information from the specific website (e.g., website 100); and transform 212 the raw information into the useable information.

As discussed above, information process 10 may associate 206 the one or more portions (e.g., structure portions 106, 108) of the website structure (e.g., website structure 54) with one or more descriptors (e.g., descriptors 56) of the specific website (e.g., website 100) to define a specific data description model (e.g., specific data description model 58) corresponding to the specific website (e.g., website 100), wherein these descriptors (e.g., descriptors 56) may include property descriptors, attribute descriptors and value descriptors. As could be imagined, it is foreseeable that different webpages within a website may use different descriptors (e.g., descriptors 56). For example, some webpages within website 100 may use Small/Medium/Large, while other webpages within website 100 may use S/M/L. Further, some webpages within website 100 may use "Quantity", while other webpages within website 100 may use "Count". Additionally, some webpages within website 100 may use "Material", while other webpages within website 100 may use "Construction". Further still, some webpages within website 100 may use "Manufacturer", while other webpages within website 100 may use "Brand".

In order to properly utilize such data (e.g., descriptors 56), information process 10 may process this data to transform 212 it from raw information (e.g., descriptors 56 in their original disjointed form) into useable information 60 (as will be described below). When transforming 212 the raw information (e.g., descriptors 56) into useable information 60, information process 10 may: amend 214 the raw information (e.g., descriptors 56); process 216 the raw information (e.g., descriptors 56) to normalize and/or homogenize one or more property descriptors; process 218 the raw information (e.g., descriptors 56) to normalize and/or homogenize one or more attribute descriptors; and/or process 220 the raw information (e.g., descriptors 56) to normalize and/or homogenize one or more value descriptors.

Amend the Raw Information: Since it is foreseeable that different webpages within a website (e.g., website 100) may use data that is formatted differently, information process 10 may amend such raw information (e.g., descriptors 56). For example, some webpages within website 100 may use data that has e.g., filler spaces inserted before a value, while other webpages within website 100 may not use such filler spaces. Accordingly, information process 10 may amend this raw information (e.g., descriptors 56) so that e.g., all information defined within data description model 58 does not use filler spaces, thus generating useable information 60.

Normalize/Homogenize the Property Descriptors: Since it is foreseeable that different webpages within a website (e.g., website 100) may use different property descriptors, information process 10 may normalize/homogenize such property descriptors. For example, some webpages within website 100 may use the term "description" while other webpages within website 100 may use the term "details". Accordingly, information process 10 may normalize/homogenize this raw information (e.g., descriptors 56) such that e.g., all webpages defined within data description model 58 use the term "description", thus generating useable information 60.

Normalize/Homogenize the Attribute Descriptors: Since it is foreseeable that different webpages within a website (e.g., website 100) may use different attribute descriptors, information process 10 may normalize/homogenize such attribute descriptors. For example, some webpages within website 100 may use the term "Quantity" while other webpages within website 100 may use the term "Count". Accordingly, information process 10 may normalize/homogenize this raw information (e.g., descriptors 56) such that e.g., all webpages defined within data description model 58 use the term "Quantity", thus generating useable information 60.

Normalize/Homogenize the Value Descriptors: Since it is foreseeable that different webpages within a website (e.g., website 100) may use different value descriptors, information process 10 may normalize/homogenize such value descriptors. For example, some webpages within website 100 may use the terms "Small/Medium/Large" while other webpages within website 100 may use the term "S/M/L". Accordingly, information process 10 may normalize/homogenize this raw information (e.g., descriptors 56) such that e.g., all webpages defined within data description model 58 use the term "Small/Medium/Large", thus generating useable information 60.

Once the raw information (e.g., the above-described property/attribute/value descriptors 56 in their original disjointed form) within data description model 58 are transformed 212 into useable information (i.e., useable information 60), information process 10 may populate 222 a database (e.g., database 62) with at least a portion of this useable information (i.e., useable information 60), wherein database 62 may be included within and/or associated with data description model 58. Useable information 60 stored within database 60 may (generally speaking) function as a roadmap that allows for automated navigation of (in this example) website 100.

Continuing with the above-stated example, information process 10 may utilize data description model 58 and useable information 60 to process additional webpages within website 100. As could be imagined, a website (especially an ecommerce website) may include hundreds of thousands of webpages that correspond to the hundreds of thousands of products they sell. Accordingly, information process 10 may allow a user to manually identify 200 one or more portions of a website structure (e.g., website structure 54) of a specific website (e.g., website 100) to define specific data description model 58 (albeit it in a rudimentary form). Information process 10 may then use specific data description model 58 to automatically process (in the fashion described above) the remaining webpages within website 100 to further refine specific data description model 58.

As discussed above and with specific data description model 58 defined for website 100, information process 10 may process 208 specific data description model 58 to obtain useable information from website 100 and populate 222 a database (e.g., database 62) with at least a portion of this useable information (i.e., useable information 60). In an example where website 100 is an ecommerce website, website 100 may include hundreds of thousands of webpages to correspond to the hundreds of thousands of products they sell. As such, information process 10 may populate 222 database 62 with useable information pertaining to the products from the hundreds of thousands of webpages by defining and executing specific data description model 58 on the webpages of website 100. In this manner, information process 10 may allow for the generation or population of one or more databases representative of the useable information of the various webpages of a website. Accordingly, information process 10 may automatically obtain useable information from a website and organize that information into a separate database utilizing the data description model without human intervention.

Information process 10 may repeat the above described process for various other websites by defining data description models for respective websites, processing those data description models on the respective websites, and populating one or more databases with at least a portion of useable information from the respective websites. When processing each data description model, information process 10 may populate the same database for each website, separate databases for each website, and/or certain databases for particular websites. For example, information process 10 may populate one or more domain-specific databases based upon, at least in part, the domain of each data description model. However, it will be appreciated that information from any combination of websites may be used to populate any combination of databases within the scope of the present disclosure. In this manner, information process 10 may process data description models for multiple websites to generate an aggregated database of information from each respective website.

Figure 4:
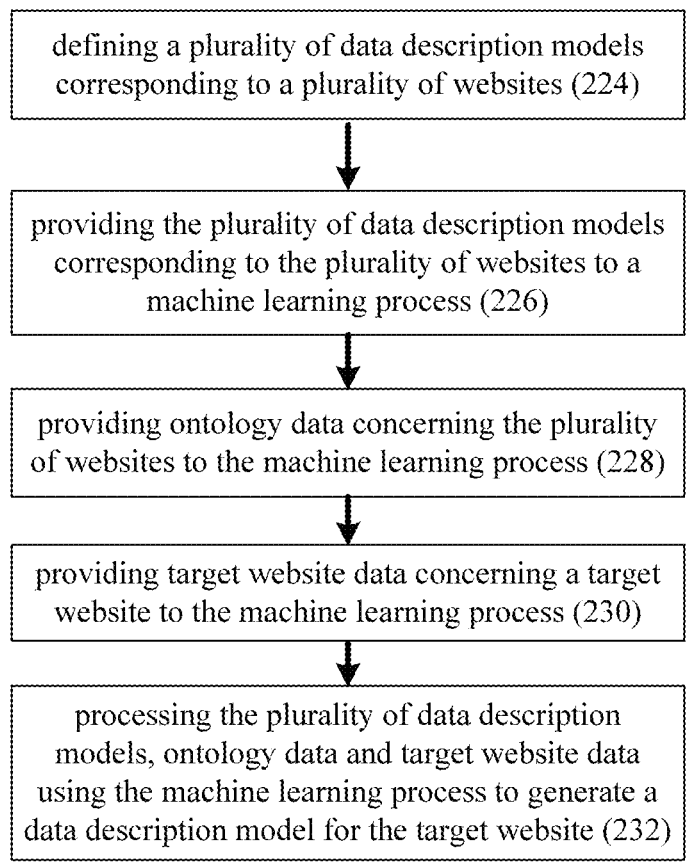
FIG. 4 is another flowchart of the information process of FIG. 1 according to an embodiment of the present disclosure.

DataFi (Data Models Generating Data Models):

Referring also to FIG. 4 and once specific data description model 58 is completely defined (e.g., all of the webpages of website 100 have been processed), information process 10 may define 224 a plurality of data description models (e.g., plurality of data description models 118) corresponding to a plurality of websites (e.g., plurality of websites 120), the plurality of data description models (e.g., plurality of data description models 118) including: the specific data description model (e.g., specific data description model 58) corresponding to the specific website (e.g., specific website 100), and one or more additional data description models corresponding to one or more additional websites.

Information process 10 may provide 226 the plurality of data description models (e.g., plurality of data description models 118) corresponding to the plurality of websites (e.g., plurality of websites 120) to a machine learning (ML) process (e.g., machine learning process 122).

As is known in the art, machine learning (ML) is the study of computer algorithms that improve automatically through experience and by the use of data. It is seen as a part of artificial intelligence. Machine learning algorithms may build a model based on sample data (known as "training data") in order to make predictions or decisions without being explicitly programmed to do so. Machine learning algorithms may be used in a wide variety of applications, such as in medicine, email filtering, speech recognition, and computer vision, wherein it may be difficult or unfeasible to develop conventional algorithms to perform the needed tasks. Machine learning may involve computers discovering how they can perform tasks without being explicitly programmed to do so. It may involve computers learning from data provided so that they carry out certain tasks.

As discussed above, data description models locate the various data-related portions within a website structure of a website, thus eliminating the need for a human being to visually-navigate a website. Accordingly, machine learning process 122 may define data description models that represent a website in a machine-interpretable format. In this manner, computing devices may use the data description model defined for a website to navigate that website without human intervention. In this manner, machine learning process 122 may use the plurality of data description models (e.g., plurality of data description models 118) corresponding to the plurality of websites (e.g., plurality of websites 120) as training data to "learn" how to navigate other websites.

Additionally, information process 10 may provide 228 ontology data (e.g., ontology data 124) concerning the plurality of websites (e.g., plurality of websites 120) to the machine learning process (e.g., machine learning process 122).

As discussed above, being different webpages within a website use different descriptors (e.g., descriptors 56), in order to properly utilize such data (e.g., descriptors 56), information process 10 processes this data to transform it from raw information (e.g., descriptors 56 in their original disjointed form) into useable information 60 (in a normalized/homogenized form). As could be imagined, it is foreseeable that different websites may use different descriptors (e.g., descriptors 56) within their webpages. For example, a first website (www.abc.com) may define a woman's dress size as Small/Medium/Large/Extra Large, while another website (www.xyz.com) may define a woman's dress size as 0-6/8-10/12-14/16-18. Therefore and in order to properly utilize such data (e.g., descriptors 56) across multiple websites (e.g., www.abc.com & www.xyz.com), information process 10 may process this data to transform it from its original disjointed form into useable (e.g., normalized/homogenized) information (e.g., ontology data 124). Accordingly and when generating ontology data 124, information process 10 may process the useable information included within each of the plurality of data description models (e.g., plurality of data description models 118) to amend/normalize/homogenize this useable information across the plurality of websites (e.g., plurality of websites 120).

In a similar fashion, this ontology data (e.g., ontology data 124) may function as a roadmap that allows for automated navigation of (in this example) the plurality of websites (e.g., plurality of websites 120). Accordingly, machine learning process 122 may use ontology data 124 as training data to "learn" how to navigate these websites (e.g., plurality of websites 120).

Further, information process 10 may provide 230 target website data (e.g., target website data 126) concerning a target website (e.g., www.targetwebsite.com) to the machine learning process (e.g., machine learning process 122). Accordingly and using plurality of data description models 118 and ontology data 124 as training data, information process 10 may allow a user (e.g., user 36) to provide 230 target website data (e.g., target website data 126) that identifies a target website (e.g., www.targetwebsite.com) for automated processing by information process 10.

Accordingly, information process 10 may process 232 the plurality of data description models (e.g., plurality of data description models 118), ontology data (e.g., ontology data 124) and target website data (e.g., target website data 126) using the machine learning process (e.g., machine learning process 122) to generate a data description model (e.g., target data description model 128) for the target website (e.g., www.targetwebsite.com). For example, information process 10 may automatically process webpages within www.targetwebsite.com to generate target data description model 128 (in the manner described above).

When processing 232 plurality of data description models 118, ontology data 124, and target website data 126 to generate target data description model 128, machine learning process 122 may identify spatial regions and structure portions of the target website that correspond to the one or more descriptors from plurality of data description models 118. For instance, machine learning process 122 may identify spatial regions and structure portions of the target website that correspond to one or more property descriptors and/or one or more attribute descriptors of plurality of data description models 118. Accordingly, machine learning process 122 may associate 406 one or more structure portions of the website structure of the target website with one or more descriptors to define target data description model 128 based upon, at least in part, plurality of data description models 118, ontology data 124, and target website data 126.

Once generated, target data description model 128 may be included within plurality of data description models 118 and ontology data 124 may be updated to homogenize the descriptors used within target data description model 128; thus enabling plurality of data description models 118 and ontology data 124 to be utilized by information process 10 to automatically process additional target websites.

As discussed above, information process 10 may process 208 the specific data description model (e.g., target data description model 128) to obtain useable information from the target website. For example, when processing 208 the specific data description model (e.g., target data description model 128) to obtain useable information from the specific website (e.g., website 100), information process 10 may process 210 the specific data description model (e.g., target data description model 128) to obtain raw information from the target website; and transform 212 the raw information into the useable information.

As discussed above and once the raw information within target data description model 128 is transformed 212 into useable information, information process 10 may populate 222 a database (e.g., database 62 or a separate database) with at least a portion of this useable information, where this may be included within and/or associated with data description model 128. Accordingly, useable information 60 may be aggregated with information from other websites stored within a database (i.e., the same database for each website, separate databases for each website, and/or certain databases for particular websites) using the data description models automatically generated by information process 10 for those websites.

ParaLogue (General):

While the above-discussion concerned information process 10 processing websites to define data description models (i.e., models concerning data within webpages/websites), information process 10 may also effectuate similar processes to define function description models (i.e., models concerning functions within webpages/websites; as will be discussed below in greater).

Figure 5:
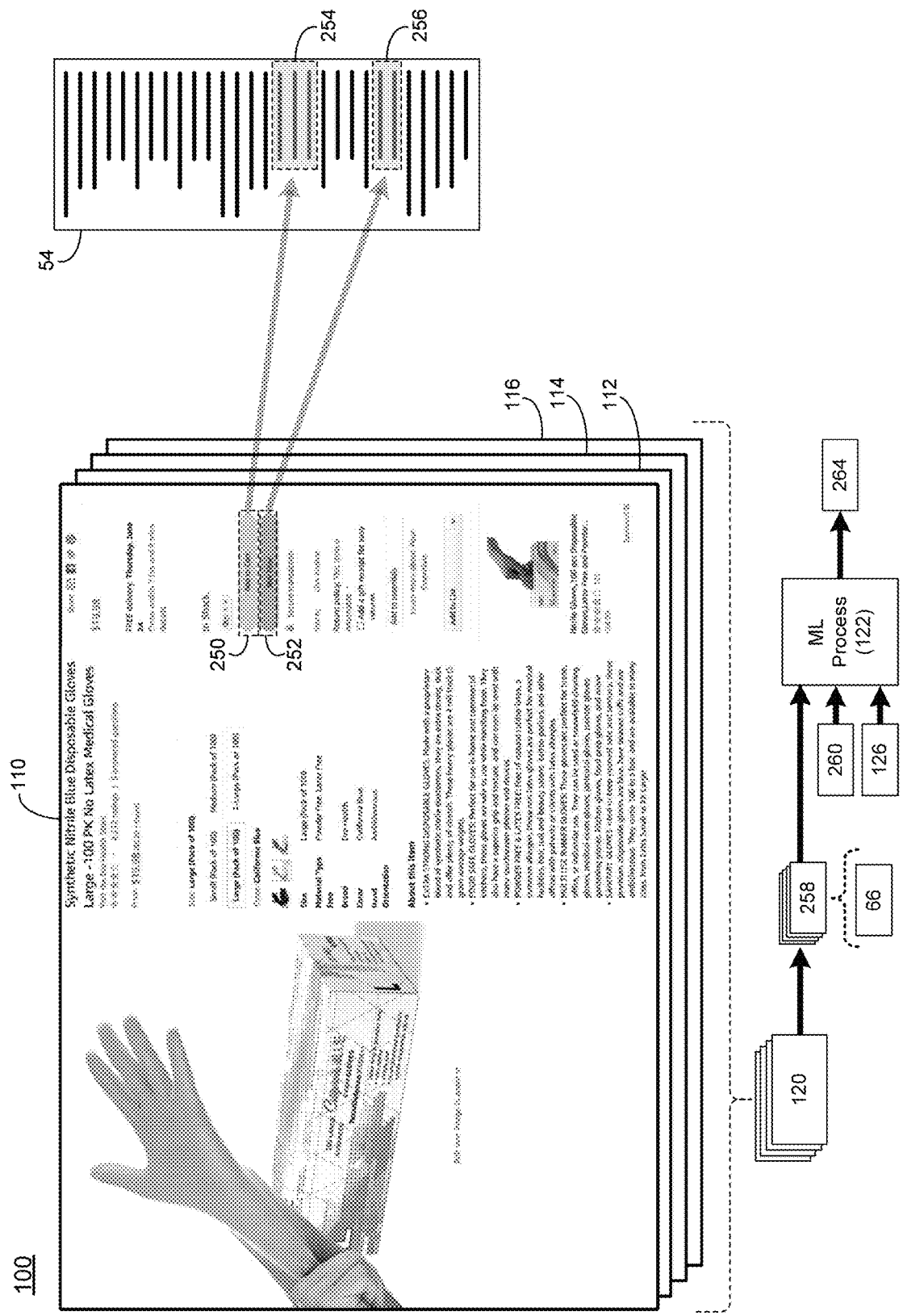
FIG. 5 is another diagrammatic view of a website for processing by the information process of FIG. 1 according to an embodiment of the present disclosure.
Figure 6:
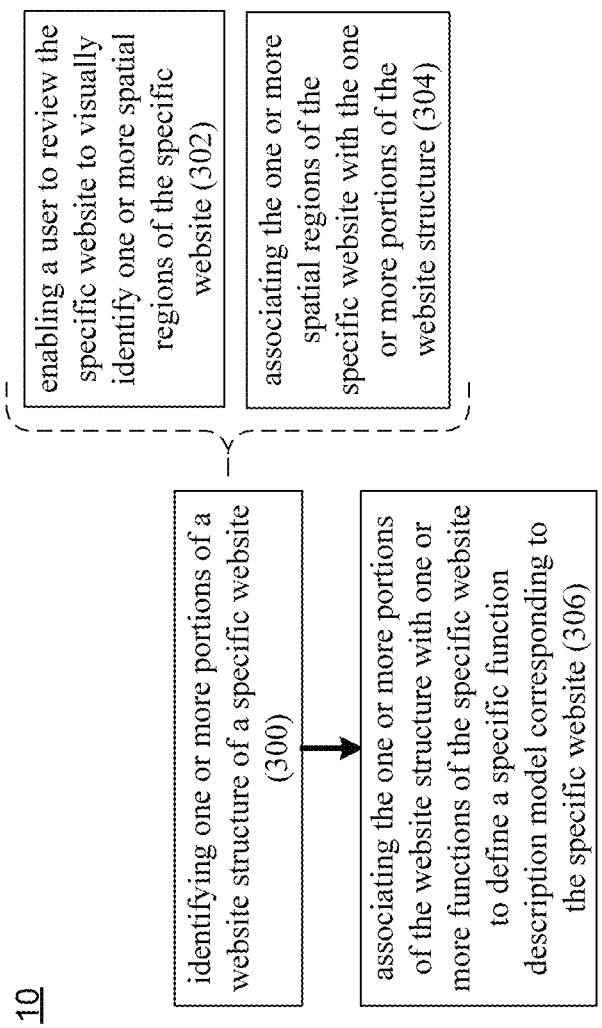
FIG. 6 is another flowchart of the information process of FIG. 1 according to an embodiment of the present disclosure.

As discussed above, information process 10 may enable a user (e.g., user 36) to review various websites (e.g., website 100). Referring also to FIGS. 5-6, information process 10 may identify 300 one or more portions of a website structure (e.g., website structure 54) of a specific website (e.g., website 100). As discussed above, examples of such a website structure (e.g., website structure 54) may include one or more of: a HTML website structure; a javascript website structure; and a CSS website structure.

When identifying 300 one or more portions of a website structure (e.g., website structure 54) of a specific website (e.g., website 100), information process 10 may: enable 302 a user (e.g., user 36) to review the specific website (e.g., website 100) to visually identify one or more spatial regions of the specific website (e.g., website 100); and associate 304 the one or more spatial regions of the specific website (e.g., website 100) with the one or more portions of the website structure (e.g., website structure 54). For example, information process 10 may enable 302 user 36 to review website 100 to visually identify spatial regions 250, 252 of website 100 (via selection with a mouse, not shown) and associate 304 spatial regions 250, 252 of website 100 with structure portions 254, 256 (respectively) of website structure 54. Specifically, when user 36 visually identifies a spatial region (e.g., one of spatial regions 250, 252) of website 100, information process 10 may automatically associate 304 the identified spatial region (e.g., one of spatial regions 250, 252) with the corresponding portion (e.g., one of structure portions 254, 256 respectively) of the website structure (e.g., website structure 54) of the specific website (e.g., website 100).

Information process 10 may associate 306 the one or more portions (e.g., structure portions 254, 256) of the website structure (e.g., website structure 54) with one or more functions (e.g., functions 64) of the specific website (e.g., website 100) to define a specific function description model (e.g., specific function description model 66) corresponding to the specific website (e.g., website 100).

Information process 10 may provide a user interface or overlay on a web browser as user 36 interacts with website 100. For example, the user interface may be an extension of a web browser, built-into a web browser, and/or may be executed separately from a web browser that provides the ability to access websites. When identifying 300 one or more portions of website structure 54 of website 100, the domain associated with website 100 may be determined. For example, a user 36 may provide (e.g., using the user interface) an indication or selection of the domain for website 100. In another example, the domain may be automatically defined by information process 10 when loading website 100. In this example, suppose website 100 is an ecommerce website. Accordingly, website 100 may be associated with the ecommerce domain and automated process 10 may provide (e.g., within the user interface) a list of one or more functions (e.g., functions 64) specific to the ecommerce domain for the user to visually identify within website 100.

In addition to enabling a user to review the specific website (e.g., website 100) to visually identify one or more spatial regions of the specific website (e.g., website 100), information process 10 may receive one or more user interaction recordings or logs of one or more user interactions with the website. For example, information process 10 may receive and process various clickstreams or other activity information indicating how the one or more users interact with the website (e.g., website 100). Information process 10 may associate 306 the one or more portions (e.g., structure portions 254, 256) of the website structure (e.g., website structure 54) as defined in the one or more user interaction recordings with one or more functions (e.g., functions 64) of the specific website (e.g., website 100) to define a specific function description model (e.g., specific function description model 66) corresponding to the specific website (e.g., website 100). For example and as discussed above, information process 10 may provide a list of one or more functions (e.g., functions 64) for the user to associate with the one or more portions (e.g., structure portions 254, 256) of the website structure (e.g., website structure 54) as defined in the one or more user interaction recordings.

The one or more functions (e.g., function 64) may include functionalities that are effectuated via (in this example) website 100. Examples of such functionality may include but are not limited to:

Add to Cart Functionality: This functionality may add an item defined on the current webpage (e.g., webpage 110) to the shopping cart of this user (e.g., user 36), thus allowing the user (e.g., user 36) to continue shopping for additional products/services.

Buy Now Functionality: This functionality may enable the user (e.g., user 36) to immediately purchase the item defined on the current webpage (e.g., webpage 110), thus enabling the user (e.g., user 36) to bypass the shopping cart and make an immediate purchase.

Quantity Selection Functionality: This functionality may enable the user (e.g., user 36) to select the quantity of the item defined on the current webpage (e.g., webpage 110) to be purchased, wherein selecting a quantity greater than one may result in the total cost being recalculated.

Associating 306 the structure portions 254, 256 of website structure 54 with functions 64 of website 100 to define a specific function description model may include defining, using the user interface, functions for structure portions corresponding to the identified spatial regions. For example, information process 10 may provide, using the user interface, user 36 with the ability to define or select a function for each structure portion corresponding to the identified spatial region(s). For example, information process 10 may associate 306 user 36's interactions with structure portion 254 of website structure 54 with e.g., an "Add to Cart" function and may associate 306 user 36's interactions with structure portion 256 of website structure 54 with e.g., a "Buy Now" function. In this manner, information process 10 may define or generate the specific function description model for website 100 by associating or mapping particular specific structure portions of the website structure with one or more functions of the function description model corresponding to website 100.

The specific function description model (e.g., specific function description model 66) corresponding to the specific website (e.g., website 100) may be configured to allow for the above-described automated accessing of (in this example) website 100. For example and as discussed above, since specific function description model 66 locates the various function-related portions (e.g., structure portions 254, 256) within the website structure (e.g., website structure 54) of the specific website (e.g., website 100), the specific website (e.g., website 100) may be accessed and utilized in an automated fashion (since specific function description model 66 eliminates the need for a human being to visually-navigate website 100). In this manner and with the specific function description model, information process 10 may generate machine-readable or machine-executable application programming interfaces (APIs) directly from the above-described association of portions of website structure with one or more functions.

The specific function description model may be both machine-interpretable and human-interpretable. For example, with specific function description model 66 corresponding to website 100, information process 10 may generate one or more machine-executable scripts capable of performing the one or more functions described above for website 100. In this manner, specific function description model 60 is machine interpretable. Additionally, with specific function description model 66 corresponding to website 100, information process 10 may generate one or more natural language descriptions of the one or more functions described above. For example, information process 10 may process specific function description model 66 corresponding to website 100 with one or more predefined translation rules to generate a natural language description of the one or more functions defined by specific function description model 66. In this manner, a user (e.g., user 36) can interpret what functions that specific function description model 66 is capable of performing on website 100.

As discussed above, information process 10 may identify 200 one or more portions of a website structure (e.g., website structure 54) of a specific website (e.g., website 100) and associate 206 the one or more portions (e.g., structure portions 106, 108) of the website structure (e.g., website structure 54) with one or more descriptors (e.g., descriptors 56) of the specific website (e.g., website 100) to define a specific data description model (e.g., specific data description model 58) corresponding to the specific website (e.g., website 100). When identifying 200 the one or more portions of the website structure of a specific website, the one or more portions (e.g., structure portions 106, 108) of website structure (e.g., website structure 54) may be generated or exposed in response to a user's interactions with the website (e.g., website 100). For example and as is known in the art, some websites may include portions of website structure or code that are generated dynamically as a user interacts with the website. Accordingly, information process 10 may associate 306 the user's recorded interactions that generate the additional website structure (e.g., structure portions 106, 108) with one or more functions (e.g., functions 64) of the specific website (e.g., website 100). In this manner, specific function description model 66 may locate the various function-related portions within the website structure of the specific website (e.g., website 100) that generate or expose additional website structure. With a specific function description model that describes how to generate the additional website structure, the dynamically generated or dynamically accessible portions of the website may be identified and utilized in an automated fashion (since specific function description model 66 eliminates the need for a human being to visually-navigate website 100).

Once the user (e.g., user 36) and information process 10 processes (in this example) webpage 110 of website 100, the user (e.g., user 36) and information process 10 may process (in this example) additional webpages (e.g., webpages 112, 114, 116) of website 100 to obtain additional functions for inclusion within (and further refinement of) function description model 66. For example, information process 10 may enable 302 user 36 to review additional webpages (e.g., webpages 112, 114, 116) of website 100 to visually identify one or more spatial regions of these webpages (e.g., webpages 112, 114, 116) and associate 304 these spatial regions with one or more portions of the website structure (e.g., website structure 54) to obtain additional functions for inclusion within (and further refinement of) the specific function description model (e.g., specific function description model 66) corresponding to the specific website (e.g., website 100).

Once a sufficient quantity of webpages (e.g., webpages 110, 112, 114, 116) of website 100 are processed (e.g., ten or more), information process 10 may process the specific function description model (e.g., specific function description model 66) to obtain useable information from the specific website (e.g., website 100). For example and when processing the specific function description model (e.g., specific function description model 66) to obtain useable information from the specific website (e.g., website 100), information process 10 may process the specific function description model (e.g., specific function description model 66) to obtain raw information from the specific website (e.g., website 100) and transform this raw information into useable information.

As discussed above, information process 10 may associate 306 the one or more portions (e.g., structure portions 254, 256) of the website structure (e.g., website structure 54) with one or more functions (e.g., functions 64) of the specific website (e.g., website 100) to define a specific function description model (e.g., specific function description model 66) corresponding to the specific website (e.g., website 100), wherein these functions (e.g., functions 64) may include functionalities that are effectuated via (in this example) website 100. As could be imagined, it is foreseeable that different webpages within a website may use different functions (e.g., functions 64). For example, some webpages within website 100 may use "Add to Cart" functionality, while other webpages within website 100 may use "Place in Cart" functionality. Further, some webpages within website 100 may use "Buy Now" functionality, while other webpages within website 100 may use "Check Out" functionality.

In order to properly utilize such functionality (e.g., functions 64), information process 10 may process these functions to transform them from raw information (e.g., functions 64 in their original disjointed form) into useable information 68 (as will be described below). When transforming the raw information (e.g., functions 64) into useable information 68, information process 10 may: amend/normalize/homogenize the raw information (e.g., functions 64). Specifically, since it is foreseeable that different webpages within a website (e.g., website 100) may use functions that are formatted differently, information process 10 may amend/normalize/homogenize such raw information (e.g., functions 64) to standardize the formatting.

Once the raw information (e.g., the above-described functions 64 in their original disjointed form) within function description model 66 are transformed into useable information (i.e., useable information 68), information process 10 may populate a database (e.g., database 70) with at least a portion of this useable information (i.e., useable information 68), wherein database 70 may be included within and/or associated with function description model 66. Useable information 68 stored within database 70 may (generally speaking) function as a roadmap that allows for automated navigation of (in this example) website 100.

Continuing with the above-stated example, information process 10 may utilize function description model 66 and useable information 68 to process additional webpages within website 100. As could be imagined, a website (especially an ecommerce website) may include hundreds of thousands of webpages that correspond to the hundreds of thousands of products they sell. Accordingly, information process 10 may allow a user to manually identify 300 one or more portions of a website structure (e.g., website structure 54) of a specific website (e.g., website 100) to define specific function description model 66 (albeit it in a rudimentary form). Information process 10 may then use specific function description model 66 to automatically process (in the fashion described above) the remaining webpages within website 100 to further refine specific function description model 66.

Figure 7:
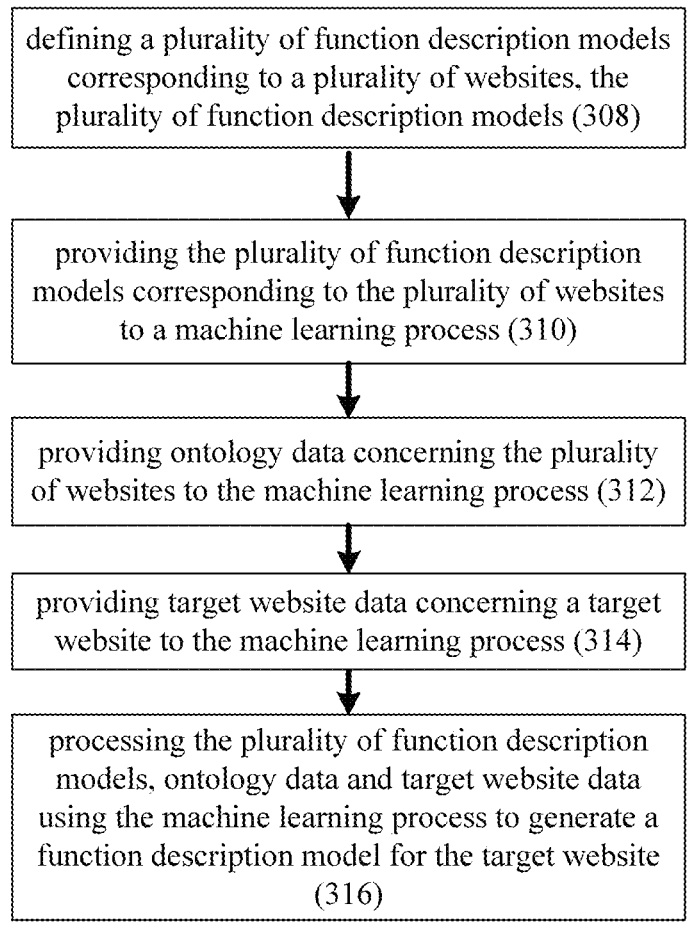
FIG. 7 is another flowchart of the information process of FIG. 1 according to an embodiment of the present disclosure.

ParaLogue (Function Models Generating Function Models):

Referring also to FIG. 7 and once specific function description model 66 is completely defined (e.g., all of the webpages of website 100 have been processed), information process 10 may define 308 a plurality of function description models (e.g., plurality of function description models 258) corresponding to a plurality of websites (e.g., plurality of websites 120), the plurality of function description models (e.g., plurality of function description models 158) including: the specific function description model (e.g., specific function description model 66) corresponding to the specific website (e.g., specific website 100), and one or more additional function description models corresponding to one or more additional websites.

Information process 10 may provide 310 the plurality of function description models (e.g., plurality of function description models 158) corresponding to the plurality of websites (e.g., plurality of websites 120) to a machine learning (ML) process (e.g., machine learning process 122).

As discussed above, function description models locate the various function-related portions within a website structure of a website, thus eliminating the need for a human being to visually-navigate a website. Accordingly, machine learning process 122 may use the plurality of function description models (e.g., plurality of function description models 258) corresponding to the plurality of websites (e.g., plurality of websites 120) as training data to "learn" how to navigate other websites.

Additionally, information process 10 may provide 312 ontology data (e.g., ontology data 260) concerning the plurality of websites (e.g., plurality of websites 120) to the machine learning process (e.g., machine learning process 122).

As discussed above, being different webpages within a website use different functions (e.g., functions 64), in order to properly utilize such functions (e.g., functions 64), information process 10 processes these functions to transform them from raw information (e.g., functions 64 in their original disjointed form) into useable information 68 (in a normalized/homogenized form). As could be imagined, it is foreseeable that different websites may use different functions (e.g., functions 64) within their webpages. For example, a first website (www.abc.com) may define the function "Buy Now", while another website (www.xyz.com) may define the function "Check Out". Therefore and in order to properly utilize such functions (e.g., functions 64) across multiple websites (e.g., www.abc.com & www.xyz.com), information process 10 may process these functions to transform them from their original disjointed form into useable (e.g., normalized/homogenized) information (e.g., ontology data 260). Accordingly and when generating ontology data 260, information process 10 may process the useable information included within each of the plurality of function description models (e.g., plurality of function description models 258) to amend/normalize/homogenize this useable information across the plurality of websites (e.g., plurality of websites 120).

In a similar fashion, this ontology data (e.g., ontology data 260) may function as a roadmap that allows for automated navigation of (in this example) the plurality of websites (e.g., plurality of websites 120). Accordingly, machine learning process 122 may use ontology data 260 as training data to "learn" how to navigate these websites (e.g., plurality of websites 120).

Further, information process 10 may provide 314 target website data (e.g., target website data 126) concerning a target website (e.g., www.targetwebsite.com) to the machine learning process (e.g., machine learning process 122). An example of target website data 126 may include, but is not limited to, target website usage data describing one or more user interactions with the target website. For example, target website usage data may include one or more user interaction recordings or logs of one or more user interactions with the target website. For example and as discussed above, target website usage data may include various clickstreams or other activity information indicating how the one or more users interact with the target website. Accordingly and using plurality of function description models 258 and ontology data 260 as training data, information process 10 may allow a user (e.g., user 36) to provide 314 target website data (e.g., target website data 126) concerning atargetwebsite (e.g., www.targetwebsite.com) for automated processing by information process 10.

Accordingly, information process 10 may process 316 the plurality of function description models (e.g., plurality of function description models 258), ontology data (e.g., ontology data 260) and target website data (e.g., target website data 126) using the machine learning process (e.g., machine learning process 122) to generate a function description model (e.g., target function description model 264) for the target website (e.g., www.targetwebsite.com). For example, information process 10 may automatically process webpages within www.targetwebsite.com to generate target function description model 264 (in the manner described above). Once generated, target function description model 264 may be included within plurality of function description models 258 and ontology data 260 may be updated to homogenize the functions used within target function description model 264; thus enabling plurality of function description models 258 and ontology data 260 to be utilized by information process 10 to automatically process additional target websites.

ParaFlow:

As discussed above, through the use of a data description model (e.g., data description model 58) and a function description model (e.g., function description model 66), a website (e.g., website 100) may be navigated without human intervention. Specifically and as discussed above, a data description model (e.g., data description model 58) may define the data defined within a website (e.g., website 100), while a function description model (e.g., function description model 66) may define the functions available via the website (e.g., website 100).

Figure 8:
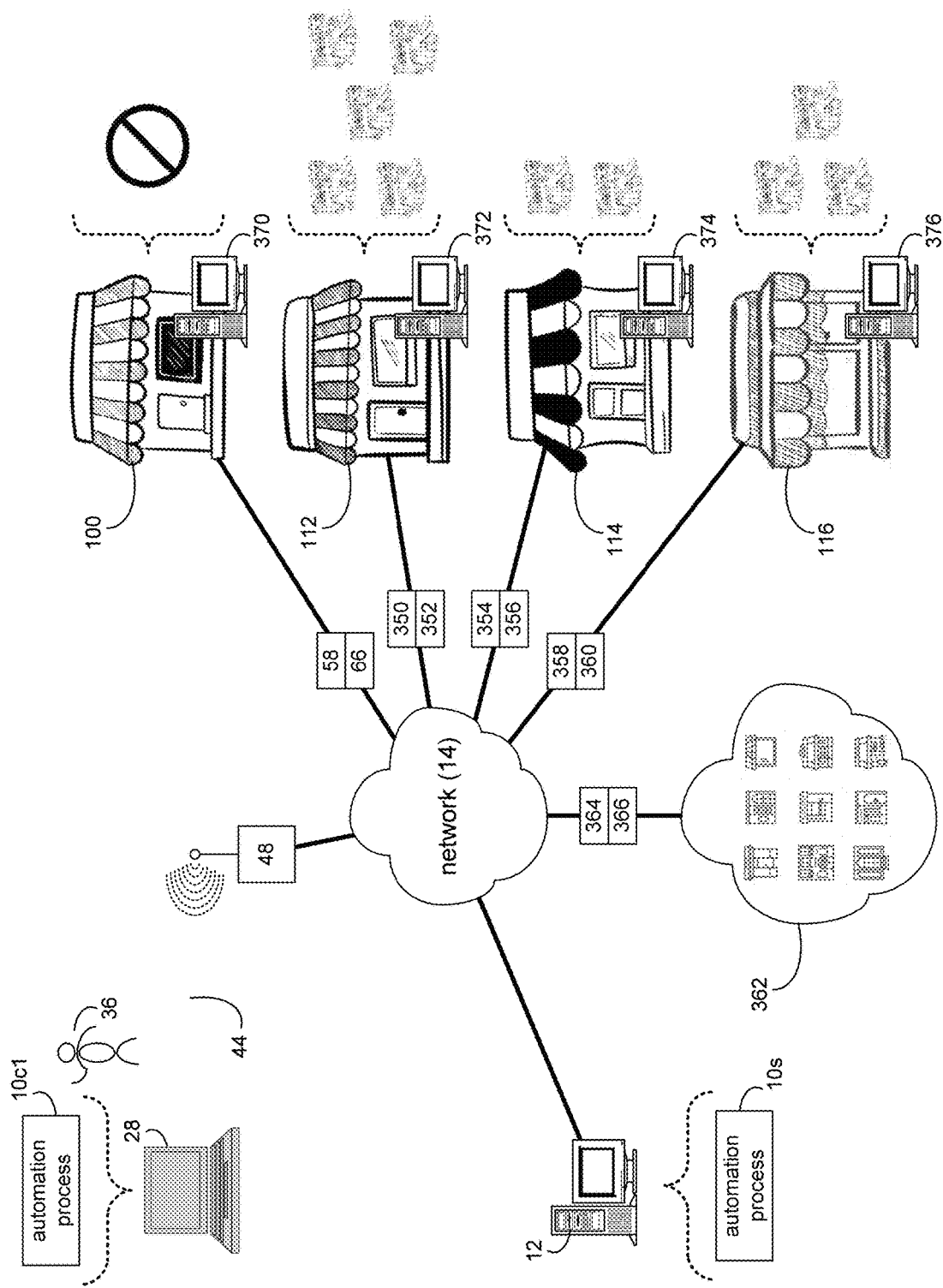
FIG. 8 is a diagrammatic view of a plurality of websites for processing by the information process of FIG. 1 according to an embodiment of the present disclosure.

Referring also to FIG. 8, information process 10 may be capable of navigating and/or effectuating the functionality of a plurality of websites through the use of such data description models and function description models. For the following example, assume that:

Since data description model 58 and function description model 66 were defined for website 100, information process 10 may navigate and/or effectuate the functionality of website 100. Accordingly and in the event that website 100 is an ecommerce website, information process 10 may e.g., access website 100, locate one or more products/services available via website 100, and effectuate the purchase of the same.

Since data description model 350 and function description model 352 were defined for website 112, information process 10 may navigate and/or effectuate the functionality of website 112. Accordingly and in the event that website 112 is an ecommerce website, information process 10 may e.g., access website 112, locate one or more products/services available via website 112, and effectuate the purchase of the same.

Since data description model 354 and function description model 356 were defined for website 114, information process 10 may navigate and/or effectuate the functionality of website 114. Accordingly and in the event that website 114 is an ecommerce website, information process 10 may e.g., access website 114, locate one or more products/services available via website 114, and effectuate the purchase of the same.

Since data description model 358 and function description model 360 were defined for website 116, information process 10 may navigate and/or effectuate the functionality of website 116. Accordingly and in the event that website 116 is an ecommerce website, information process 10 may e.g., access website 116, locate one or more products/services available via website 116, and effectuate the purchase of the same.

While in this example, information process 10 is shown to be capable of navigating and/or effectuating the functionality of four websites (e.g., websites 100, 112, 114, 116), this is for illustrative purposes only and is not intended to be a limitation of this disclosure, as other configurations are possible and are considered to be within the scope of this disclosure. For example, information process 10 may be capable of navigating and/or effectuating the functionality of many additional websites (e.g., additional websites 362) provided the appropriate data description model(s) (e.g., data description model 364) and a function description model(s) (e.g., function description model 366) are defined.

Figure 9:
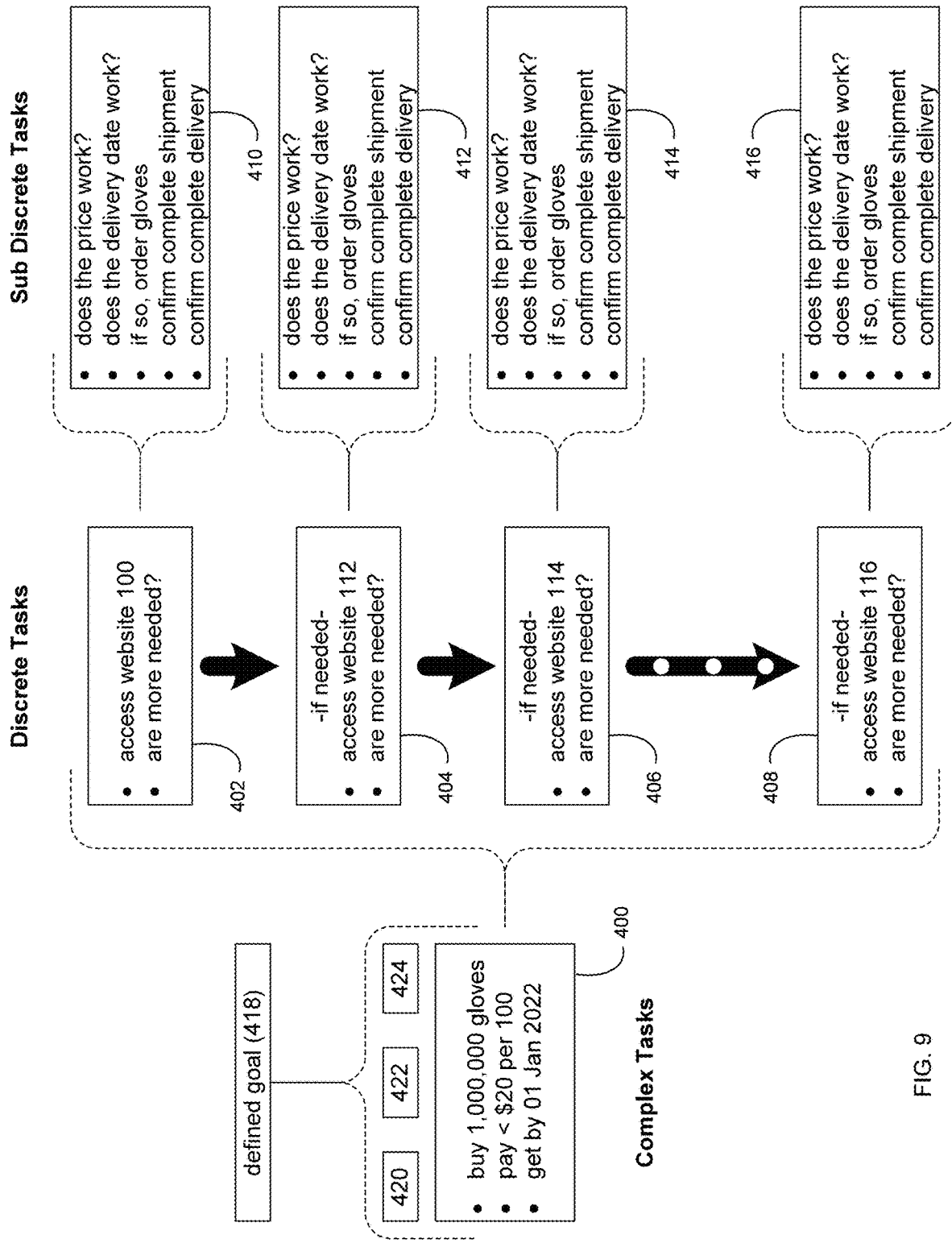
FIG. 9 is a diagrammatic view of a complex task for processing by the information process of FIG. 1 according to an embodiment of the present disclosure.

Referring also to FIG. 9, information process 10 may be configured to process complex tasks (e.g., complex task 400). Complex task 400 may include a plurality of discrete tasks, such as discrete tasks 402, 404, 406, 408, wherein each of these discrete tasks (e.g., discrete tasks 402, 404, 406, 408) may include a plurality of sub-discrete tasks. For example: discrete task 402 may include sub-discrete tasks 410; discrete task 404 may include sub-discrete tasks 412; discrete task 406 may include sub-discrete tasks 414; and discrete task 408 may include sub-discrete tasks 416. Each of these sub-discrete tasks (e.g., sub-discrete tasks 410. 412, 414, 416) may define discrete requirements for the related subtask that concern e.g., price, delivery data, tracking of shipping and tracking of delivery.

Generally speaking, a complex task (e.g., complex task 400) may be a task that is traditionally executed across multiple websites (e.g., websites 100, 112, 114, 116). For example, complex task 400 may be the task of planning a vacation that includes multiple subtasks, such as: arranging air travel to a destination, booking a hotel at the destination, arranging car travel from a destination airport to the hotel, arranging car travel from the hotel to the destination airport, and arranging air travel from the destination. Additionally, a complex task (e.g., complex task 400) may be a task that is traditionally executed on a single website (e.g., website 100), but ends up being executed across one or more additional websites (e.g., websites 112, 114, 116) due to the scope of the complex task (e.g., complex task 400). Complex task 400 may be user-defined (e.g., by user 36) or automatically generated (e.g., by a machine). For example, information process 10 may provide a user interface for a user to provide complex task 400. Additionally, complex task 400 may be defined by one or more computing devices. In this manner, it will be appreciated that complex task 400 may be received from various sources.

For example, assume that a user (e.g., user 42) wishes to purchase 1,000,000 pair of surgical gloves, wherein the purchase price of these surgical gloves must be less than $20 per hundred pair. Additionally, these surgical gloves need to be received by 1 Jan. 2022.

This complex task (e.g., complex task 400) may be a portion of an overarching defined goal (e.g., define goal 418), wherein defined goal 418 may include a plurality of complex tasks (e.g., complex tasks 400, 420, 422, 424). For example, defined goal 418 may be the outfitting of a new hospital in West Virginia, wherein complex task 400 may be configured to obtain surgical gloves, complex task 420 may be configured to obtain syringes, complex task 422 may be configured to obtain pharmaceuticals, and complex task 424 may be configured to obtain surgical instruments/supplies.

Figure 10:
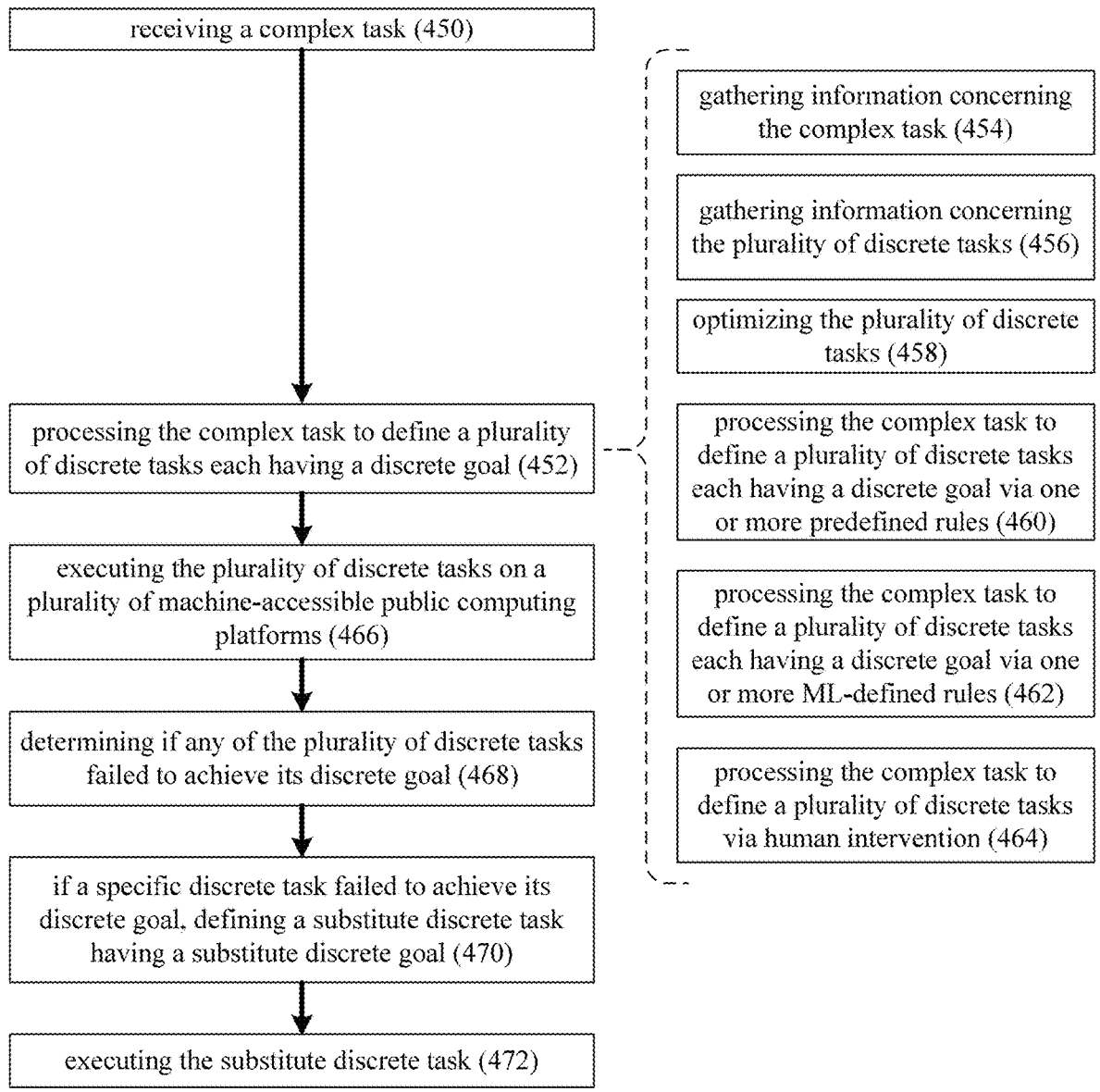
FIG. 10 is another flowchart of the information process of FIG. 1 according to an embodiment of the present disclosure.

Referring also to FIG. 10, information process 10 may receive 450 a complex task (e.g., complex task 400). As discussed above, the complex task (e.g., complex task 400) in this illustrative example concerns the purchase of 1,000,000 pair of surgical gloves that need to be received by 1 Jan. 2022 and must cost less than $20 per hundred pair. Information process 10 may process 452 the complex task (e.g., complex task 400) to define a plurality of discrete tasks (e.g., discrete tasks 402, 404, 406, 408) each having a discrete goal. In this example, the plurality of discrete tasks (e.g., discrete tasks 402, 404, 406, 408) concern the purchasing of the same product from multiple websites, wherein additional surgical gloves are purchased from additional websites until a total of 1,000,000 pair of surgical gloves are purchased. However, it is understood that the plurality of discrete tasks (e.g., discrete tasks 402, 404, 406, 408) may concern the purchasing of different products/services from different websites (e.g., purchasing air travel from an airline website and purchasing hotel lodging from a hotel website).

The plurality of discrete tasks may be formed from one or more functions defined in one or more function description models as described above. Returning to the above example, discrete tasks 402, 404, 406, 408 may be formed from one or more functions of respective function description models (e.g., function description models 66, 352, 356, 360) defined for various websites (e.g., websites 100, 112, 114, 116). Information process 10 may utilize a predefined label associated with a function to form the plurality of discrete tasks. For example, suppose one or more functions are labeled as e.g., "Add product to Cart". In this example, information process 10 may process the label for the function to define which functions are capable of performing discrete tasks 402, 404, 406, 408. Accordingly, when processing 452 complex task 400 to define plurality of discrete tasks 402, 404, 406, 408, information process 10 may identify one or more functions from function description models 66, 352, 356, 360 defined for websites 100, 112, 114, 116 that perform at least a portion of complex task 400.

Additionally, information process 10 may form the plurality of discrete tasks from one or more application programming interfaces (APIs) predefined for one or more websites. For example, information process 10 may have access to one or more APIs predefined for a respective website (e.g., websites 100, 112, 114, 116) and may define discrete tasks 402, 404, 406, 408 using the one or more APIs. Accordingly, information process 10 may form the plurality of discrete tasks from any combination of one or more functions from one or more function description models defined for one or more websites, and one or more application programming interfaces (APIs) predefined for the one or more websites.

Concerning the plurality of discrete tasks (e.g., discrete tasks 402, 404, 406, 408) included within complex task 400, these discrete tasks 402, 404, 406, 408 (and their related discrete goals) may be conditional in nature and may generally mimic that of a workflow. Generally speaking:

Discrete task 402 may concern accessing website 100 to purchase surgical gloves, wherein the discrete goal of discrete task 402 is the purchase 1,000,000 pair of surgical gloves that need to be received by 1 Jan. 2022 and must cost less than $20 per hundred pair.

Discrete task 404 may be conditional in nature. Specifically, if 1,000,000 pair of surgical gloves were already obtained, discrete task 404 may not be needed. However and assuming that it is needed, discrete task 404 may concern accessing website 112 to purchase surgical gloves, wherein the discrete goal of discrete task 404 is the purchase of whatever surgical gloves are still needed to satisfy complex task 400 (i.e., the purchase of 1,000,000 pair of surgical gloves that need to be received by 1 Jan. 2022 and must cost less than $20 per hundred pair).

Discrete task 406 may be conditional in nature. Specifically, if 1,000,000 pair of surgical gloves were already obtained, discrete task 406 may not be needed. However and assuming that it is needed, discrete task 406 may concern accessing website 114 to purchase surgical gloves, wherein the discrete goal of discrete task 406 is the purchase of whatever surgical gloves are still needed to satisfy complex task 400 (i.e., the purchase of 1,000,000 pair of surgical gloves that need to be received by 1 Jan. 2022 and must cost less than $20 per hundred pair).

Discrete task 408 may be conditional in nature. Specifically, if 1,000,000 pair of surgical gloves were already obtained, discrete task 408 may not be needed. However and assuming that it is needed, discrete task 408 may concern accessing website 116 to purchase surgical gloves, wherein the discrete goal of discrete task 408 is the purchase of whatever surgical gloves are still needed to satisfy complex task 400 (i.e., the purchase of 1,000,000 pair of surgical gloves that need to be received by 1 Jan. 2022 and must cost less than $20 per hundred pair).

While four discrete tasks (e.g., discrete tasks 402, 404, 406, 408) are shown, this is for illustrative purposes only and is not intended to be a limitation of this disclosure, as it is understood that the quantity of discrete tasks (e.g., discrete tasks 402, 404, 406, 408) may be increased or decreased as needed.

When processing 452 the complex task (e.g., complex task 400) to define a plurality of discrete tasks (e.g., discrete tasks 402, 404, 406, 408) each having a discrete goal, information process 10 may gather 454 information concerning the complex task (e.g., complex task 400). As stated above, complex task 400 defines a maximum purchase price of $20 per hundred pair and a delivery date of no later than 1 Jan. 2022. Accordingly, information process 10 may inquire from the user (e.g., user 42) as to whether there are any additional task-based restrictions/requirements (e.g., country of manufacture, sustainability, material, color, packaging) to gather 454 information concerning the complex task (e.g., complex task 400).

Further and when processing 452 the complex task (e.g., complex task 400) to define a plurality of discrete tasks (e.g., discrete tasks 402, 404, 406, 408) each having a discrete goal, information process 10 may gather 456 information concerning the plurality of discrete tasks (e.g., discrete tasks 402, 404, 406, 408). For example, information process 10 may inquire from the user (e.g., user 42) as to whether there are subtask-based restrictions/requirements (e.g., prohibited websites, minimum shipment size, shipper location) to gather 456 information concerning the plurality of discrete tasks (e.g., discrete tasks 402, 404, 406, 408).

When processing 452 the complex task (e.g., complex task 400) to define a plurality of discrete tasks (e.g., discrete tasks 402, 404, 406, 408) each having a discrete goal, information process 10 may optimize 458 the plurality of discrete tasks (e.g., discrete tasks 402, 404, 406, 408). For example, suppose that several complex tasks (e.g., complex tasks 400, 420) within defined goal 418 are simultaneously being processed by information process 10, wherein website 100 is providing products in each of these complex tasks (e.g., surgical gloves for complex task 400 and syringes for complex task 420). Accordingly and to optimize 458 the plurality of discrete tasks (e.g., discrete tasks 402, 404, 406, 408), information process 10 may combine these two orders (e.g., surgical gloves and syringes) to e.g., save on transportation costs.

When processing 452 the complex task (e.g., complex task 400) to define a plurality of discrete tasks (e.g., discrete tasks 402, 404, 406, 408) each having a discrete goal, information process 10 may perform one or more of the following operations:

- Process 460 the complex task (e.g., complex task 400) to define a plurality of discrete tasks (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 460 the complex task (e.g., complex task 400) to define a plurality of discrete tasks (e.g., discrete tasks 402, 404, 406, 408).
- Process 462 the complex task (e.g., complex task 400) to define a plurality of discrete tasks (e.g., discrete tasks 402, 404, 406, 408) each having a discrete goal via one or more ML-defined rules. For example, as orders are processed by information process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 462 the complex task (e.g., complex task 400) to define a plurality of discrete tasks (e.g., discrete tasks 402, 404, 406, 408).
- Process 464 the complex task (e.g., complex task 400) to define a plurality of discrete tasks (e.g., discrete tasks 402, 404, 406, 408) via human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 464 the complex task (e.g., complex task 400) to define a plurality of discrete tasks (e.g., discrete tasks 402, 404, 406, 408). Defining a plurality of discrete tasks (e.g., discrete tasks 402, 404, 406, 408) via human intervention may include determining that the one or more functions defined for the plurality of function description models for the plurality of websites are unable to perform one of the discrete tasks. Accordingly, information process 10 may provide a request for human intervention for input regarding the discrete task. For example, information process 10 may provide a request to a human (e.g., user 42) to perform a particular function on the website to supplement the function description model for that website. In this manner, information process 10 may identify missing functionality in one or more function description models and may associate user interactions with missing functions to define or update a function description model for the website. In addition to performing functions of a website, information process 10 may request that a human perform certain tasks that a machine cannot perform (e.g., prepare an electronic signature). In this manner, human intervention may be requested to supplement automated processing of discrete tasks.

Once defined, information process 10 may execute 466 the plurality of discrete tasks (e.g., discrete tasks 402, 404, 406, 408) on a plurality of machine-accessible public computing platforms (e.g., machine-accessible public computing platforms 370, 372, 374, 376), wherein examples of this plurality of machine-accessible public computing platforms (e.g., machine-accessible public computing platforms 370, 372, 374, 376) may include but is not limited to a plurality of ecommerce computing platforms coupled to the internet.

As discussed above, a data description model (e.g., data description model 58, 350, 354, 358) may be defined for at least one of the plurality of machine-accessible public computing platforms (e.g., machine-accessible public computing platforms 370, 372, 374, 376) and a function description model (e.g., function description model 66, 352, 356, 360) may be defined for at least one of the plurality of machine-accessible public computing platforms (e.g., machine-accessible public computing platforms 370, 372, 374, 376); wherein information process 10 may navigate and/or effectuate the functionality of e.g., websites 100, 112, 114, 116 through the use of such data description models (e.g., data description models 58, 350, 354, 358) and function description models (e.g., function description models 66, 352, 356, 360).

As discussed above, some of the discrete tasks (e.g., discrete tasks 404, 406, 408) may be conditional in nature and, therefore, may not be needed. For example, if the 1,000,000 pair of surgical gloves were obtained from website 100, discrete tasks 404, 406, 408 may not be needed. Additionally, if the 1,000,000 pair of surgical gloves were obtained from websites 100, 112 (cumulatively), discrete tasks 406, 408 may not be needed. Further, if the 1,000,000 pair of surgical gloves were obtained from websites 100, 112, 114 (cumulatively), discrete task 408 may not be needed. Accordingly, information process 10 may monitor the discrete and cumulative progress of discrete tasks (e.g., discrete tasks 402, 404, 406, 408) to ensure that the complex task (e.g., complex task 400) is successfully effectuated.

Information process 10 may determine 468 if any of the plurality of discrete tasks (e.g., discrete tasks 402, 404, 406, 408) failed to achieve its discrete goal, wherein "failing to achieve its discrete goal" may include one or more of:

- An immediate total failure of the discrete goal: For example, if information process 10 accesses website 100 to purchase the 1,000,000 pair of surgical gloves . . . only to find out that website 100 does not have any surgical gloves available, information process 10 may consider this to be an immediate total failure of the discrete goal.
- An immediate partial failure of the discrete goal: For example, if information process 10 accesses website 100 to purchase the 1,000,000 pair of surgical gloves . . . only to find out that website 100 only has 500,000 pair of surgical gloves available, information process 10 may consider this to be an immediate partial failure of the discrete goal.
- A retroactive total failure of the discrete goal: For example, if information process 10 accesses website 100 to purchase the 1,000,000 pair of surgical gloves and purchases the same . . . only to find out that website 100 fails to ship any surgical gloves (e.g., due to them being backordered or systemic failure), information process 10 may consider this to be a retroactive total failure of the discrete goal.

A retroactive partial failure of the discrete goal: For example, if information process 10 accesses website 100 to purchase the 1,000,000 pair of surgical gloves and purchases the same . . . only to find out that website 100 shipped only 500,000 surgical gloves (e.g., due to them being backordered or systemic failure), information process 10 may consider this to be a retroactive partial failure of the discrete goal.

As will be explained below in greater detail, if a specific discrete task (e.g., one or more of discrete tasks 402, 404, 406, 408) failed to achieve its discrete goal, information process 10 may define 470 a substitute discrete task having a substitute discrete goal, wherein information process 10 may execute 472 the substitute discrete task. As will be clear from the discussion below, a substitute discrete task may be any discrete task that is modified as a result of the previously-executed discrete task.

Continuing with the above-stated example in which user 42 wishes to purchase 1,000,000 pair of surgical gloves for less than $20 per hundred pair and they are needed by 1 Jan. 2022, this complex task (e.g., complex task 400) may include a plurality of discrete tasks (e.g., discrete tasks 402, 404, 406, 408). Assume that information process 10 attends to the sequential execution of discrete tasks 402, 404, 406, 408 and the following operations occur:

Information process 10 may effectuate discrete task 402 and attempt to purchase the 1,000,000 pair of surgical gloves from website 100. Assume that website 100 does not have any surgical gloves available. Accordingly, information process 10 may consider this to be an immediate total failure of the discrete goal associated with discrete task 402. As complex task 400 is still not satisfied (i.e., 0 of the 1,000,000 pair have been purchased), information process 10 may continue on to the next discrete task.

Information process 10 may effectuate discrete task 404 and attempt to purchase the 1,000,000 pair of surgical gloves from website 112. Assume that website 112 has 500,000 pair of surgical gloves available (that satisfy the price and delivery requirements). Accordingly, information process 10 may purchase this 500,000 pair of surgical glove but may consider this to be an immediate partial failure of the discrete goal associated with discrete task 404. As complex task 400 is still not satisfied (i.e., 500,000 of the 1,000,000 pair have been purchased), information process 10 may continue on to the next discrete task.

Information process 10 may effectuate discrete task 406 and attempt to purchase the remaining 500,000 pair of surgical gloves from website 114. Assume that website 114 has 200,000 pair of surgical gloves available (that satisfy the price and delivery requirements). Accordingly, information process 10 may purchase this 200,000 pair of surgical glove but may consider this to be an immediate partial failure of the discrete goal associated with discrete task 406. As complex task 400 is still not satisfied (i.e., 700,000 of the 1,000,000 pair have been purchased), information process 10 may continue on to the next discrete task.

Information process 10 may effectuate discrete task 408 and attempt to purchase the remaining 300,000 pair of surgical gloves from website 116. Assume that website 112 has 300,000 pair of surgical gloves available (that satisfy the price and delivery requirements). Accordingly, information process 10 may purchase this 300,000 pair of surgical glove and may consider this to not be a failure of the discrete goal associated with discrete task 408. As complex task 400 is now satisfied (i.e., 1,000,000 of the 1,000,000 pair have been purchased), information process 10 may not continue on to the next discrete task.

Grokit System (General):

As will be discussed below in greater detail, the above-described discrete systems (e.g., DataFi, ParaLogue & ParaFlow) may be combined to form an end-to-end platform that enables the navigation of a plurality of websites (e.g., websites 100, 112, 114, 116) without the need for human intervention, thus enabling the automated & distributed execution of complex tasks (e.g., complex task 400). As discussed above, complex task 400 may include the purchase of 1,000,000 pair of surgical gloves for less than $20 per hundred pair and delivered by 1 Jan. 2022.

Figure 11:
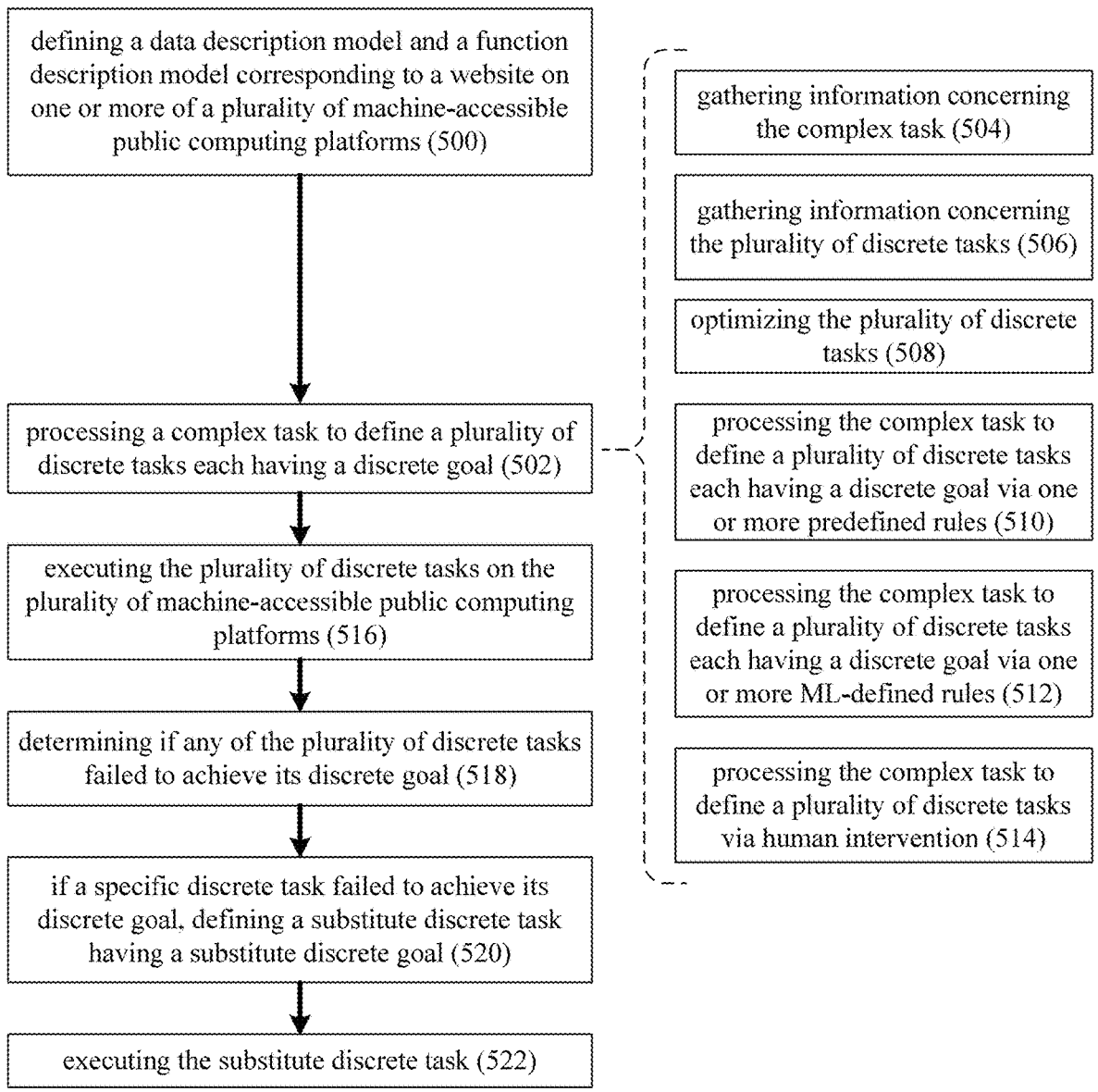
FIG. 11 is another flowchart of the information process of FIG. 1 according to an embodiment of the present disclosure.

Referring also to FIG. 11 and as discussed above, information process 10 may define 500 a data description model (e.g., data description models 58, 350, 354, 358) and a function description model (e.g., function description models 66, 352, 356, 360) corresponding to a website (e.g., websites 100, 112, 114, 116) on one or more of a plurality of machine-accessible public computing platforms (e.g., machine-accessible public computing platforms 370, 372, 374, 376). This plurality of machine-accessible public computing platforms (e.g., machine-accessible public computing platforms 370, 372, 374, 376) may include a plurality of ecommerce computing platforms coupled to the internet.

Information process 10 may process 502 a complex task (e.g., complex task 400) to define a plurality of discrete tasks (e.g., discrete tasks 402, 404, 406, 408) each having a discrete goal, wherein this complex task (e.g., complex task 400) may be based upon a defined goal (e.g., defined goal 418).

As discussed above and when processing 502 the complex task (e.g., complex task 400) to define a plurality of discrete tasks (e.g., discrete tasks 402, 404, 406, 408) each having a discrete goal, information process 10 may:

gather 504 information concerning the complex task (e.g., complex task 400), in the manner described above;

gather 506 information concerning the plurality of discrete tasks (e.g., discrete tasks 402, 404, 406, 408), in the manner described above; and/or optimize 508 the plurality of discrete tasks (e.g., discrete tasks 402, 404, 406, 408), in the manner described above.

Additionally/alternatively and when processing 502 the complex task (e.g., complex task 400) to define a plurality of discrete tasks (e.g., discrete tasks 402, 404, 406, 408) each having a discrete goal, information process 10 may:

Process 510 the complex task (e.g., complex task 400) to define a plurality of discrete tasks (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 510 the complex task (e.g., complex task 400) to define a plurality of discrete tasks (e.g., discrete tasks 402, 404, 406, 408).

Process 512 the complex task (e.g., complex task 400) to define a plurality of discrete tasks (e.g., discrete tasks 402, 404, 406, 408) each having a discrete goal via one or more ML-defined rules. For example, as orders are processed by information process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 512 the complex task (e.g., complex task 400) to define a plurality of discrete tasks (e.g., discrete tasks 402, 404, 406, 408).

Process 514 the complex task (e.g., complex task 400) to define a plurality of discrete tasks (e.g., discrete tasks 402, 404, 406, 408) via human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 514 the complex task (e.g., complex task 400) to define a plurality of discrete tasks (e.g., discrete tasks 402, 404, 406, 408). As discussed above, defining a plurality of discrete tasks (e.g., discrete tasks 402, 404, 406, 408) via human intervention may include determining that the one or more functions defined for the plurality of function description models for the plurality of websites are unable to perform one of the discrete tasks. Accordingly, information process 10 may provide a request for human intervention for input regarding the discrete task. For example, information process 10 may provide a request to a human (e.g., user 42) to perform a particular function on the website to supplement the function description model for that website. In this manner, information process 10 may identify missing functionality in one or more function description models and may associate user interactions with missing functions to define or update a function description model for the website. In addition to performing functions of a website, information process 10 may request that a human perform certain tasks that a machine cannot perform (e.g., prepare an electronic signature). In this manner, human intervention may be requested to supplement automated processing of discrete tasks.

As discussed above, information process 10 may execute 516 the plurality of discrete tasks (e.g., discrete tasks 402, 404, 406, 408) on the plurality of machine-accessible public computing platforms (e.g., machine-accessible public computing platforms 370, 372, 374, 376) and may determine 518 if any of the plurality of discrete tasks (e.g., discrete tasks 402, 404, 406, 408) failed to achieve its discrete goal. As discussed above, "failing to achieve its discrete goal" may include one or more of:

An immediate total failure of the discrete goal: For example, if information process 10 accesses website 100 to purchase the 1,000,000 pair of surgical gloves . . . only to find out that website 100 does not have any surgical gloves available, information process 10 may consider this to be an immediate total failure of the discrete goal.

An immediate partial failure of the discrete goal: For example, if information process 10 accesses website 100 to purchase the 1,000,000 pair of surgical gloves . . . only to find out that website 100 only has 500,000 pair of surgical gloves available, information process 10 may consider this to be an immediate partial failure of the discrete goal.

A retroactive total failure of the discrete goal: For example, if information process 10 accesses website 100 to purchase the 1,000,000 pair of surgical gloves and purchases the same . . . only to find out that website 100 fails to ship any surgical gloves (e.g., due to them being backordered or systemic failure), information process 10 may consider this to be a retroactive total failure of the discrete goal.

A retroactive partial failure of the discrete goal: For example, if information process 10 accesses website 100 to purchase the 1,000,000 pair of surgical gloves and purchases the same . . . only to find out that website 100 shipped only 500,000 surgical gloves (e.g., due to them being backordered or systemic failure), information process 10 may consider this to be a retroactive partial failure of the discrete goal.

As discussed above, if a specific discrete task failed to achieve its discrete goal, information process 10 may define 520 a substitute discrete task having a substitute discrete goal and may execute 522 the substitute discrete task.

Grokit System (SaaS):

As will be discussed below in greater detail, the above-described discrete systems (e.g., DataFi, ParaLogue & ParaFlow) may be combined to form an end-to-end Software-as-a-Service (SaaS) platform that enables the navigation of a plurality of websites (e.g., websites 100, 112, 114, 116) without the need for human intervention, thus enabling the automated & distributed execution of complex tasks (e.g., complex task 400). As discussed above, complex task 400 may include the purchase of 1,000,000 pair of surgical gloves for less than $20 per hundred pair and delivered by 1 Jan. 2022.

Figure 12:
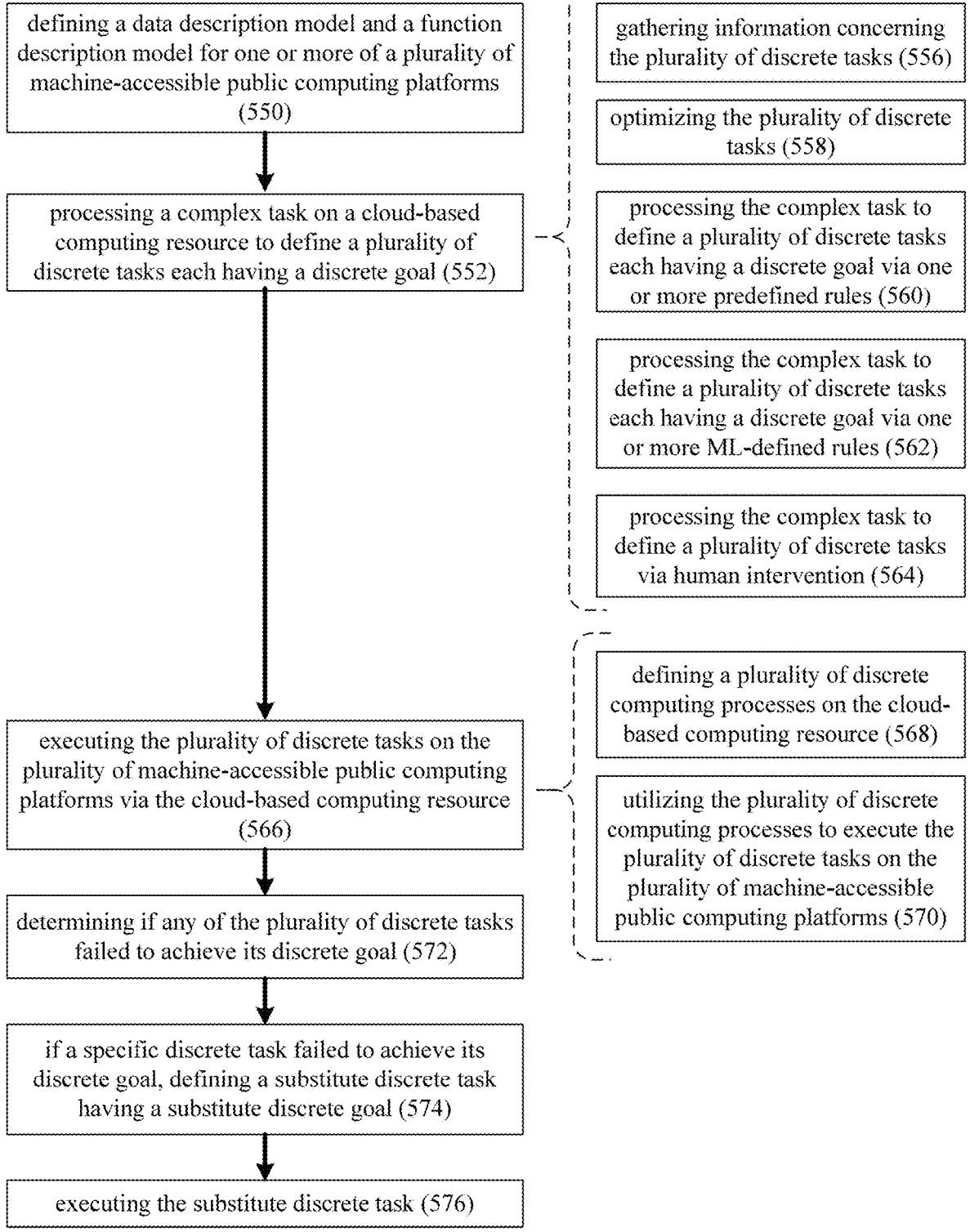
FIG. 12 is another flowchart of the information process of FIG. 1 according to an embodiment of the present disclosure.
Figure 13:
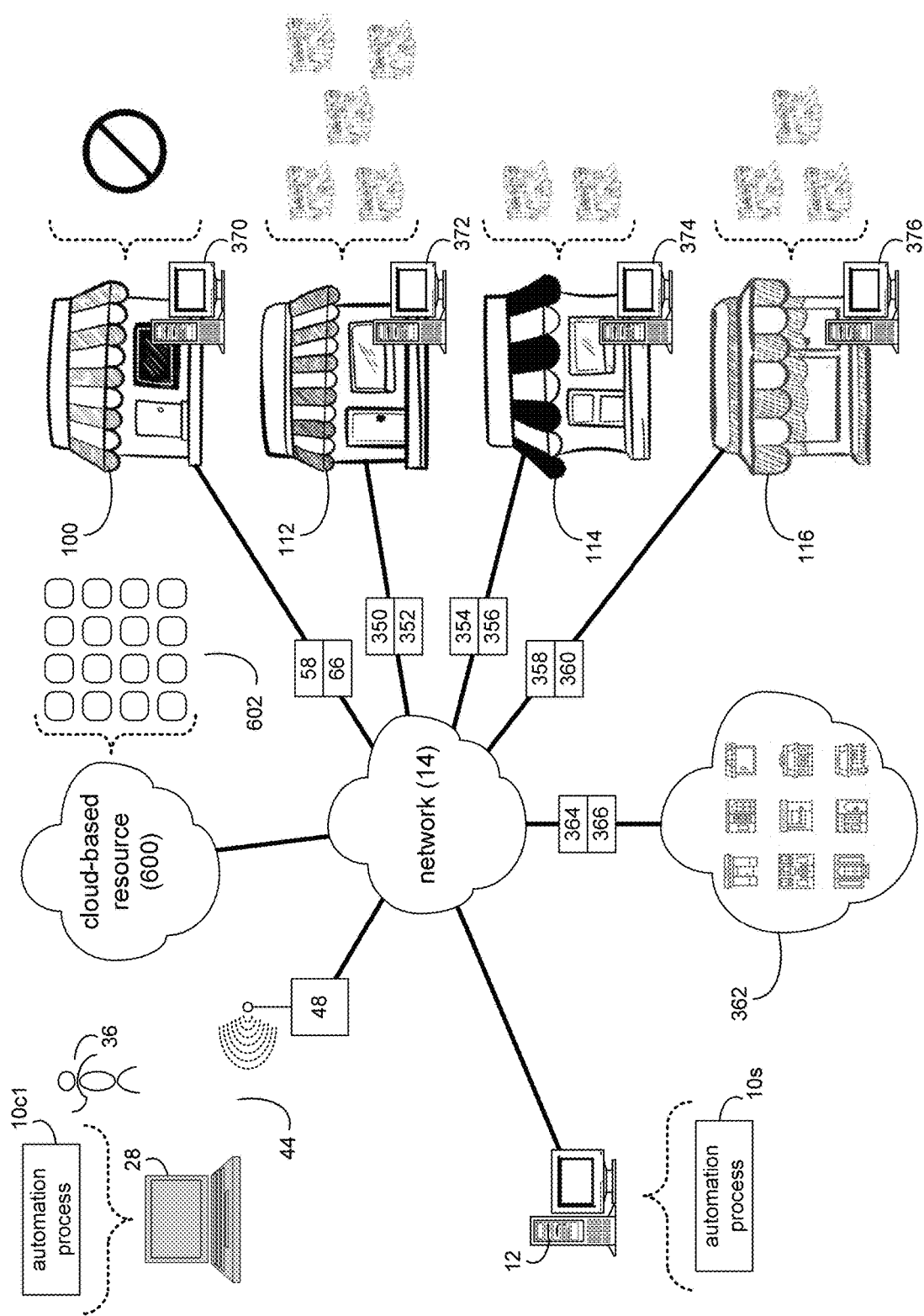
FIG. 13 is a diagrammatic view of a plurality of websites for processing by a cloud-based implementation of the information process of FIG. 1 according to an embodiment of the present disclosure.

Referring also to FIGS. 12-13 and as discussed above, information process 10 may define 550 a data description model (e.g., data description models 58, 350, 354, 358) and a function description model (e.g., function description models 66, 352, 356, 360) for one or more of a plurality of machine-accessible public computing platforms (e.g., machine-accessible public computing platforms 370, 372, 374, 376) on a cloud-based computing resource (e.g., cloud-based computing resource 600). The plurality of machine-accessible public computing platforms (e.g., machine-accessible public computing platforms 370, 372, 374, 376) may include a plurality of ecommerce computing platforms coupled to the internet.

An example of cloud-based computing resource 600 may include but is not limited to a system that provides on-demand availability of computer system resources, especially data storage (e.g., cloud storage) and computing power, without direct active management by the user. The term is generally used to describe data centers available to many users over the Internet. Large clouds often have functions distributed over multiple locations from central servers. If the connection to the user is relatively close, it may be designated an edge server. Clouds may be limited to a single organization (enterprise clouds), or be available to multiple organizations (public cloud). Cloud computing may rely on sharing of resources to achieve coherence and economies of scale. Benefits of public and hybrid clouds include allowing companies to avoid (or minimize) up-front IT infrastructure costs while getting applications up and running faster with improved manageability and less maintenance. Cloud computing may enable IT teams to more rapidly adjust resources to meet fluctuating and unpredictable demand, while providing burst computing capability (i.e., high computing power at certain periods of peak demand).

As discussed above, information process 10 may process 552 the complex task (e.g., complex task 400) on the cloud-based computing resource (e.g., cloud-based computing resource 600) to define a plurality of discrete tasks (e.g., discrete tasks 402, 404, 406, 408) each having a discrete goal, wherein this complex task (e.g., complex task 400) may be based upon a defined goal (e.g., defined goal 418).

As discussed above and when processing 552 a complex task (e.g., complex task 400) on the cloud-based computing resource (e.g., cloud-based computing resource 600) to define a plurality of discrete tasks (e.g., discrete tasks 402, 404, 406, 408) each having a discrete goal, information process 10 may:

gather 554 information concerning the complex task (e.g., complex task 400), in the manner described above;

gather 556 information concerning the plurality of discrete tasks (e.g., discrete tasks 402, 404, 406, 408), in the manner described above; and/or optimize 558 the plurality of discrete tasks (e.g., discrete tasks 402, 404, 406, 408), in the manner described above.

Additionally/alternatively and when processing 552 a complex task (e.g., complex task 400) on the cloud-based computing resource (e.g., cloud-based computing resource 600) to define a plurality of discrete tasks (e.g., discrete tasks 402, 404, 406, 408) each having a discrete goal, information process 10 may:

Process 560 the complex task (e.g., complex task 400) to define a plurality of discrete tasks (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 560 the complex task (e.g., complex task 400) to define a plurality of discrete tasks (e.g., discrete tasks 402, 404, 406, 408).

Process 562 the complex task (e.g., complex task 400) to define a plurality of discrete tasks (e.g., discrete tasks 402, 404, 406, 408) each having a discrete goal via one or more ML-defined rules. For example, as orders are processed by information process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 562 the complex task (e.g., complex task 400) to define a plurality of discrete tasks (e.g., discrete tasks 402, 404, 406, 408).

Process 564 the complex task (e.g., complex task 400) to define a plurality of discrete tasks (e.g., discrete tasks 402, 404, 406, 408) via human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 564 the complex task (e.g., complex task 400) to define a plurality of discrete tasks (e.g., discrete tasks 402, 404, 406, 408). As discussed above, defining a plurality of discrete tasks (e.g., discrete tasks 402, 404, 406, 408) via human intervention may include determining that the one or more functions defined for the plurality of function description models for the plurality of websites are unable to perform one of the discrete tasks. Accordingly, information process 10 may provide a request for human intervention for input regarding the discrete task. For example, information process 10 may provide a request to a human (e.g., user 42) to perform a particular function on the website to supplement the function description model for that website. In this manner, information process 10 may identify missing functionality in one or more function description models and may associate user interactions with missing functions to define or update a function description model for the website. In addition to performing functions of a website, information process 10 may request that a human perform certain tasks that a machine cannot perform (e.g., prepare an electronic signature). In this manner, human intervention may be requested to supplement automated processing of discrete tasks.

As discussed above, information process 10 may execute 566 the plurality of discrete tasks (e.g., discrete tasks 402, 404, 406, 408) on the plurality of machine-accessible public computing platforms (e.g., machine-accessible public computing platforms 370, 372, 374, 376) via the cloud-based computing resource (e.g., cloud-based computing resource 600).

When executing 566 the plurality of discrete tasks (e.g., discrete tasks 402, 404, 406, 408) on the plurality of machine-accessible public computing platforms (e.g., machine-accessible public computing platforms 370, 372, 374, 376) via the cloud-based computing resource (e.g., cloud-based computing resource 600), information process 10 may define 568 a plurality of discrete computing processes (e.g., computing processes 602) on the cloud-based computing resource (e.g., cloud-based computing resource 600).

Examples of the plurality of discrete computing processes (e.g., computing processes 602) may include: one or more virtual machines; one or more containers; and one or more unikernals.

Virtual Machines: As is known in the art, a virtual machine (VM) is the virtualization/emulation of a computer system. Virtual machines may be based on computer architectures and may provide functionality of a physical computer, wherein their implementations may involve specialized hardware, software, or a combination. Virtual machines may differ and are organized by their function. For example, system virtual machines (also termed full virtualization VMs) may provide a substitute for a real machine. System virtual machines may provide functionality needed to execute entire operating systems. A hypervisor may use native execution to share and manage hardware, allowing for multiple environments that are isolated from one another, yet exist on the same physical machine. Modern hypervisors may use hardware-assisted virtualization, virtualization-specific hardware, primarily from the host CPUs. Process virtual machines may be designed to execute computer programs in a platform-independent environment.

Containers: As is known in the art, virtualization is an operating system paradigm in which the kernel allows the existence of multiple isolated user space instances. Such instances (called containers, zones, virtual private servers, partitions, virtual environments, virtual kernels, or jails) may look like real computers from the point of view of programs running in them. A computer program running on an ordinary operating system may see all resources (e.g., connected devices, files and folders, network shares, CPU power, quantifiable hardware capabilities) of that computer. However, programs running inside of a container can only see the container's contents and devices assigned to the container.

Unikernels: As is known in the art, a unikernel is a specialized, single address space machine image constructed by using library operating systems. A developer selects, from a modular stack, the minimal set of libraries that correspond to the OS constructs required for the application to run. These libraries may then be compiled with the application and configuration code to build sealed, fixed-purpose images (unikernels) that run directly on a hypervisor or hardware without an intervening OS such as Linux or Windows. Thousands of unikernels may run on the same hardware, thus meeting the aspirational objective of the triple-order rate. Unikernals have the security of a virtual machine and are stripped down to the bare essentials of running code inside processes without the overhead of an entire OS' device support. With a reduced memory footprint, a unikernal can startup in less than 125 milliseconds. Further, unikernals may be managed by Kubernetes (automatic orchestration).

When executing 566 the plurality of discrete tasks on the plurality of machine-accessible public computing platforms (e.g., machine-accessible public computing platforms 370, 372, 374, 376) via the cloud-based computing resource (e.g., cloud-based computing resource 600), information process 10 may utilize 570 the plurality of discrete computing processes (e.g., computing processes 602) to execute the plurality of discrete tasks (e.g., discrete tasks 402, 404, 406, 408) on the plurality of machine-accessible public computing platforms (e.g., machine-accessible public computing platforms 370, 372, 374, 376).

As discussed above, information process 10 may determine 572 if any of the plurality of discrete tasks (e.g., discrete tasks 402, 404, 406, 408) failed to achieve its discrete goal, wherein "failing to achieve its discrete goal" may include one or more of:

An immediate total failure of the discrete goal: For example, if information process 10 accesses website 100 to purchase the 1,000,000 pair of surgical gloves . . . only to find out that website 100 does not have any surgical gloves available, information process 10 may consider this to be an immediate total failure of the discrete goal.

An immediate partial failure of the discrete goal: For example, if information process 10 accesses website 100 to purchase the 1,000,000 pair of surgical gloves . . . only to find out that website 100 only has 500,000 pair of surgical gloves available, information process 10 may consider this to be an immediate partial failure of the discrete goal.

A retroactive total failure of the discrete goal: For example, if information process 10 accesses website 100 to purchase the 1,000,000 pair of surgical gloves and purchases the same . . . only to find out that website 100 fails to ship any surgical gloves (e.g., due to them being backordered or systemic failure), information process 10 may consider this to be a retroactive total failure of the discrete goal.

A retroactive partial failure of the discrete goal: For example, if information process 10 accesses website 100 to purchase the 1,000,000 pair of surgical gloves and purchases the same . . . only to find out that website 100 shipped only 500,000 surgical gloves (e.g., due to them being backordered or systemic failure), information process 10 may consider this to be a retroactive partial failure of the discrete goal.

As discussed above, if a specific discrete task failed to achieve its discrete goal, information process 10 may define 574 a substitute discrete task having a substitute discrete goal and may execute 576 the substitute discrete task.

Grokit System (Supply Chain):

As will be discussed below in greater detail, the above-described discrete systems (e.g., DataFi, ParaLogue & ParaFlow) may be combined to form an end-to-end supply chain management platform that enables the navigation of a plurality of websites (e.g., websites 100, 112, 114, 116) without the need for human intervention, thus enabling the automated & distributed execution of complex tasks (e.g., complex task 400). As discussed above, complex task 400 may include the purchase of 1,000,000 pair of surgical gloves for less than $20 per hundred pair and delivered by 1 Jan. 2022.

Figure 14:
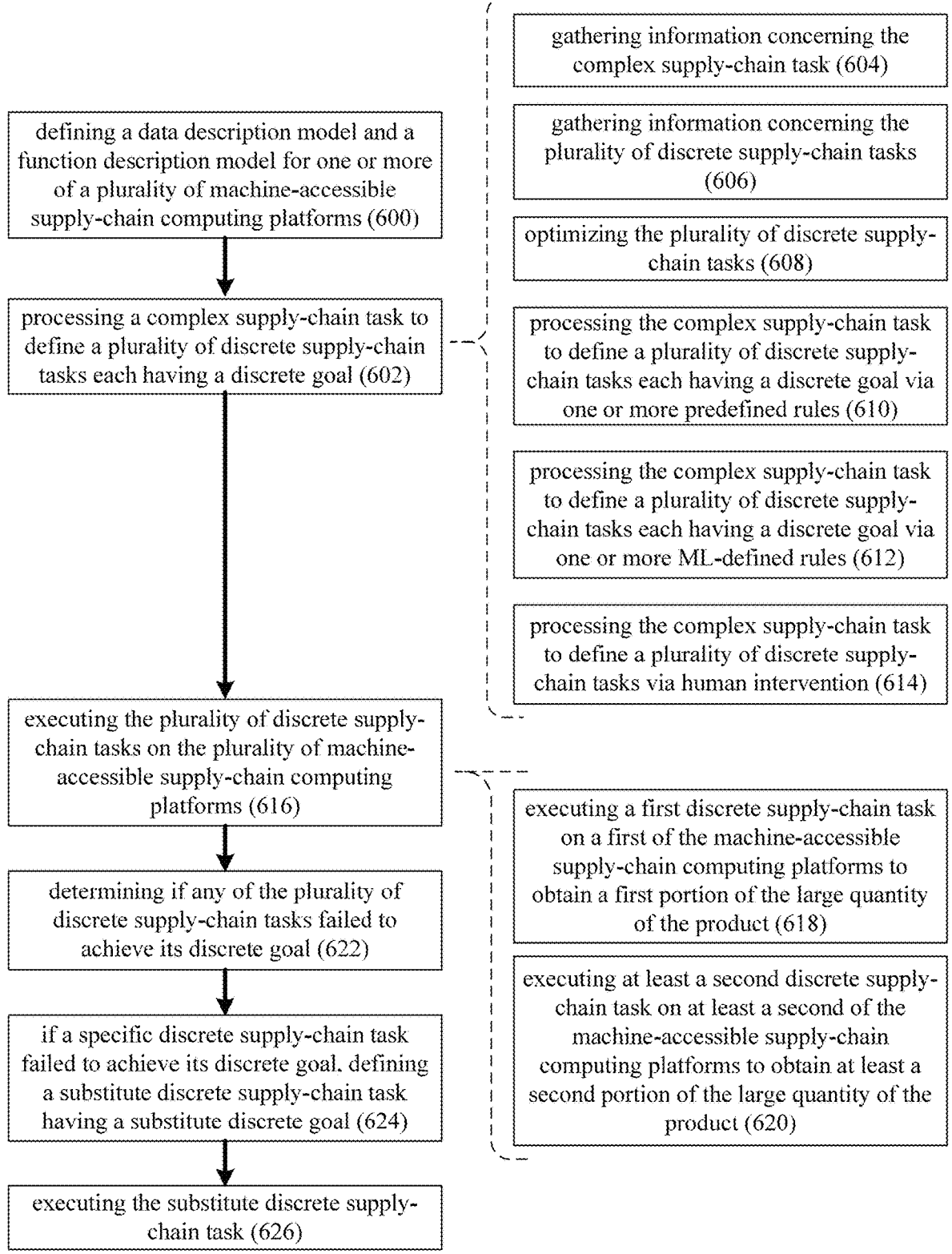
FIG. 14 is another flowchart of the information process of FIG. 1 according to an embodiment of the present disclosure.

Referring also to FIG. 14 and as discussed above, information process 10 may define 600 a data description model (e.g., data description models 58, 350, 354, 358) and a function description model (e.g., function description models 66, 352, 356, 360) for one or more of a plurality of machine-accessible supply-chain computing platforms (e.g., machine-accessible public computing platforms 370, 372, 374, 376). The plurality of machine-accessible supply-chain computing platforms (e.g., machine-accessible public computing platforms 370, 372, 374, 376) may include a plurality of ecommerce computing platforms coupled to the internet.

As discussed above, information process 10 may process 602 a complex supply-chain task (e.g., complex task 400) to define a plurality of discrete supply-chain tasks (e.g., discrete tasks 402, 404, 406, 408) each having a discrete goal, wherein the complex supply-chain task (e.g., complex task 400) may be based upon a defined goal (e.g., defined goal 418).

As discussed above and when processing 602 the complex supply-chain task (e.g., complex task 400) to define a plurality of discrete supply-chain tasks (e.g., discrete tasks 402, 404, 406, 408) each having a discrete goal, information process 10 may:

gather 604 information concerning the complex supply-chain task (e.g., complex task 400), in the manner described above;

gather 606 information concerning the plurality of discrete supply-chain tasks (e.g., discrete tasks 402, 404, 406, 408), in the manner described above; and/or optimize 608 the plurality of discrete supply-chain tasks (e.g., discrete tasks 402, 404, 406, 408), in the manner described above.

Additionally/alternatively and when processing 602 the complex supply-chain task (e.g., complex task 400) to define a plurality of discrete supply-chain tasks (e.g., discrete tasks 402, 404, 406, 408) each having a discrete goal, information process 10 may:

Process 610 the complex supply-chain task (e.g., complex task 400) to define a plurality of discrete supply-chain task (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 610 the complex supply-chain task (e.g., complex task 400) to define a plurality of discrete supply-chain task (e.g., discrete tasks 402, 404, 406, 408).

Process 612 the complex supply-chain task (e.g., complex task 400) to define a plurality of discrete supply-chain task (e.g., discrete tasks 402, 404, 406, 408) each having a discrete goal via one or more ML-defined rules. For example, as orders are processed by information process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 612 the complex supply-chain task (e.g., complex task 400) to define a plurality of discrete supply-chain task (e.g., discrete tasks 402, 404, 406, 408).

Process 614 the complex supply-chain task (e.g., complex task 400) to define a plurality of discrete supply-chain task (e.g., discrete tasks 402, 404, 406, 408) via human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 614 the complex supply-chain task (e.g., complex task 400) to define a plurality of discrete supply-chain task (e.g., discrete tasks 402, 404, 406, 408). As discussed above, defining a plurality of discrete tasks (e.g., discrete tasks 402, 404, 406, 408) via human intervention may include determining that the one or more functions defined for the plurality of function description models for the plurality of websites are unable to perform one of the discrete tasks. Accordingly, information process 10 may provide a request for human intervention for input regarding the discrete task. For example, information process 10 may provide a request to a human (e.g., user 42) to perform a particular function on the website to supplement the function description model for that website. In this manner, information process 10 may identify missing functionality in one or more function description models and may associate user interactions with missing functions to define or update a function description model for the website. In addition to performing functions of a website, information process 10 may request that a human perform certain tasks that a machine cannot perform (e.g., prepare an electronic signature). In this manner, human intervention may be requested to supplement automated processing of discrete tasks.

As discussed above, information process 10 may execute 616 the plurality of discrete supply-chain task (e.g., discrete tasks 402, 404, 406, 408) on the plurality of machine-accessible supply-chain computing platforms (e.g., machine-accessible public computing platforms 370, 372, 374, 376).

When executing 616 the plurality of discrete supply-chain task (e.g., discrete tasks 402, 404, 406, 408) on the plurality of machine-accessible supply-chain computing platforms (e.g., machine-accessible public computing platforms 370, 372, 374, 376), information process 10 may: execute 618 a first discrete supply-chain task (e.g., discrete task 402) on a first of the machine-accessible supply-chain computing platforms (e.g., machine-accessible public computing platforms 370) to obtain a first portion of the large quantity of the product (e.g., the 1,000,000 pair of surgical gloves); and execute 620 at least a second discrete supply-chain task (e.g., one or more of discrete task 404, 406, 408) on at least a second of the machine-accessible supply-chain computing platforms (e.g., machine-accessible public computing platforms 372, 374, 376) to obtain at least a second portion of the large quantity of the product (e.g., the 1,000,000 pair of surgical gloves).

Accordingly, the complex supply-chain task (e.g., complex task 400) may be broken down into a plurality of smaller tasks (e.g., discrete tasks 402, 404, 406, 408) that may be executed across a plurality of computers (e.g., machine-accessible public computing platforms 370, 372, 374, 376), thus enabling a task (e.g., the purchase of 1,000,000 pair of surgical gloves) that would likely not be executable on a single ecommerce website (e.g., website 100) to be executed in a distributed fashion across a plurality of ecommerce websites (e.g., websites 100, 112, 114, 116).

As discussed above, information process 10 may determine 622 if any of the plurality of discrete supply-chain task (e.g., discrete tasks 402, 404, 406, 408) failed to achieve its discrete goal, wherein "failing to achieve its discrete goal" may include one or more of:

An immediate total failure of the discrete goal: For example, if information process 10 accesses website 100 to purchase the 1,000,000 pair of surgical gloves . . . only to find out that website 100 does not have any surgical gloves available, information process 10 may consider this to be an immediate total failure of the discrete goal.

An immediate partial failure of the discrete goal: For example, if information process 10 accesses website 100 to purchase the 1,000,000 pair of surgical gloves . . . only to find out that website 100 only has 500,000 pair of surgical gloves available, information process 10 may consider this to be an immediate partial failure of the discrete goal.

A retroactive total failure of the discrete goal: For example, if information process 10 accesses website 100 to purchase the 1,000,000 pair of surgical gloves and purchases the same . . . only to find out that website 100 fails to ship any surgical gloves (e.g., due to them being backordered or systemic failure), information process 10 may consider this to be a retroactive total failure of the discrete goal.

A retroactive partial failure of the discrete goal: For example, if information process 10 accesses website 100 to purchase the 1,000,000 pair of surgical gloves and purchases the same . . . only to find out that website 100 shipped only 500,000 surgical gloves (e.g., due to them being backordered or systemic failure), information process 10 may consider this to be a retroactive partial failure of the discrete goal.

As discussed above, if a specific discrete supply-chain task failed to achieve its discrete goal, information process 10 may define 624 a substitute discrete supply-chain task having a substitute discrete goal and may execute 626 the substitute discrete supply-chain task.

Grokit System (Automated Navigation):

As will be discussed below in greater detail, the above-described discrete systems (e.g., DataFi, ParaLogue & ParaFlow) may be combined to form an end-to-end platform that enables the navigation of a plurality of websites (e.g., websites 100, 112, 114, 116) via an orchestrating computing system (i.e., removing humans from the equation), thus enabling the automated & distributed execution of complex tasks (e.g., complex task 400). As discussed above, complex task 400 may include the purchase of 1,000,000 pair of surgical gloves for less than $20 per hundred pair and delivered by 1 Jan. 2022.

Figure 15:
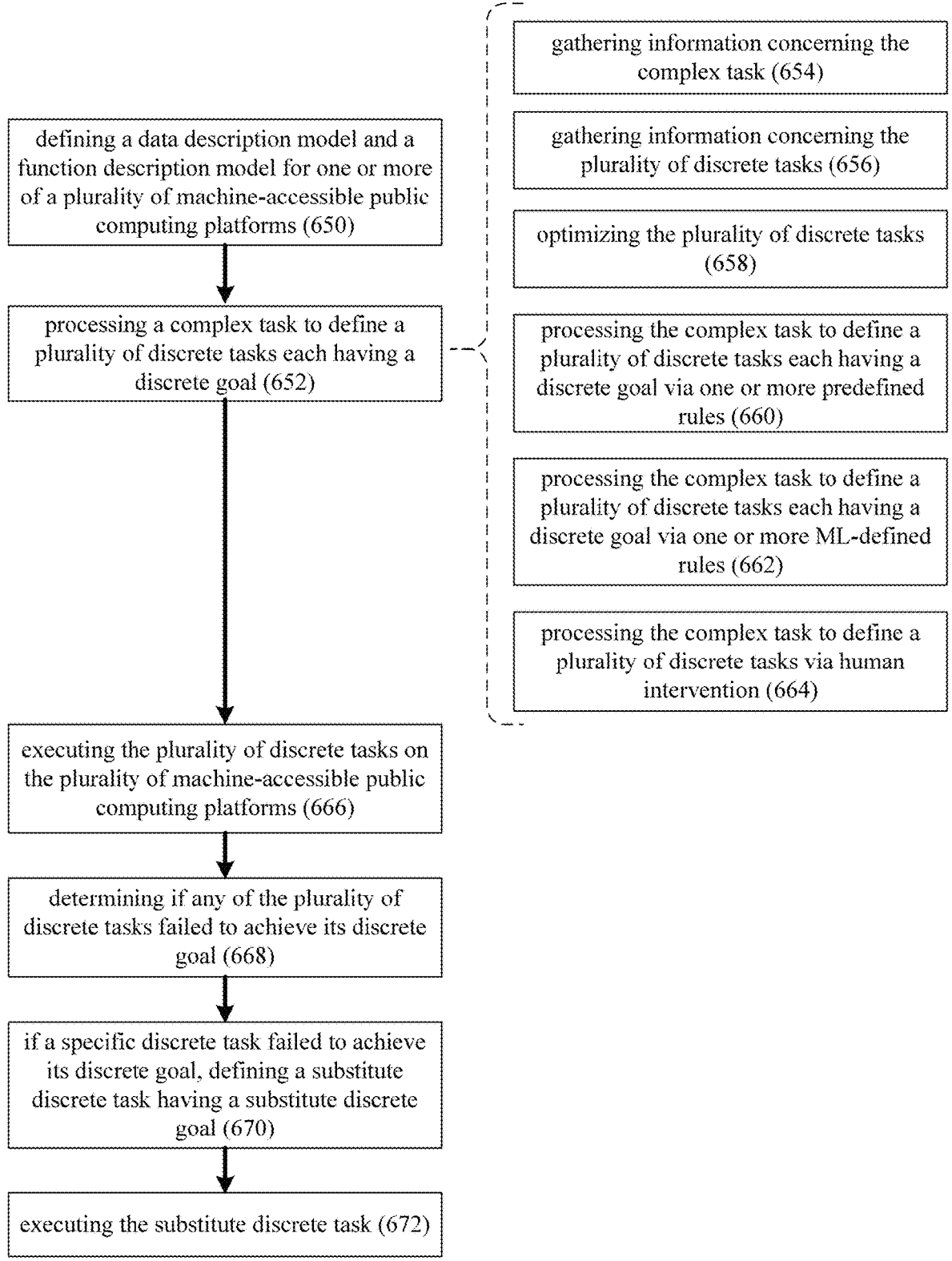
FIG. 15 is another flowchart of the information process of FIG. 1 according to an embodiment of the present disclosure.

Referring also to FIG. 15 and as discussed above, information process 10 may define 650 a data description model (e.g., data description models 58, 350, 354, 358) and a function description model (e.g., function description models 66, 352, 356, 360) for one or more of a plurality of machine-accessible supply-chain computing platforms (e.g., machine-accessible public computing platforms 370, 372, 374, 376). The plurality of machine-accessible supply-chain computing platforms (e.g., machine-accessible public computing platforms 370, 372, 374, 376) may include a plurality of ecommerce computing platforms coupled to the internet.

As discussed above, information process 10 may process 652 a complex task (e.g., complex task 400) to define a plurality of discrete tasks (e.g., discrete tasks 402, 404, 406, 408) each having a discrete goal, wherein the complex supply-chain task (e.g., complex task 400) may be based upon a defined goal (e.g., defined goal 418).

As discussed above and when processing 652 the complex task (e.g., complex task 400) to define a plurality of discrete tasks (e.g., discrete tasks 402, 404, 406, 408) each having a discrete goal, information process 10 may:
- gather 654 information concerning the complex supply-chain task (e.g., complex task 400), in the manner described above;
- gather 656 information concerning the plurality of discrete supply-chain tasks (e.g., discrete tasks 402, 404, 406, 408), in the manner described above; and/or
- optimize 658 the plurality of discrete supply-chain tasks (e.g., discrete tasks 402, 404, 406, 408), in the manner described above.

Additionally/alternatively and when processing 652 the complex task (e.g., complex task 400) to define a plurality of discrete tasks (e.g., discrete tasks 402, 404, 406, 408) each having a discrete goal, information process 10 may:
- Process 660 the complex supply-chain task (e.g., complex task 400) to define a plurality of discrete supply-chain task (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 660 the complex supply-chain task (e.g., complex task 400) to define a plurality of discrete supply-chain tasks (e.g., discrete tasks 402, 404, 406, 408).
- Process 662 the complex supply-chain task (e.g., complex task 400) to define a plurality of discrete supply-chain task (e.g., discrete tasks 402, 404, 406, 408) each having a discrete goal via one or more ML-defined rules. For example, as orders are processed by information process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 662 the complex supply-chain task (e.g., complex task 400) to define a plurality of discrete supply-chain tasks (e.g., discrete tasks 402, 404, 406, 408).
- Process 664 the complex supply-chain task (e.g., complex task 400) to define a plurality of discrete supply-chain task (e.g., discrete tasks 402, 404, 406, 408) via human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 664 the complex supply-chain task (e.g., complex task 400) to define a plurality of discrete supply-chain tasks (e.g., discrete tasks 402, 404, 406, 408). As discussed above, defining a plurality of discrete tasks (e.g., discrete tasks 402, 404, 406, 408) via human intervention may include determining that the one or more functions defined for the plurality of function description models for the plurality of websites are unable to perform one of the discrete tasks. Accordingly, information process 10 may provide a request for human intervention for input regarding the discrete task. For example, information process 10 may provide a request to a human (e.g., user 42) to perform a particular function on the website to supplement the function description model for that website. In this manner, information process 10 may identify missing functionality in one or more function description models and may associate user interactions with missing functions to define or update a function description model for the website. In addition to performing functions of a website, information process 10 may request that a human perform certain tasks that a machine cannot perform (e.g., prepare an electronic signature). In this manner, human intervention may be requested to supplement automated processing of discrete tasks.

As discussed above, information process 10 may execute 666 the plurality of discrete tasks (e.g., discrete tasks 402, 404, 406, 408) on the plurality of machine-accessible public computing platforms (e.g., machine-accessible public computing platforms 370, 372, 374, 376) and may determine 668 if any of the plurality of discrete tasks (e.g., discrete tasks 402, 404, 406, 408) failed to achieve its discrete goal. As discussed above, "failing to achieve its discrete goal" may include one or more of:
- An immediate total failure of the discrete goal: For example, if information process 10 accesses website 100 to purchase the 1,000,000 pair of surgical gloves . . . only to find out that website 100 does not have any surgical gloves available, information process 10 may consider this to be an immediate total failure of the discrete goal.
- An immediate partial failure of the discrete goal: For example, if information process 10 accesses website 100 to purchase the 1,000,000 pair of surgical gloves . . . only to find out that website 100 only has 500,000 pair of surgical gloves available, information process 10 may consider this to be an immediate partial failure of the discrete goal.
- A retroactive total failure of the discrete goal: For example, if information process 10 accesses website 100 to purchase the 1,000,000 pair of surgical gloves and purchases the same . . . only to find out that website 100 fails to ship any surgical gloves (e.g., due to them being backordered or systemic failure), information process 10 may consider this to be a retroactive total failure of the discrete goal.
- A retroactive partial failure of the discrete goal: For example, if information process 10 accesses website 100 to purchase the 1,000,000 pair of surgical gloves and purchases the same . . . only to find out that website 100 shipped only 500,000 surgical gloves (e.g., due to them being backordered or systemic failure), information process 10 may consider this to be a retroactive partial failure of the discrete goal.

As discussed above, if a specific discrete supply-chain task failed to achieve its discrete goal, information process 10 may define 670 a substitute discrete supply-chain task having a substitute discrete goal and may execute 672 the substitute discrete supply-chain task.

Grokit System Features:

As discussed above, the above-described discrete systems (e.g., DataFi, ParaLogue & ParaFlow) may be combined to form an end-to-end platform that enables the navigation of a plurality of websites (e.g., websites 100, 112, 114, 116) without the need for human intervention, thus enabling the automated & distributed execution of complex tasks (e.g., complex task 400).

As will be discussed below in greater detail, information process 10 may include various additional features that may enhance the functionality of the platform discussed above.

Ontology:

Discussed below is the manner in which information process 10 may generate the above-described ontology (e.g., ontology data 124).

As discussed above, being different webpages within a website may use different descriptors (e.g., descriptors 56), in order to properly utilize such data (e.g., descriptors 56), information process 10 may process this data to transform it from raw information (e.g., descriptors 56 in their original disjointed form) into useable information 60 (in a normalized/homogenized form). Further and as discussed above, being different websites (e.g., websites 100, 112, 114, 116) may use different descriptors (e.g., descriptors 56) within their webpages, information process 10 may process this data (e.g., descriptors) to transform it from its original disjointed form into useable (e.g., normalized/homogenized) information (e.g., ontology data 124). Accordingly and when generating ontology data 124, information process 10 may process the useable information included within each of the plurality of data description models (e.g., plurality of data description models 118) to amend/normalize/homogenize this useable information across the plurality of websites (e.g., plurality of websites 120).

Figure 16:
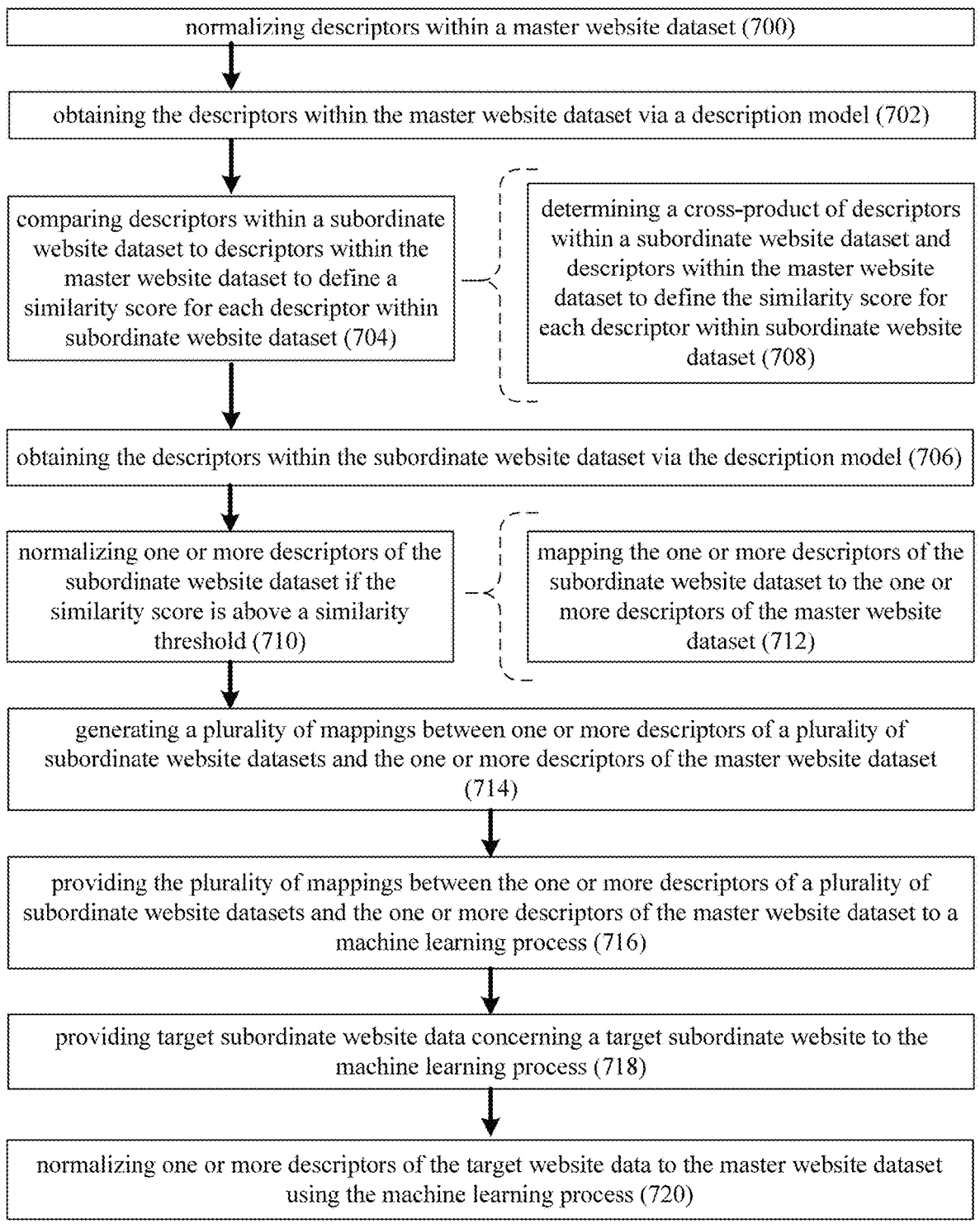
FIG. 16 is another flowchart of the information process of FIG. 1 according to an embodiment of the present disclosure.

The following discussion concerns one particular example of the manner in which ontology data 124 may be generated. Referring also to FIG. 16, information process 10 may normalize 700 descriptors (e.g., descriptors 56) within a master website dataset (e.g., a website dataset associated with website 100), wherein these descriptors (e.g., descriptors 56) within the master website dataset (e.g., a website dataset associated with website 100) may be obtained 702 via a description model (e.g., a data description model and/or a function description model).

As discussed above, the one or more descriptors (e.g., descriptors 56) may include one or more of: a property descriptor; an attribute descriptor; and a value descriptor.

Property Descriptors: A property descriptor may identify the field/area/region name of highly pertinent portion of a website, wherein these fields/areas/regions are common on a particular type of website. Accordingly, if website 100 is an ecommerce website, examples of such property descriptors may include but are not limited to: a title field/area/region; a picture field/area/region; a description field/area/region; and a price field/area/region.

Attribute Descriptors: An attribute descriptor may identify the field/area/region name of supplemental portion of a website, wherein these fields/areas/regions supplement the above-described property descriptors. Accordingly, if website 100 is an ecommerce website, examples of such attribute descriptors may include but are not limited to: a size field/area/region; a color field/area/region; a material field/area/region; and a brand field/area/region.

Value Descriptors: A value descriptor may identify a value for one of the above-described property descriptors and/or attribute descriptors. For example and with respect to website 100, the value descriptor for the "size" attribute descriptor may be "Large"; the value descriptor for the "color" attribute descriptor may be "California Blue"; the value descriptor for the "price" property descriptor may be "$19.98"; and the value descriptor for the "title" property descriptor may be "Synthetic Nitrile Blue Disposable Gloves".

For the following example, assume that the master website dataset (e.g., a website dataset associated with website 100) includes useable information 60 stored within database 62 that is included within and/or associated with data description model 58 associated with website 100 (i.e., the master website), wherein useable information 60 was generated by information process 10 normalizing 700 descriptors 56. As discussed above, being different websites may use different descriptors within their webpages, information process 10 may process this data (e.g., descriptors) to transform it from its original disjointed form into useable (e.g., normalized/homogenized) information (e.g., ontology data 124) that is useable across a plurality of websites (e.g., plurality of websites 120). When normalizing 700 descriptors 56, information process 10 may compare pairs of descriptors for similarity. For example, information process 10 may generate a user interface configured to present a listing of the comparison of descriptors 56. The user interface may enable a user (e.g., user 36) to select which pairs of descriptors to normalize (e.g., based upon a similarity score or other comparison metric). In this example, a user may selectively approve or reject the normalization of descriptors within the master website dataset. In another example, information process 10 may utilize one or more thresholds to determine when to and/or when to not automatically normalize descriptors 56 within website dataset associated with website 100.

Accordingly and in order to homogenize this data (e.g., descriptors) for use across multiple websites (e.g., plurality of websites 120), information process 10 may compare 704 descriptors (e.g., descriptors 72) within a subordinate website dataset (e.g., a website dataset associated with website 112) to descriptors (e.g., useable information 60) within the master website dataset (e.g., a website dataset associated with website 100) to define a similarity score (e.g., similarity scores 74) for each descriptor (e.g., each of descriptors 72) within the subordinate website dataset (e.g., a website dataset associated with website 112). Each similarity score (e.g., each of similarity scores 74) may be one or more of: a value set similarity score (e.g., the similarity between values/value sets, wherein a value set is a domain of possible values); a type similarity score (e.g., integer versus character string); and a string similarity score (e.g., edit distance ... how close are the phrases?). Information process 10 may obtain 706 the descriptors (e.g., descriptors 72) within the subordinate website dataset (e.g., a website dataset associated with website 112) via a description model (e.g., a data description model and/or a function description model).

When comparing 704 descriptors (e.g., descriptors 72) within a subordinate website dataset (e.g., a website dataset associated with website 112) to descriptors (e.g., useable information 60) within the master website dataset (e.g., a website dataset associated with website 100) to define a similarity score (e.g., similarity score 74) for each descriptor (e.g., each of descriptors 72) within the subordinate website dataset (e.g., a website dataset associated with website 112), information process 10 may determine 708 a cross-product of the descriptors (e.g., descriptors 72) within a subordinate website dataset (e.g., a website dataset associated with website 112) and the descriptors (e.g., useable information 60) within the master website dataset (e.g., a website dataset associated with website 100) to define the similarity score (e.g., similarity score 74) for each descriptor (e.g., each of descriptors 72) within the subordinate website dataset (e.g., a website dataset associated with website 112).

As is known in the art, a cross product is a binary operation on two vectors in three-dimensional space $R^3$, and is denoted by the symbol "×". Given two linearly independent vectors a and b, the cross product, a×b (read "a×b") is a vector that is perpendicular to both a and b, and thus normal to the plane containing them. It has many applications in mathematics, physics, engineering, and computer programming. It should not be confused with the dot product (projection product). If two vectors have the same direction or have the exact opposite direction from one another (i.e., they are not linearly independent), or if either one has zero length, then their cross product is zero. More generally, the magnitude of the product equals the area of a parallelogram with the vectors for sides; in particular, the magnitude of the product of two perpendicular vectors is the product of their lengths.

Information process 10 may normalize 710 one of more descriptors (e.g., descriptors 72) of the subordinate website dataset (e.g., a website dataset associated with website 112) if the similarity score (e.g., similarity score 74) is above a similarity threshold (e.g., 95%). For example, the descriptor "Sz" and the descriptor "Size" may have a high similarity score (e.g., 96%); while the descriptor "Title" and the descriptor "Size" may have a low similarity score (e.g., 58%).

As discussed above, normalizing 710 one or more descriptors (e.g., descriptors 72) of the subordinate website dataset (e.g., a website dataset associated with website 112) may include transforming descriptors 72 by: amending descriptors 72; normalizing and/or homogenizing one or more property descriptors; normalizing and/or homogenizing one or more attribute descriptors; and/or normalizing and/or homogenizing one or more value descriptors. As discussed above, amending descriptors 72 may include performing various operations on the descriptors (e.g., removing extra spaces or uncommon characters).

When normalizing 710 one of more descriptors (e.g., descriptors 72) of the subordinate website dataset (e.g., a website dataset associated with website 112) if the similarity score (e.g., similarity score 74) is above a similarity threshold (e.g., 95%), information process 10 may map 712 the one or more descriptors (e.g., descriptors 72) of the subordinate website dataset (e.g., a website dataset associated with website 112) to the one or more descriptors (e.g., descriptors 56) within the master website dataset (e.g., a website dataset associated with website 100). For example, as, the descriptor "Sz" and the descriptor "Size" has a high similarity score (e.g., 96%) that exceeds the similarity threshold (e.g., 95%), information process 10 may map 712 the "Sz" descriptor of the subordinate website dataset (e.g., a website dataset associated with website 112) to the "Size" descriptor within the master website dataset (e.g., a website dataset associated with website 100), thus indicating that the two descriptors are synonymous.

Information process 10 may generate 714 a plurality of mappings (e.g., plurality of mappings 76) between one or more descriptors of a plurality of subordinate website datasets (e.g., website datasets associated with websites 112, 114, 116) and the one or more descriptors of the master website dataset (e.g., a website dataset associated with website 100). Accordingly, information process 10 may process the descriptors associated with (in this example) websites 100, 112, 114, 116 to generate 714 mappings (e.g., plurality of mappings 76) between the descriptors associated with websites 112, 114, 116) and the descriptors associated with website 100, thus forming an end-to-end platform that enables the navigation of websites 100, 112, 114, 116 without the need for human intervention and the automated & distributed execution of complex tasks (e.g., complex task 400).

The above-described normalization may be accomplished in an automated fashion via machine learning process 122. For example, information process 10 may:

provide 716 the plurality of mappings (e.g., plurality of mappings 76) between one or more descriptors of a plurality of subordinate website datasets (e.g., website datasets associated with websites 112, 114, 116) and the one or more descriptors of the master website dataset (e.g., a website dataset associated with website 100) to a machine learning process (e.g., machine learning process 122);

provide 718 target subordinate website data (e.g., descriptors 78) concerning a target subordinate website (e.g., www.targetwebsite.com) to the machine learning process (e.g., machine learning process 122); and normalize 720 one or more descriptors of the target website data (e.g., descriptors 78) to the master website dataset (e.g., a website dataset associated with website 100) using the machine learning process (e.g., machine learning process 122).

ERR (Ephemeral Random Retry):

Discussed below is the manner in which information process 10 may react in response to a failure associated with the execution of the description model (e.g., data description model 58 and/or function description model 66).

As discussed above and once initially defined (in the manner described above), information process 10 may utilize data description model 58 and/or function description model 66 to automatically process the vast majority of webpages within e.g., website 100, as a website (especially an ecommerce website) may include hundreds of thousands of webpages that correspond to the hundreds of thousands of products they sell. As discussed above and once fully defined, data description model 58 and/or function description model 66 may enable information process 10 to autonomously navigate and/or effectuate the functionality of e.g., website 100 without any human intervention, as data description model 58 and/or function description model 66 may (generally speaking) function as a roadmap that allows for automated navigation of (in this example) website 100. Additionally, information process 10 may execute data description model 58 and/or function description model 66 to populate one or more databases with at least a portion of data from a website.

Unfortunately and as could be imagined, website 100 may change over time, wherein: existing webpages/products may be removed; existing webpages/products may be revised; and/or new webpages/products may be added. As could be imagined, such changes may complicate the ability of information process 10 to autonomously navigate and effectuate e.g., website 100.

Figure 17:
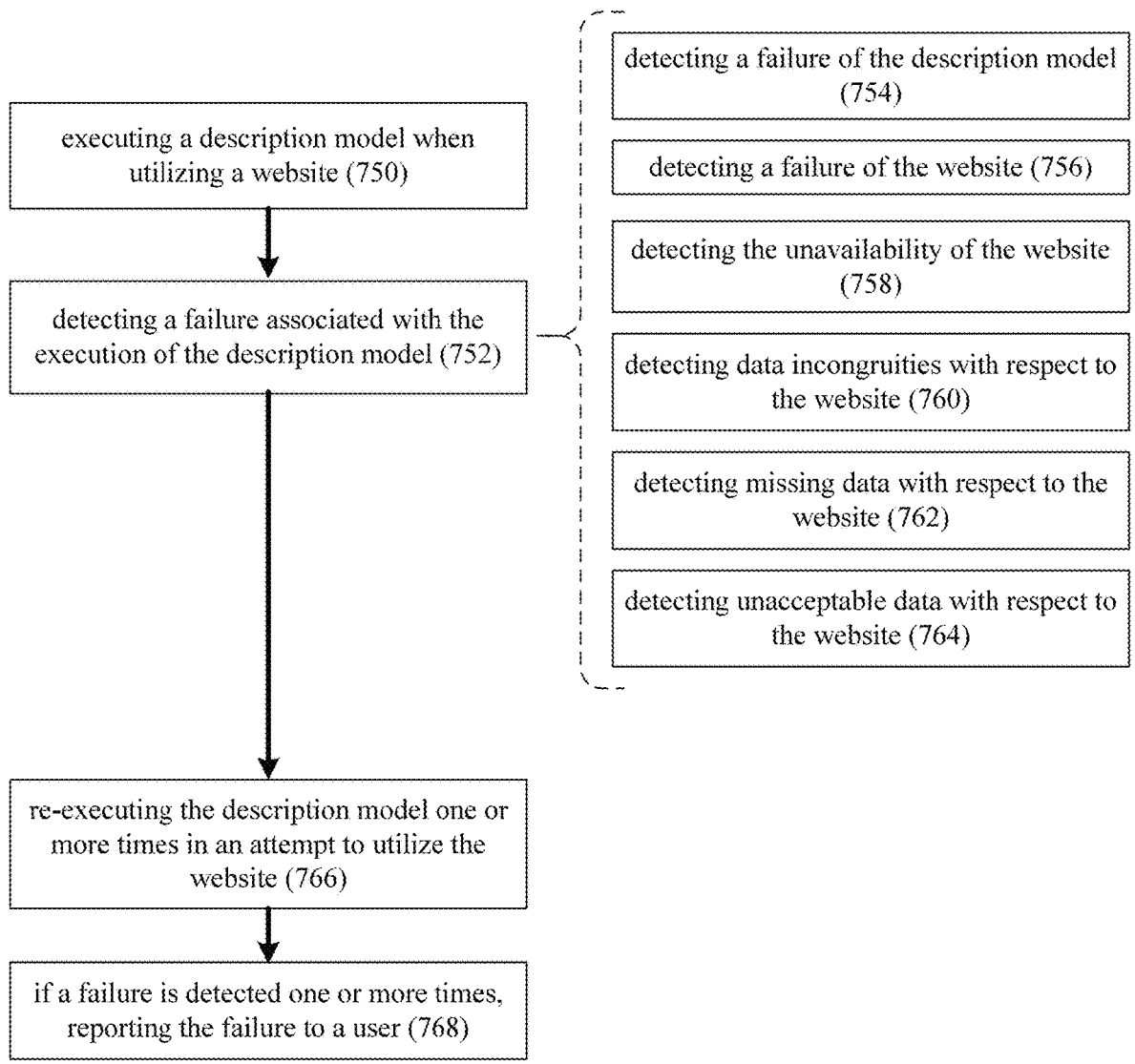
FIG. 17 is another flowchart of the information process of FIG. 1 according to an embodiment of the present disclosure.

Referring also to FIG. 17, information process 10 may execute 750 a description model (e.g., data description model 58 and/or function description model 66) when utilizing a website (e.g., website 100). As discussed above, ontology data (e.g., ontology data 124) may define acceptable values for data description model 58 and/or function description model 66. Specifically, useable data 60 within database 62 included within and/or associated with data description model 58 may define the descriptors of website 10, while useable data 68 within database 70 included within and/or associated with function description model 66 may define the functions of website 10.

Generally speaking, information process 10 may utilize data description model 58 and/or function description model 66 to autonomously navigate and/or effectuate the functionality of e.g., website 100. Unfortunately and as would be expected, navigation failures may occur due to changes made to (in this example) website 100 (e.g., the adding/removing/modifying of webpages).

Accordingly, information process 10 may detect 752 a failure associated with the execution of the description model (e.g., data description model 58 and/or function description model 66), which may include: detecting 754 a failure of the description model (e.g., data description model 58/function description model 66); detecting 756 a failure of the website (e.g., website 100); detecting 758 the unavailability of the website (e.g., website 100); detecting 760 data incongruities with respect to the website (e.g., website 100); detecting 762 missing data with respect to the website (e.g., website 100); and detecting 764 unacceptable data with respect to the website (e.g., website 100).

A failure of the description model may include but is not limited to a general/system failure of the description model (e.g., data description model 58/function description model 66). For example and for some unspecific reason, the description model (e.g., data description model 58/function description model 66) may no longer function properly or has been corrupted.

A failure of the website may include but is not limited to the website (e.g., website 100) no longer responding. For example, the website (e.g., website 100) may not be responding due to a technical issue with the website (e.g., website 100).

Unavailability of the website may include but is not limited to the website (e.g., website 100) no longer being available. For example, the website (e.g., website 100) may have been taken offline (due to e.g., a company ceasing operations) and/or the server effectuating website 100 (e.g., machine-accessible public computing platform 370) may have gone down.

Data incongruities with respect to the website may include but is not limited various data inconsistencies/inaccuracies. For example, data inconsistences/inaccuracies may be detected between what is defined within the description model (e.g., data description model 58/function description model 66) and what is actually present/defined within the website (e.g., website 100). Data inconsistencies may also include descriptor anomalies (e.g., property descriptors, attribute descriptors, and/or value descriptors) between what is defined within the description model (e.g., data description model 58/function description model 66) and what is actually present/defined within the website (e.g., website 100). In another example, data inconsistencies may also include inconsistencies between different portions of the website. For example, suppose an ecommerce website includes various categories of products and a total number of products for a particular category is listed on the website. Now, suppose that after executing the description model (e.g., data description model 58/function description model 66), information process 10 executes the description model on a different number of products (e.g., more or less than the displayed total number of products). As the number of products processed from the website and the listed number of products do not match (e.g., the listed number of products includes duplicate products that are only processed by the description model once), information process 10 may detect 760 a data incongruity.

Missing data with respect to the website may include but is not limited to data that is no longer present within the website (e.g., website 100). For example and as discussed above, products/webpages may be removed/revised from the website (e.g., website 100), resulting in the description model (e.g., data description model 58/function description model 66) identifying data that is not currently present within the website (e.g., website 100).

Unacceptable data with respect to the website (e.g., website 100) may include but is not limited to data that is damaged/nonresponsive within the website (e.g., website 100). For example, some of the data and/or functionality within the website (e.g., website 100) may become corrupt, resulting in the website (e.g., website 100) not functioning/responding properly.

In the event that a failure is detected 752 concerning the execution of the description model (e.g., data description model 58 and/or function description model 66), information process 10 may re-execute 766 the description model (e.g., data description model 58 and/or function description model 66) one or more times in an attempt to utilize the website (e.g., website 100). For example, information process 10 may attempt to re-execute 766 data description model 58 and/or function description model 66 e.g., three more times in an attempt to utilize the website (e.g., website 100).

If a failure is detected for these (in this example) three additional times, information process 10 may report 768 the failure to a user (e.g., user 42). When such a failure is reported, information process 10 may reacquire data (e.g., descriptors 56 and functions 64) so that the description model (e.g., data description model 58 and/or function description model 66) may be updated to address such a failure.

Sleuth:

Discussed below is the manner in which information process 10 may maintain the description model (e.g., data description model 58 and/or function description model 66).

As discussed above, being different webpages within a website may use different descriptors (e.g., descriptors 56), in order to properly utilize such data (e.g., descriptors 56), information process 10 may process this data to transform it from raw information (e.g., descriptors 56 in their original disjointed form) into useable information 60 (in a normalized/homogenized form). Further and as discussed above, being different websites (e.g., websites 100, 112, 114, 116) may use different descriptors (e.g., descriptors 56) within their webpages, information process 10 may process this data (e.g., descriptors) to transform it from its original disjointed form into useable (e.g., normalized/homogenized) information (e.g., ontology data 124). Accordingly and when generating ontology data 124, information process 10 may process the useable information included within each of the plurality of data description models (e.g., plurality of data description models 118) to amend/normalize/homogenize this useable information across the plurality of websites (e.g., plurality of websites 120).

As also discussed above, websites (e.g., website 100) may change overtime, wherein: existing webpages/products may be removed; existing webpages/products may be revised; and/or new webpages/products may be added. Accordingly and when such changes occur, the description model (e.g., data description model 58 and/or function description model 66) associated with the website may no longer be accurate, as the underlying data (e.g., descriptors 56 and functions 64) has changed.

Additionally and as discussed above, information process 10 may execute data description model 58 and/or function description model 66 to populate one or more databases with at least a portion of data from a website. For example, with description models (e.g., data description model 58 and/or function description model 66) defined for website 100, information process 10 may execute data description model 58 and/or function description model 66 to obtain useable information from website 100 and populate a database (e.g., database 62 and/or database 70) with at least a portion of this useable information. In an example where website 100 is an ecommerce website, website 100 may include hundreds of thousands of webpages to correspond to the hundreds of thousands of products they sell. As such, information process 10 may populate database 62 and/or database 70 with useable information pertaining to the products from the hundreds of thousands of webpages by defining and executing data description model 58 and/or function description model 66 on the webpages of website 100. In this manner, information process 10 may allow for the population of one or more databases representative of the useable information of the various webpages of a website.

Figure 18:
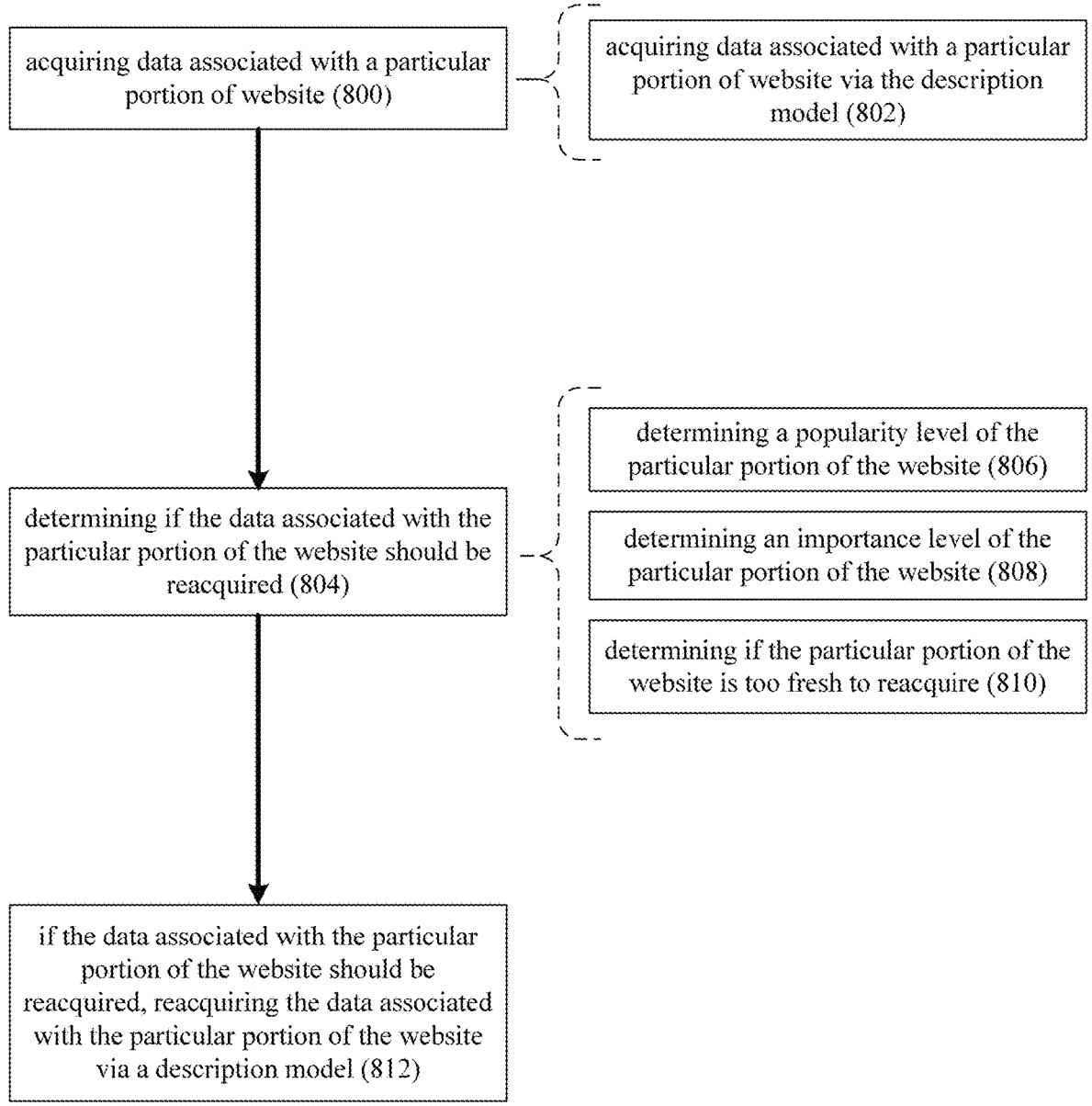
FIG. 18 is another flowchart of the information process of FIG. 1 according to an embodiment of the present disclosure.

Accordingly and as will be discussed below in greater detail, information process 10 may be configured to periodically refresh such underlying data (e.g., descriptors 56 and functions 64) so that the description model (e.g., data description model 58 and/or function description model 66) associated with the website (e.g., website 100) remains fresh and accurate. Referring also to FIG. 18 and as discussed above, information process 10 may acquire 800 data (e.g., descriptors 56 and functions 64) associated with a particular portion of website (e.g., website 100), wherein the particular portion of website (e.g., website 100) may be associated with a product/service offered for sale. As discussed above, information process 10 may systematically process the various webpages included within (in this example) website 100 to acquire 800 data (e.g., descriptors 56 and functions 64). As also discussed above, when acquiring 800 data (e.g., descriptors 56 and functions 64) associated with a particular portion of website (e.g., website 100), information process 10 may acquire 802 data (e.g., descriptors 56 and functions 64) associated with a particular portion of website (e.g., website 100) via the description model (e.g., data description model 58 and/or function description model 66).

As stated above, over time this data (e.g., descriptors 56 and functions 64) may grow stale due to age. Accordingly, information process 10 may determine 804 if the data (e.g., descriptors 56 and functions 64) associated with the particular portion of the website (e.g., website 100) should be reacquired. For example, information process 10 may balance how often the underlying data (e.g., descriptors 56 and functions 64) should be reacquired. As discussed above, acquiring data associated with a website may include executing the description model (e.g., data description model 58 and/or function description model 66) defined for the website on hundreds or thousands of webpages. As this may consume significant computing resources and processing time for a website host and/or computing devices executing the description model (data description model 58 and/or function description model 66), information process 10 may determine 804 when to reacquire the data (e.g., descriptors 56 and functions 64) associated with the particular portion of the website (e.g., website 100).

When determining 804 if the data (e.g., descriptors 56 and functions 64) associated with the particular portion of the website (e.g., website 100) should be reacquired, information process 10 may: determine 806 a popularity level of the particular portion of the website (e.g., website 100); determine 808 an importance level of the particular portion of the website (e.g., website 100); and determine 810 if the particular portion of the website (e.g., website 100) is too fresh to reacquire.

When determining 806 a popularity level of the particular portion of the website (e.g., website 100), information process 10 may monitor how often a portion of the website (e.g., website 100) is accessed. For example, information process 10 may receive information indicating when and/or how often the particular portion of website 100 is accessed (e.g., how often users access particular portions of website 100). The information indicating when and/or how often the particular portion of website 100 is accessed may include a reference to a particular portion of the website as defined by the description model (e.g., data description model 58 and/or function description model 66) and/or a reference to the particular portion of website 100 as defined in a database (e.g., database 62 and/or database 70) populated with usable information from the particular portion of website 100. As discussed above, in the event that the data (e.g., descriptors 56 and functions 64) associated with the particular portion of the website (e.g., website 100) is inconsistent/inaccurate/missing/unacceptable, a failure will occur (as described above) and, if the failure is persistent, the inconsistent/inaccurate/missing/unacceptable will be reacquired. Therefore, if a portion of the website (e.g., website 100) is popular and accessed often, the data (e.g., descriptors 56 and functions 64) associated with the particular portion of the website (e.g., website 100) is inherently accurate and (therefore) need not be reacquired. In another example, if a portion of the website (e.g., website 100) is popular and accessed often, the data (e.g., descriptors 56 and functions 64) associated with the particular portion of the website (e.g., website 100) may be reacquired more frequently to ensure consistent data. When determining a popularity level of the particular portion of the website, information process 10 may define a weighting for the popularity level. The weighting for the popularity level may be user-defined and/or automatically defined by information process 10. Accordingly, information process 10 may determine if the data (e.g., descriptors 56 and functions 64) associated with the particular portion of the website (e.g., website 100) should be reacquired based upon the weighting defined for the popularity level.

When determining 808 an importance level of the particular portion of the website (e.g., website 100), information process 10 may monitor how important a portion of the website (e.g., website 100) is. For example and as would be expected, website 100 may offer several products that are their best sellers, wherein these best seller may have a higher level of important assigned to them. Accordingly and when a higher level of importance is assigned to a particular product, information process 10 may more frequently reacquire the data (e.g., descriptors 56 and functions 64) associated with that particular portion of the website (e.g., website 100). When determining an importance level of the particular portion of the website, information process 10 may define a weighting for the importance level. The weighting for the importance level may be user-defined and/or automatically defined by information process 10. Accordingly, information process 10 may determine if the data (e.g., descriptors 56 and functions 64) associated with the particular portion of the website (e.g., website 100) should be reacquired based upon the weighting defined for the importance level.

When determining 810 if the particular portion of the website (e.g., website 100) is too fresh to reacquire, information process 10 may not reacquire data (e.g., descriptors 56 and functions 64) if that data has been recently acquired. For example and when data (e.g., descriptors 56 and functions 64) is acquired, information (e.g., metadata) may be defined for the acquired data (e.g., descriptors 56 and functions 64) that identifies when the data (e.g., descriptors 56 and functions 64) was last acquired. For example, if the data (e.g., descriptors 56 and functions 64) associated with the particular portion of the website (e.g., website 100) was last acquired 10 minutes ago, information process 10 may determine 804 that the data (e.g., descriptors 56 and functions 64) should not be reacquired. Conversely, if the data (e.g., descriptors 56 and functions 64) associated with the particular portion of the website (e.g., website 100) was last acquired 10 days ago, information process 10 may determine 804 that the data (e.g., descriptors 56 and functions 64) should be reacquired. Information process 10 may receive a time-based threshold for reacquiring data from a particular portion of the website and/or may automatically define the time-based threshold for reacquiring data from the particular portion of the website. Accordingly, information process 10 may determine 810 if the particular portion of the website (e.g., website 100) is too fresh to reacquire based upon, at least in part, the time-based threshold.

Accordingly and if the data (e.g., descriptors 56 and functions 64) associated with the particular portion of the website (e.g., website 100) should be reacquired, information process 10 may reacquire 812 the data (e.g., descriptors 56 and functions 64) associated with the particular portion of the website (e.g., website 100) via a description model (e.g., data description model 58 and/or function description model 66) in the fashion described above.

ParaNet (General)

As will be described below, the paranet is a system that maintains a database of distributed actors . . . where these distributed actors all have specific skill sets (which are known to the paranet). A user (human or machine) of the paranet will make a request (simple or complex) and the paranet will process the request and assign one or more actors to perform one or more tasks that are required to address the request based upon the skills of the distributed actors. As will be discussed in greater detail below, a user of the paranet may include human distributed actors and non-human (machine or software) distributed actors.

As discussed above, information process 10 may process websites to define (via DataFi) data description models (i.e., models concerning data within webpages/websites). Additionally and as discussed above, information process 10 may process websites to define (via ParaLogue) function description models (i.e., models concerning functions within webpages/websites). Specifically and as discussed above, a data description model (e.g., data description model 58) may define the data defined within a website (e.g., website 100), while a function description model (e.g., function description model 66) may define the functions available via the website (e.g., website 100). Further and as discussed above, through the use of such a data description model (e.g., data description model 58) and such a function description model (e.g., function description model 66), a website (e.g., website 100) may be navigated without human intervention. Accordingly and as discussed above, the above-described discrete systems (e.g., DataFi, ParaLogue & ParaFlow) may be combined to form an end-to-end platform that enables the navigation of a plurality of websites (e.g., websites 100, 112, 114, 116) without the need for human intervention, thus enabling the automated & distributed execution of complex tasks (e.g., complex task 400).

Accordingly and as will be discussed below in greater detail, through the use of the above-described discrete systems (e.g., DataFi, ParaLogue & ParaFlow), various components/devices/systems that are accessible via a network (e.g., network 14) may be processed by information process 10 to define them as "actors" that are distributed across the network (e.g., network 14) and expose the core functionality that is available through these components/devices/systems.

Figure 19:
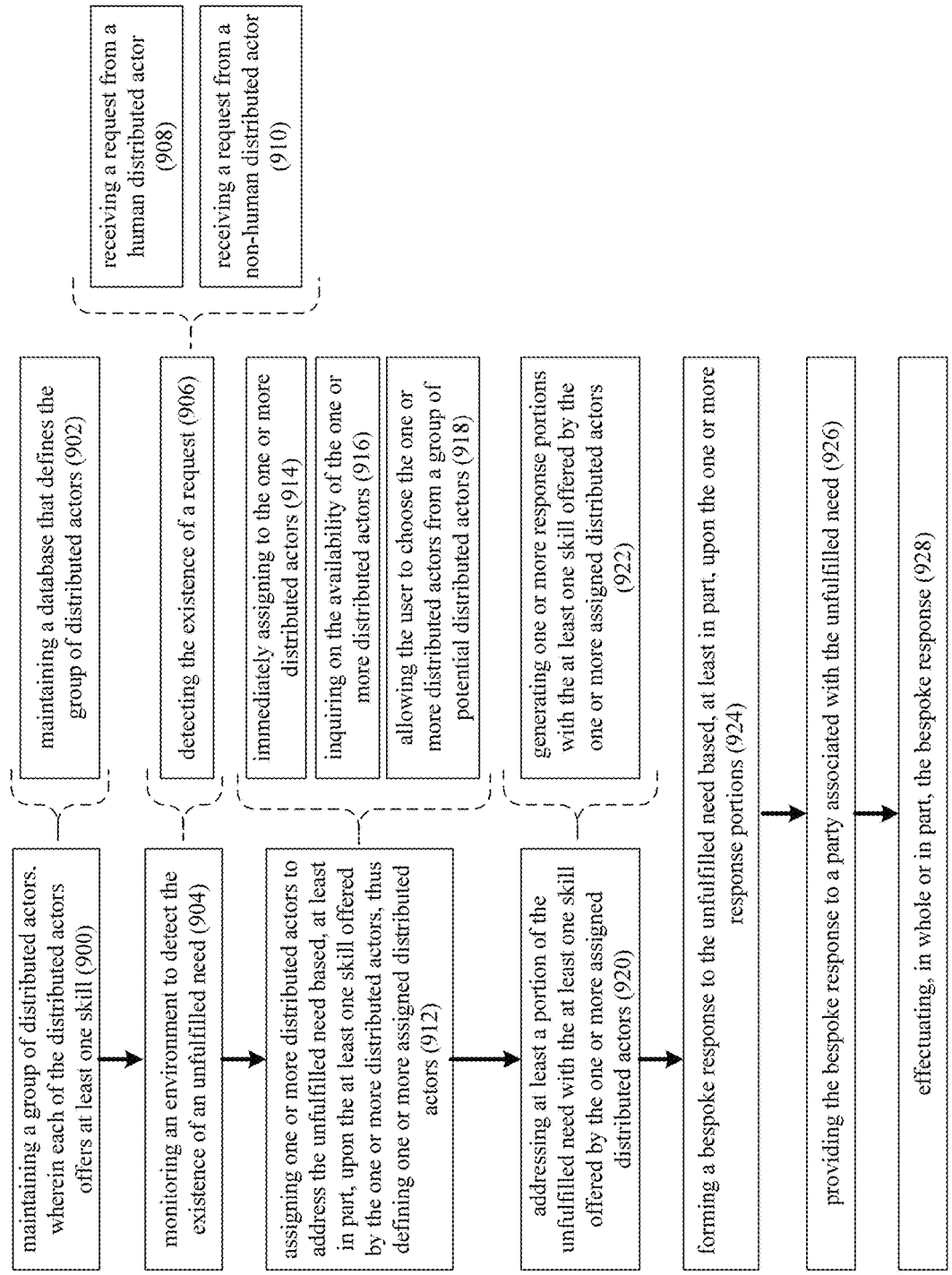
FIG. 19 is another flowchart of the information process of FIG. 1 according to an embodiment of the present disclosure.
Figure 20:
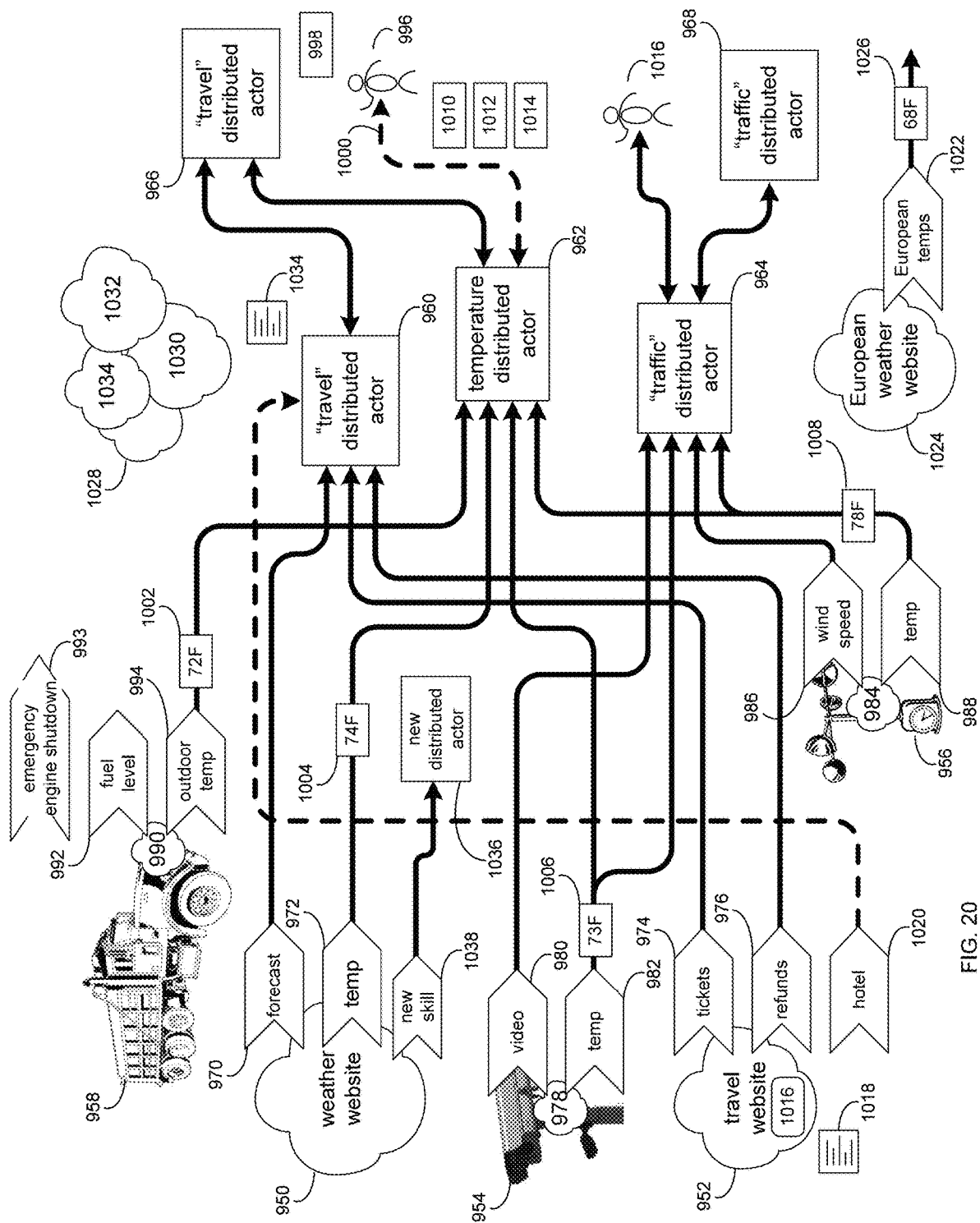
FIG. 20 is a diagrammatic view of a ParaNet network effectuated by the information process of FIG. 1 according to an embodiment of the present disclosure.

Referring also to FIGS. 19-20, information process 10 may maintain 900 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

When maintaining 900 a group of distributed actors (e.g., distributed actors 950, 952, 954, 956, 958, 960, 962, 964, 966, 968), information process 10 may: maintain 902 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968).

The group of distributed actors (e.g., distributed actors 950, 952, 954, 956, 958, 960, 962, 964, 966, 968) may include one or more of: a software platform; a software application; a virtual machine; and a web-based service.

As is known in the art:

A Software Platform is a set of software components, tools, and technologies that provide a foundation for developing and deploying software applications. A software platform typically includes an operating system, programming languages, libraries, frameworks, and other tools that are used to develop, test, and deploy software applications. Software platforms can be used to build a wide range of applications, from desktop and mobile applications to web and cloud-based applications. Examples of software platforms include Microsoft Windows™, Apple's macOS™, iOS™ and iPadOS™, Android™, and various web development platforms such as Node.js, Django, and Ruby on Rails.

A Software Application is a computer program (or set of programs) that is designed to perform specific tasks or functions for the user. Applications can range from simple programs, such as a calculator or text editor, to complex programs, such as an enterprise resource planning (ERP) system or a video game. Applications can be installed and run on a variety of computing devices, including desktop and laptop computers, smartphones, and tablets. They can be developed using a variety of programming languages and tools, depending on the specific requirements and platform. Applications can be designed for a wide range of purposes, including productivity, entertainment, education, communication, and data processing. Some applications are designed for use by individuals, while others are designed for use by organizations or businesses. Applications typically have a graphical user interface (GUI) that allows users to interact with the program and perform tasks or functions. They can also communicate with other programs and services, both locally and over the internet. Overall, software applications are an essential part of modern computing, allowing users to perform a wide range of tasks and functions quickly and efficiently, and improving productivity and efficiency in many industries and fields.

A Virtual Machine (VM) is a software-based emulation of a physical computer that can run multiple operating systems or applications. It provides an environment in which an operating system or application can run as if it were running on a physical machine, even though it is actually running on a virtualized hardware environment. A virtual machine consists of virtual hardware, including CPU, memory, storage, and networking, as well as a virtual BIOS, which allows the virtual machine to boot an operating system. The virtual machine is managed by a software layer called a hypervisor, which allows multiple virtual machines to run on a single physical machine. Virtual machines are used in a variety of scenarios, including software development and testing, cloud computing, and server consolidation. They allow multiple operating systems or applications to be run on a single physical machine, which can help to reduce costs and improve efficiency. One of the key benefits of virtual machines is that they provide a high degree of isolation between the virtual machine and the physical machine. This means that if one virtual machine crashes or becomes infected with malware, it does not affect the other virtual machines running on the same physical machine. Additionally, virtual machines can be easily moved between physical machines, which allows for greater flexibility and scalability in managing computing resources.

A Web-Based Service is a software service or application that is accessible over the internet through a web browser or other web-based interface. These services typically run on web servers and use standard web technologies, such as HTTP and HTML, to communicate with clients. Web-based services can include a wide range of applications, such as email, social networking sites, e-commerce sites, online banking, and cloud-based software services. They can be accessed from any device with an internet connection, such as a desktop computer, laptop, tablet, or smartphone. Web-based services are often designed to be scalable and easy to access, with a focus on user experience and ease of use. They can be hosted on public or private servers, and can be developed using a variety of programming languages and web frameworks. One of the key benefits of web-based services is that they are easily accessible and can be used from anywhere in the world with an internet connection. This makes them ideal for businesses that need to provide services to customers or clients in different locations. Additionally, web-based services can be easily updated and maintained, and can be integrated with other web-based applications and services.

Accordingly and with respect to the group of distributed actors (e.g., distributed actors 950, 952, 954, 956, 958, 960, 962, 964, 966, 968), assume the following:

Distributed actor 950 may be a weather website (e.g., any of the generic weather websites that allow for a user to enter a city or zip code to get a weather forecast). Accordingly, information process 10 may use any of the above-described discrete systems (e.g., DataFi, ParaLogue & ParaFlow) to process distributed actor 950 to expose the core functionality (i.e., the skills) that is available through distributed actor 950. As distributed actor 950 is a weather website, the "skills" available via distributed actor 950 may include but are not limited to: forecast skill 970 and weather skill 972. Generally speaking and as used in this disclosure, distributed actor 950 may be a website that includes functionality (e.g., via an applet or a plugin) that enables the website to effectuate the above-described functionality of a distributed actor. Additionally/alternatively and if the website is to remain unmodified, the website may utilize a decoupled interface (e.g., interface 971) to effectuate such distributed actor functionality (without needing to modify the website).

Distributed actor 952 may be a travel website (e.g., any of the generic travel websites that allow for a user to enter a destination and a travel date for e.g., plane tickets and hotel reservations). Accordingly, information process 10 may use any of the above-described discrete systems (e.g., DataFi, ParaLogue & ParaFlow) to process distributed actor 952 to expose the core functionality (i.e., the skills) that is available through distributed actor 952. As distributed actor 952 is a travel website, the "skills" available via distributed actor 952 may include but are not limited to: tickets skill 974 and refunds skill 976. Generally speaking and as used in this disclosure, distributed actor 952 may be a website that includes functionality (e.g., via an applet or a plugin) that enables the website to effectuate the above-described functionality of a distributed actor. Additionally/alternatively and if the website is to remain unmodified, the website may utilize a decoupled interface (e.g., interface 975) to effectuate such distributed actor functionality (without needing to modify the website).

While the distributed actors (e.g., distributed actors 950, 952) discussed thus far were traditional websites, this is for illustrative purposes only and is not intended to be a limitation of this disclosure, as other configurations are possible and are considered to be within the scope of this disclosure. For example, some of the distributed actors may be hardware systems that are connected/connectable to network 14. Examples of such hardware systems may include IoT (i.e., Internet of Things) devices (e.g., thermostats, doorbells, refrigerators, etc.); fleet vehicles (e.g., rental cars, construction equipment, airplanes, trains, etc.); stationary systems (e.g., traffic cameras, security cameras, weather stations, etc.); computers/electronics (e.g., cable boxes, personal computers, etc.). Such hardware systems that are connected/connectable to network 14 may utilize an interface to enable such connectivity. Examples of such an interface may include but are not limited to: a user interface that enables access to e.g., a thermostat, an application program interface that enables access to e.g., a traffic camera system, and a webserver that enables access to e.g., a fleet of construction equipment.

Accordingly and for this example, assume the following:

Distributed actor 954 may be a traffic camera system (e.g., any generic camera system that observes traffic conditions and flows) that includes interface 978 (e.g., an application program interface) that enables connectivity to network 14. Accordingly, information process 10 may use of any of the above-described discrete systems (e.g., DataFi, ParaLogue & ParaFlow) to process distributed actor 954 to expose the core functionality (i.e., the skills) that is available through distributed actor 954. As distributed actor 954 is a traffic camera system, the "skills" available via distributed actor 954 may include but are not limited to: video skill 980 and temp skill 982. An example of video skill 980 is machine learning-based object detection that may be used by other distributed actors.

Distributed actor 956 may be a weather station system (e.g., any generic weather station system, be it personal or professional, that monitors weather conditions) that includes interface 984 (e.g., a user interface) that enables connectivity to network 14. Accordingly, information process 10 may use any of the above-described discrete systems (e.g., DataFi, ParaLogue & ParaFlow) to process distributed actor 956 to expose the core functionality (i.e., the skills) that is available through distributed actor 956. As distributed actor 956 is a weather station system, the "skills" available via distributed actor 956 may include but are not limited to: wind speed skill 986 and temp skill 988.

Distributed actor 958 may be a piece of construction equipment (e.g., a dump truck, a bulldozer, an excavator, etc.) that includes interface 990 (e.g., a webserver) that enables connectivity to network 14. Accordingly, information process 10 may use any of the above-described discrete systems (e.g., DataFi, ParaLogue & ParaFlow) to process distributed actor 958 to expose the core functionality (i.e., the skills) that is available through distributed actor 958. As distributed actor 958 is a piece of construction equipment, the "skills" available via distributed actor 958 may include but are not limited to: fuel level skill 992, emergency engine shutdown skill 993, and outdoor temp skill 994.

While the distributed actors (e.g., distributed actors 950, 952, 954, 956, 958) discussed thus far were actors that directly provides the above-described skills, this is for illustrative purposes only and is not intended to be a limitation of this disclosure, as other configurations are possible and are considered to be within the scope of this disclosure. For example, some of the distributed actors may bundle or re-expose skills that are provided by other actors. Therefore, some of the group of distributed actors (e.g., distributed actors 950, 952, 954, 956, 958, 960, 962, 964, 966, 968) may be arranged in a hierarchical fashion.

Accordingly and for this example, assume the following:

Distributed actor 960 may be a travel distributed actor (e.g., an actor that aggregates the travel skills exposed by other actors). Accordingly, information process 10 may use any of the above-described discrete systems (e.g., DataFi, ParaLogue & ParaFlow) to process distributed actor 960 to expose the core functionality (i.e., the skills) that is available through distributed actor 960. As distributed actor 960 is essentially a skill "bundler", the "skills" available via distributed actor 960 may include but are not limited to: forecast skill 970 available from distributed actor 950, tickets skill 974 available from distributed actor 952, and refunds skill 976 available from distributed actor 952.

Distributed actor 962 may be a temperature distributed actor (e.g., an actor that aggregates the temperature skills exposed by other actors). Accordingly, information process 10 may use any of the above-described discrete systems (e.g., DataFi, ParaLogue & ParaFlow) to process distributed actor 962 to expose the core functionality (i.e., the skills) that is available through distributed actor 962. As distributed actor 962 is essentially a skill "bundler", the "skills" available via distributed actor 962 may include but are not limited to: outdoor temp skill 994 available from distributed actor 958, temp skill 972 available from distributed actor 950, temp skill 982 available from distributed actor 954, and temp skill 988 available from distributed actor 956.

Distributed actor 964 may be a traffic distributed actor (e.g., an actor that aggregates the traffic skills exposed by other actors). Accordingly, information process 10 may use any of the above-described discrete systems (e.g., DataFi, ParaLogue & ParaFlow) to process distributed actor 964 to expose the core functionality (i.e., the skills) that is available through distributed actor 964. As distributed actor 964 is essentially a skill "bundler", the "skills" available via distributed actor 964 may include but are not limited to: video skill 980 available from distributed actor 954, temp skill 982 available from distributed actor 954, wind speed skill 986 available from distributed actor 956, and temp skill 988 available from distributed actor 956.

Additionally, some of the distributed actors may bundle or re-expose skills that are provided by other bundlers. Therefore and as discussed above, some of the group of distributed actors (e.g., distributed actors 950, 952, 954, 956, 958, 960, 962, 964, 966, 968) may be arranged in a hierarchical fashion.

Accordingly and for this example, assume the following:

Distributed actor 966 may be a travel distributed actor (e.g., an actor that aggregates the travel skills exposed by other actors). Accordingly, information process 10 may use any of the above-described discrete systems (e.g., DataFi, ParaLogue & ParaFlow) to process distributed actor 966 to expose the core functionality (i.e., the skills) that are available through distributed actor 966. As distributed actor 966 is essentially a skill "bundler", the "skills" available via distributed actor 966 may include but are not limited to: the skills available from distributed actor 960 (e.g., forecast skill 970 available from distributed actor 950, tickets skill 974 available from distributed actor 952, and refunds skill 976 available from distributed actor 952) and distributed actor 962 (e.g., outdoor temp skill 994 available from distributed actor 958, temp skill 972 available from distributed actor 950, temp skill 982 available from distributed actor 954, and temp skill 988 available from distributed actor 956).

Distributed actor 968 may be a temperature distributed actor (e.g., an actor that aggregates the temperature skills exposed by other actors). Accordingly, information process 10 may use any of the above-described discrete systems (e.g., DataFi, ParaLogue & ParaFlow) to process distributed actor 968 to expose the core functionality (i.e., the skills) that are available through distributed actor 968. As distributed actor 968 is essentially a skill "bundler", the "skills" available via distributed actor 968 may include but are not limited to: the "skills" available via distributed actor 964 (e.g., video skill 980 available from distributed actor 954, temp skill 982 available from distributed actor 954, wind speed skill 986 available from distributed actor 956, and temp skill 988 available from distributed actor 956).

Information process 10 may monitor 904 an environment (e.g., network 14) to detect the existence of an unfulfilled need. For example and when monitoring 904 an environment to detect the existence of an unfulfilled need, information process 10 may: detect 906 the existence of a request. For this example, assume that a user (e.g., user 996) is an amateur weather researcher and is looking for information on temperature conditions. Accordingly, information process 10 may monitor 904 an environment (e.g., network 14) to detect 906 request 998 issued by user 996. For example, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest".

Information process 10 may receive request 998 issued by user 996 and process the same to effectuate a response. For example, if the request is a text-based request and/or a speech-based request, information process 10 may process request 998 using Natural Language Processing (NLP) and/or Natural Language Understanding (NLU).

As is known in the art, Natural Language Processing (NLP) is a subfield of artificial intelligence and computer science that focuses on enabling computers to understand, interpret, and generate human language. It involves the use of algorithms and statistical models to analyze and process natural language data, such as text or speech.

NLP can be used to perform a wide range of tasks, including:
  Text Analysis: Analyzing the content of text documents to extract insights, identify patterns, and categorize information.
  Machine Translation: Translating text from one language to another.
  Sentiment Analysis: Analyzing text to determine the sentiment or emotional tone of the language used.
  Speech Recognition: Transcribing speech into text.
  Chatbots and Virtual Assistants: Creating intelligent agents that can understand and respond to human language in a conversational manner.

NLP is a rapidly evolving field with many practical applications in various industries, including healthcare, finance, customer service, and marketing. Some of the challenges in NLP include dealing with ambiguity and variability in human language, as well as developing systems that can handle language in a way that is sensitive to cultural and social differences.

As is known in the art, Natural Language Understanding (NLU) is a subfield of natural language processing (NLP) that focuses on enabling computers to understand the meaning and intent behind human language. It involves the use of advanced algorithms and machine learning techniques to analyze and interpret natural language data, such as text or speech.

NLU systems typically perform tasks such as:
  Named Entity Recognition: Identifying and extracting named entities, such as people, organizations, and locations, from text.
  Sentiment Analysis: Determining the emotional tone or sentiment of text, such as positive, negative, or neutral.
  Intent Classification: Understanding the intended meaning or purpose of a piece of text, such as a user's request or command.
  Entity Resolution: Resolving ambiguous references in text, such as determining which "John" is being referred to.
  Summarization: Generating a condensed version of a longer text document, such as an article or report.

NLU is a key component of many modern natural language systems, such as virtual assistants, chatbots, and voice recognition systems. It is essential for enabling these systems to understand and respond to human language in a way that is accurate and useful. However, NLU is still an active area of research, and there are many challenges to be overcome, such as dealing with ambiguity and context, and handling variations in language and dialects.

While the above-described example concerns request 998 being generated by a human being, this is for illustrative purposes only and is not intended to be a limitation of this disclosure, as other configurations are possible and are considered to be within the scope of this disclosure. For example and when detecting 906 the existence of a request (e.g., request 998), information process 10 may: receive 908 a request (e.g., request 998) from a human distributed actor (e.g., user 996) and/or receive 910 a request (e.g., request 998) from a non-human distributed actor (e.g., distributed actor 966).

Once the request (e.g., request 998) is detected 906, information process 10 may assign 912 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest") based, at least in part, upon the at least one skill (e.g., at least one of skills 970, 972, 974, 976, 980, 982, 986, 988, 992, 994) offered by the one or more distributed actors (e.g., chosen from the group of distributed actors 950, 952, 954, 956, 958, 960, 962, 964, 966, 968), thus defining one or more assigned distributed actors.

When assigning 912 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest"), information process 10 may: immediately assign 914 to the one or more distributed actors (e.g., chosen from the group of distributed actors 950, 952, 954, 956, 958, 960, 962, 964, 966, 968); inquire 916 on the availability of the one or more distributed actors (e.g., chosen from the group of distributed actors 950, 952, 954, 956, 958, 960, 962, 964, 966, 968); and/or allow 918 the user (e.g., user 996) to choose the one or more distributed actors from a group of potential distributed actors (e.g., chosen from the group of distributed actors 950, 952, 954, 956, 958, 960, 962, 964, 966, 968).

For the following example, assume that in response to the unfulfilled need (e.g., "Please provide temperature information in Fahrenheit from numerous locations in the Pacific Northwest"), information process 10 identifies several skills that are applicable to the unfulfilled need. Examples of such applicable skills may include but are not limited to outdoor temp skill 994 available from distributed actor 958, temp skill 972 available from distributed actor 950, temp skill 982 available from distributed actor 954, and temp skill 988 available from distributed actor 956. Further, each of these four skills is available via distributed actor 962, which bundles outdoor temp skill 994 available from distributed actor 958, temp skill 972 available from distributed actor 950, temp skill 982 available from distributed actor 954, and temp skill 988 available from distributed actor 956.

As discussed above, once these skills (e.g., outdoor temp skill 994 available from distributed actor 958, temp skill 972 available from distributed actor 950, temp skill 982 available from distributed actor 954, and temp skill 988 available from distributed actor 956) are identified by information process 10, information process 10 may assign 912 one or more distributed actors (e.g., chosen from the group of distributed actors 950, 954, 956, 958, 962). Further and as discussed above, information process 10 may: immediately assign 914 to the one or more distributed actors (e.g., chosen from the group of distributed actors 950, 954, 956, 958, 962); inquire 916 on the availability of the one or more distributed actors (e.g., chosen from the group of distributed actors 950, 954, 956, 958, 962); and/or allow 918 the user (e.g., user 996) to choose the one or more distributed actors from a group of potential distributed actors (e.g., chosen from the group of distributed actors 950, 954, 956, 958, 962).

For example and with respect to an assignment of such distributed actors:

Immediately Assigning: Information process 10 may immediately assign to distributed actors 950, 954, 956, 958 if the intent was to assemble the four skills identified by information process 10 from distributed actors that offer the identified skills organically. Alternatively, information process 10 may immediately assign to distributed actor 962 if the intent was to assign to a bundling distributed actor who had available all four of the identified skills.

Inquiring: Information process 10 may inquire whether distributed actors 950, 954, 956, 958, 962 are able (e.g., have the bandwidth) to service the unfulfilled need (e.g., "Please provide temperature information in Fahrenheit from numerous locations in the Pacific Northwest").

Allowing: Information process 10 may allow the user (e.g., user 996) to review and/or choose one or more of the distributed actors 950, 954, 956, 958, 962 to service the unfulfilled need (e.g., "Please provide temperature information from numerous locations in the Pacific Northwest").

Assume for this example that information process 10 immediately assigns 914 distributed actor 962 to address the unfulfilled need (e.g., "Please provide temperature information in Fahrenheit from numerous locations in the Pacific Northwest") based, at least in part, upon distributed actor 962 offering all four of the identified skills (e.g., outdoor temp skill 994 through distributed actor 958, temp skill 972 through distributed actor 950, temp skill 982 through distributed actor 954, and temp skill 988 through distributed actor 956), thus defining distributed actor 962 as an assigned distributed actor (wherein such an assignment is represented by dashed arrow 1000).

Accordingly, one or more of the assigned distributed actors (e.g., distributed actor 962) may interact, directly or indirectly, with one or more distributed sub-actors to address at least a portion of the unfulfilled need (e.g., "Please provide temperature information in Fahrenheit from numerous locations in the Pacific Northwest").

Specifically:
distributed actor 962 may interact, directly or indirectly, with distributed actor 958 to obtain outdoor temp skill 994;
distributed actor 962 may interact, directly or indirectly, with distributed actor 950 to obtain temp skill 972;
distributed actor 962 may interact, directly or indirectly, with distributed actor 954 to obtain temp skill 982; and
distributed actor 962 may interact, directly or indirectly, with distributed actor 956 to obtain temp skill 988.

In some implementations, interacting, directly or indirectly, with distributed sub-actors may include recursively generating new requests being generated and provided in the above-described manner to the database of distributed actors. For example, distributed actor 962 may identify a portion of the unfulfilled need that it cannot perform (e.g., outdoor temp determination). Accordingly, distributed actor 962 may generate a request that may be addressed by distributed actor 958 with outdoor temp skill 994. Information process 10 may recursively repeat the process of interacting with distributed sub-actors to address the unfulfilled need.

Information process 10 may address 920 at least a portion of the unfulfilled need (e.g., "Please provide temperature information in Fahrenheit from numerous locations in the Pacific Northwest") with the at least one skill offered by the one or more assigned distributed actors. Specifically, information process 10 may address 920 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

When addressing 920 at least a portion of the unfulfilled need (e.g., "Please provide temperature information in Fahrenheit from numerous locations in the Pacific Northwest") with the at least one skill offered by the one or more assigned distributed actors, information process 10 may: generate 922 one or more response portions with the at least one skill offered by the one or more assigned distributed actors. Specifically:

outdoor temp skill 994 (available from distributed actor 958) may provide assigned distributed actor 962 with temperature 1002 (i.e., a temperature of 72° F.);
temp skill 972 (available from distributed actor 950) may provide assigned distributed actor 962 with temperature 1004 (i.e., a temperature of 74° F.);
temp skill 982 (available from distributed actor 954) may provide assigned distributed actor 962 with temperature 1006 (i.e., a temperature of 73° F.); and
temp skill 988 (available from distributed actor 956) may provide assigned distributed actor 962 with temperature 1008 (i.e., a temperature of 78° F.).

Accordingly, information process 10 may generate 922 one or more response portions (e.g., temperatures 1002, 1004, 1006, 1008) with skills 994, 972, 982, 988 (respectively) obtained from distributed actors 958, 950, 954, 952, 956 (respectively).

Information process 10 may form 924 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 926 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 924 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 926 bespoke response 1010 to that party (e.g., user 996).

Additionally, information process 10 may effectuate 928, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 924 bespoke response 1010 that may identify "the first available flight from Boston, MA to Washington DC", wherein information process 10 may provide 926 bespoke response 1010 to user 996 and may effectuate 928 bespoke response 1010 by booking "the first available flight from Boston, MA to Washington DC". Information process 10 may provide any results from effectuating 928 bespoke response (e.g., a confirmation message, a seating assignment, a receipt) associated with the skills used to address the unfulfilled need(s).

ParaNet (Utilization)

As will be discussed below, information process 10 may monitor the utilization for each of the distributed actors (e.g., distributed actors 950, 952, 954, 956, 958, 960, 962, 964, 966, 968) and may assign distributed actors (e.g., chosen from the group of distributed actors 950, 952, 954, 956, 958, 960, 962, 964, 966, 968) to address unfulfilled needs based, at least in part, upon their utilization.

Figure 21:
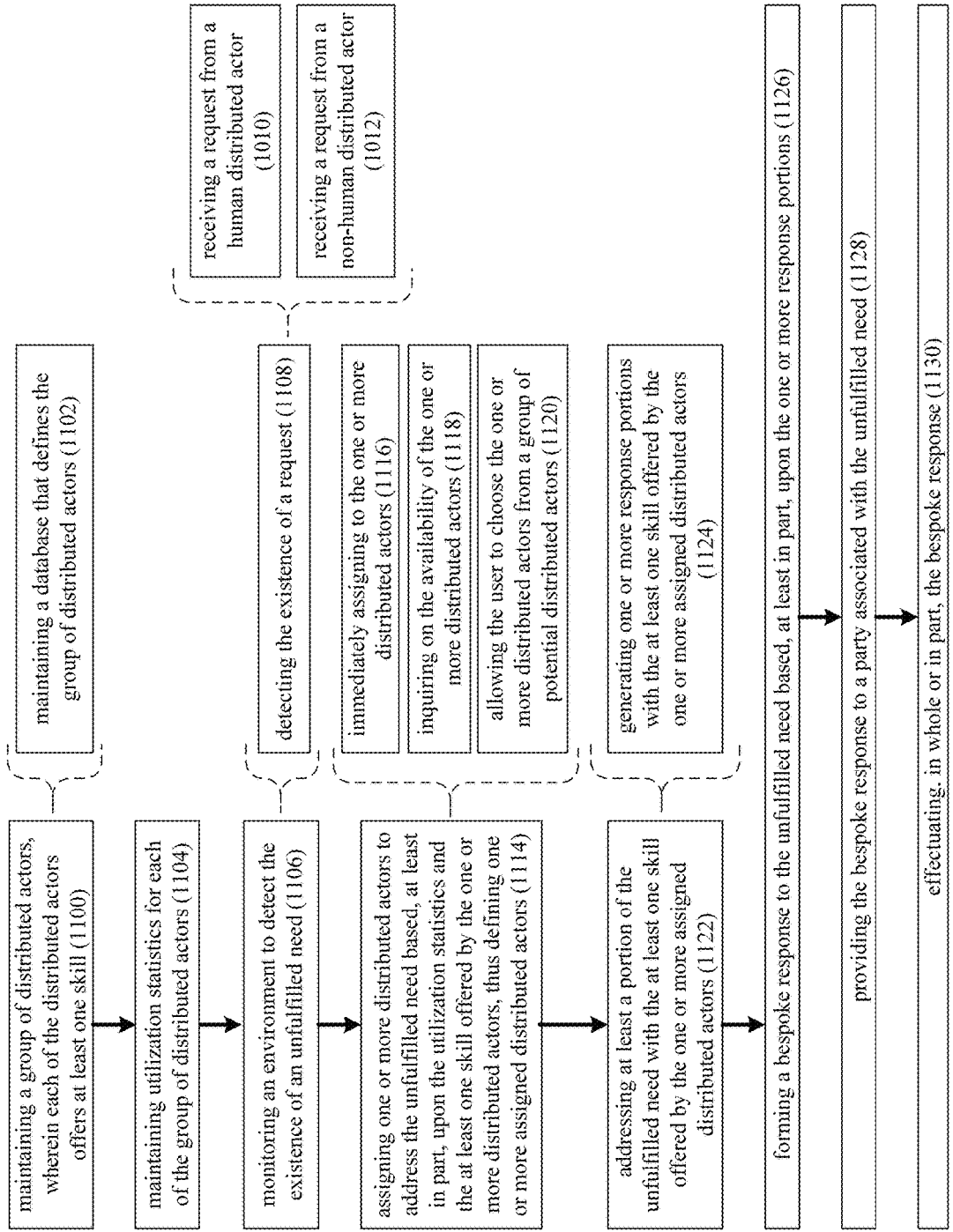
FIG. 21 is another flowchart of the information process of FIG. 1 according to an embodiment of the present disclosure.

As discussed above and referring also to FIG. 21, information process 10 may maintain 1100 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

As also discussed above and when maintaining 1100 a group of distributed actors (e.g., distributed actors 950, 952, 954, 956, 958, 960, 962, 964, 966, 968), information process 10 may: maintain 1102 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968).

As also discussed above, the group of distributed actors (e.g., distributed actors 950, 952, 954, 956, 958, 960, 962, 964, 966, 968) may include one or more of: a software platform; a software application; a virtual machine; and a web-based service.

Information process 10 may maintain 1104 utilization statistics (e.g., utilization statistics 1012) for each of the group of distributed actors (e.g., distributed actors 950, 952, 954, 956, 958, 960, 962, 964, 966, 968). The utilization statistics (e.g., utilization statistics 1012) may define one or more of:
- a current workload for each of the group of distributed actors (e.g., distributed actors 950, 952, 954, 956, 958, 960, 962, 964, 966, 968), which may aid in balancing the loading of the distributed actors to e.g., prevent the overloading/underloading of the same; and
- an assignment history for each of the group of distributed actors (e.g., distributed actors 950, 952, 954, 956, 958, 960, 962, 964, 966, 968), which may aid in routing work to the distributed actors to e.g., ensure that the distributed actors get the appropriate mix of work.

As discussed above, information process 10 may monitor 1106 an environment (e.g., network 14) to detect the existence of an unfulfilled need. For example and when monitoring 1106 an environment to detect the existence of an unfulfilled need, information process 10 may: detect 1108 the existence of a request. For this example, assume that a user (e.g., user 996) is an amateur weather researcher and is looking for information on temperature conditions. Accordingly, information process 10 may monitor 1106 an environment (e.g., network 14) to detect 1108 request 998 issued by user 996. For example, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest".

As discussed above, when detecting 1108 the existence of a request (e.g., request 998), information process 10 may: receive 1110 a request (e.g., request 998) from a human distributed actor (e.g., user 996) and/or receive 1112 a request (e.g., request 998) from a non-human distributed actor (e.g., distributed actor 966).

Once the request (e.g., request 998) is detected 1108, information process 10 may assign 1114 one or more distributed actors (e.g., chosen from the group of distributed actors 950, 952, 954, 956, 958, 960, 962, 964, 966, 968) to address the unfulfilled need (e.g., "I am looking for temperature information from numerous locations in the Pacific Northwest") based, at least in part, upon the utilization statistics (e.g., utilization statistics 1012) and the at least one skill (e.g., at least one of skills 970, 972, 974, 976, 980, 982, 986, 988, 992, 994) offered by the one or more distributed actors (e.g., chosen from the group of distributed actors 950, 952, 954, 956, 958, 960, 962, 964, 966, 968), thus defining one or more assigned distributed actors.

When assigning 1114 one or more distributed actors (e.g., chosen from the group of distributed actors 950, 952, 954, 956, 958, 960, 962, 964, 966, 968) to address the unfulfilled need (e.g., "I am looking for temperature information from numerous locations in the Pacific Northwest"), information process 10 may: immediately assign 1116 to the one or more distributed actors (e.g., chosen from the group of distributed actors 950, 952, 954, 956, 958, 960, 962, 964, 966, 968); inquire 1118 on the availability of the one or more distributed actors (e.g., chosen from the group of distributed actors 950, 952, 954, 956, 958, 960, 962, 964, 966, 968); and/or allow 1120 the user (e.g., user 996) to choose the one or more distributed actors from a group of potential distributed actors (e.g., chosen from the group of distributed actors 950, 952, 954, 956, 958, 960, 962, 964, 966, 968).

Assume for this example that information process 10 immediately assigns 1116 distributed actor 962 to address the unfulfilled need (e.g., "Please provide temperature information in Fahrenheit from numerous locations in the Pacific Northwest"). Accordingly, one or more of the assigned distributed actors (e.g., distributed actor 962) may interact, directly or indirectly, with one or more distributed sub-actors to address at least a portion of the unfulfilled need (e.g., "Please provide temperature information in Fahrenheit from numerous locations in the Pacific Northwest").

As discussed above, information process 10 may address 1122 at least a portion of the unfulfilled need (e.g., "Please provide temperature information in Fahrenheit from numerous locations in the Pacific Northwest") with the at least one skill offered by the one or more assigned distributed actors. Specifically, information process 10 may address 1122 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

As discussed above, when addressing 1122 at least a portion of the unfulfilled need (e.g., "Please provide temperature information in Fahrenheit from numerous locations in the Pacific Northwest") with the at least one skill offered by the one or more assigned distributed actors, information process 10 may: generate 1124 one or more response portions with the at least one skill offered by the one or more assigned distributed actors. Specifically:

outdoor temp skill 994 (available from distributed actor 958) may provide assigned distributed actor 962 with temperature 1002 (i.e., a temperature of 72° F.);

temp skill 972 (available from distributed actor 950) may provide assigned distributed actor 962 with temperature 1004 (i.e., a temperature of 74° F.);

temp skill 982 (available from distributed actor 954) may provide assigned distributed actor 962 with temperature 1006 (i.e., a temperature of 73° F.); and temp skill 988 (available from distributed actor 956) may provide assigned distributed actor 962 with temperature 1008 (i.e., a temperature of 78° F.).

As discussed above, information process 10 may form 1126 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 1128 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 126 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 1128 bespoke response 1010 to that party (e.g., user 996).

Additionally and as discussed above, information process 10 may effectuate 1130, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1126 bespoke response 1010 that may identify "the first available flight from Boston, MA to Washington DC", wherein information process 10 may provide 1128 bespoke response 1010 to user 996 and may effectuate 1130 bespoke response 1010 by booking "the first available flight from Boston, MA to Washington DC".

ParaNet (QoS)

As will be discussed below, information process 10 may monitor the quality-of-service for each of the distributed actors (e.g., distributed actors 950, 952, 954, 956, 958, 960, 962, 964, 966, 968) and may assign distributed actors (e.g., chosen from the group of distributed actors 950, 952, 954, 956, 958, 960, 962, 964, 966, 968) to address unfulfilled needs based, at least in part, upon their quality-of-service.

Figure 22:
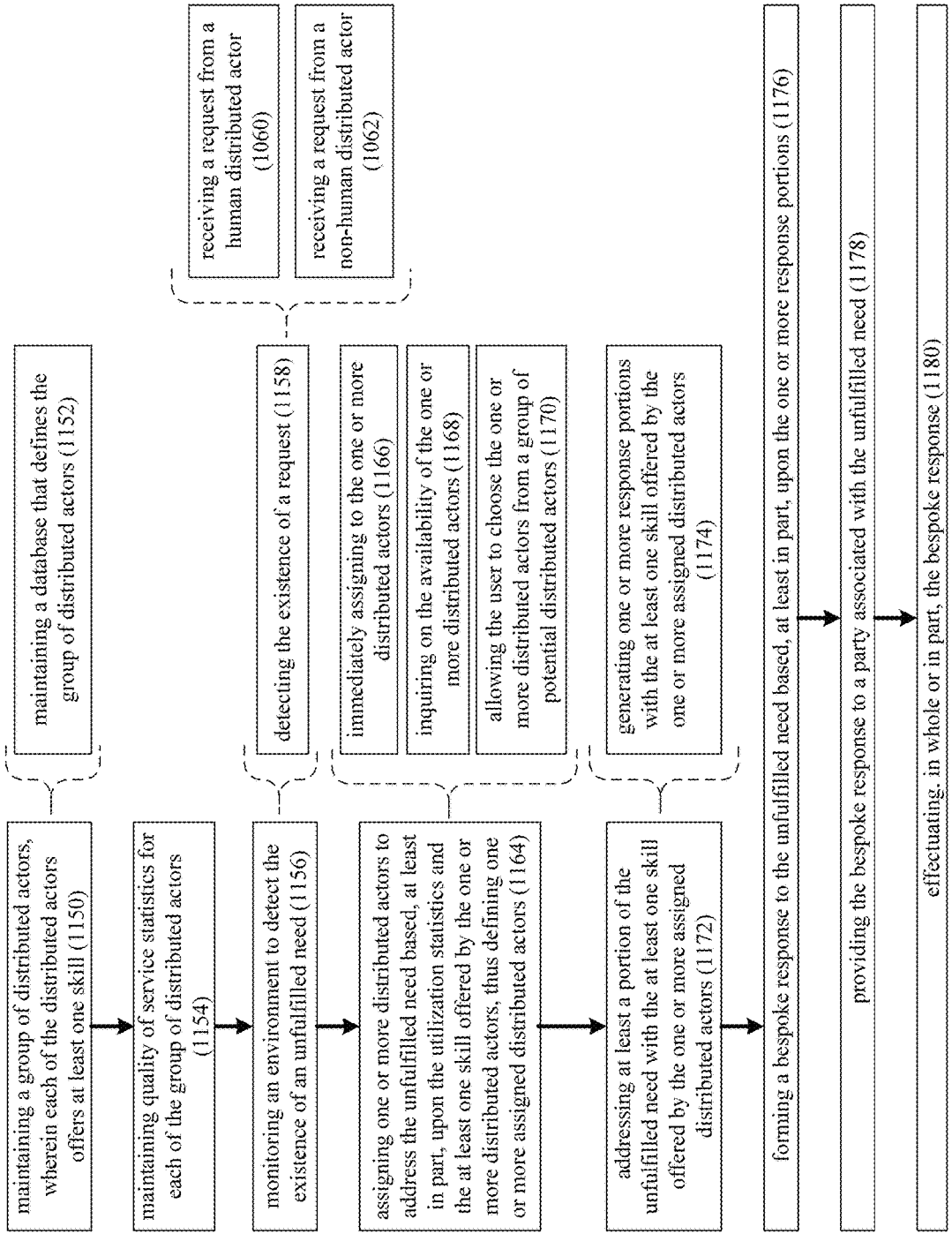
FIG. 22 is another flowchart of the information process of FIG. 1 according to an embodiment of the present disclosure.

As discussed above and referring also to FIG. 22, information process 10 may maintain 1150 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

As also discussed above and when maintaining 1150 a group of distributed actors (e.g., distributed actors 950, 952, 954, 956, 958, 960, 962, 964, 966, 968), information process 10 may: maintain 1152 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968).

As also discussed above, the group of distributed actors (e.g., distributed actors 950, 952, 954, 956, 958, 960, 962, 964, 966, 968) may include one or more of: a software platform; a software application; a virtual machine; and a web-based service.

Information process 10 may maintain 1154 quality-of-service statistics (e.g., quality-of-service statistics 1014) for each of the group of distributed actors (e.g., distributed actors 950, 952, 954, 956, 958, 960, 962, 964, 966, 968).

The quality-of-service statistics (e.g., quality-of-service statistics 1014) may define one or more of:

a user satisfaction level for each of the group of distributed actors (e.g., distributed actors 950, 952, 954, 956, 958, 960, 962, 964, 966, 968), which may result from users (e.g., user 996) providing thumbs-up/thumbs-down feedback concerning one or more of distributed actors 950, 952, 954, 956, 958, 960, 962, 964, 966, 968; and a review score for each of the group of distributed actors (e.g., distributed actors 950, 952, 954, 956, 958, 960, 962, 964, 966, 968), which may result from users (e.g., user 996) providing a 0-10 star review concerning one or more of distributed actors 950, 952, 954, 956, 958, 960, 962, 964, 966, 968.

As discussed above, information process 10 may monitor 1156 an environment (e.g., network 14) to detect the existence of an unfulfilled need. For example and when monitoring 1156 an environment to detect the existence of an unfulfilled need, information process 10 may: detect 1158 the existence of a request. For this example, assume that a user (e.g., user 996) is an amateur weather researcher and is looking for information on temperature conditions. Accordingly, information process 10 may monitor 1156 an environment (e.g., network 14) to detect 1158 request 998 issued by user 996. For example, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest".

As discussed above, when detecting 1158 the existence of a request (e.g., request 998), information process 10 may: receive 1160 a request (e.g., request 998) from a human distributed actor (e.g., user 996) and/or receive 1162 a request (e.g., request 998) from a non-human distributed actor (e.g., distributed actor 966).

Once the request (e.g., request 998) is detected 1158, information process 10 may assign 1164 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest") based, at least in part, upon the quality-of-service statistics (e.g., quality-of-service statistics 1014) and the at least one skill (e.g., at least one of skills 970, 972, 974, 976, 980, 982, 986, 988, 992, 994) offered by the one or more distributed actors (e.g., chosen from the group of distributed actors 950, 952, 954, 956, 958, 960, 962, 964, 966, 968), thus defining one or more assigned distributed actors.

When assigning 1164 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest"), information process 10 may: immediately assign 1166 to the one or more distributed actors (e.g., chosen from the group of distributed actors 950, 952, 954, 956, 958, 960, 962, 964, 966, 968); inquire 1168 on the availability of the one or more distributed actors (e.g., chosen from the group of distributed actors 950, 952, 954, 956, 958, 960, 962, 964, 966, 968); and/or allow 1170 the user (e.g., user 996) to choose the one or more distributed actors from a group of potential distributed actors (e.g., chosen from the group of distributed actors 950, 952, 954, 956, 958, 960, 962, 964, 966, 968).

Assume for this example that information process 10 immediately assigns 1166 distributed actor 962 to address the unfulfilled need (e.g., "Please provide temperature information in Fahrenheit from numerous locations in the Pacific Northwest"). Accordingly, one or more of the assigned distributed actors (e.g., distributed actor 962) may interact, directly or indirectly, with one or more distributed sub-actors to address at least a portion of the unfulfilled need (e.g., "Please provide temperature information in Fahrenheit from numerous locations in the Pacific Northwest").

As discussed above, information process 10 may address 1172 at least a portion of the unfulfilled need (e.g., "Please provide temperature information in Fahrenheit from numerous locations in the Pacific Northwest") with the at least one skill offered by the one or more assigned distributed actors. Specifically, information process 10 may address 1172 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

As discussed above, when addressing 1172 at least a portion of the unfulfilled need (e.g., "Please provide temperature information in Fahrenheit from numerous locations in the Pacific Northwest") with the at least one skill offered by the one or more assigned distributed actors, information process 10 may: generate 1174 one or more response portions with the at least one skill offered by the one or more assigned distributed actors.

Specifically:
- outdoor temp skill 994 (available from distributed actor 958) may provide assigned distributed actor 962 with temperature 1002 (i.e., a temperature of 72° F.);
- temp skill 972 (available from distributed actor 950) may provide assigned distributed actor 962 with temperature 1004 (i.e., a temperature of 74° F.);
- temp skill 982 (available from distributed actor 954) may provide assigned distributed actor 962 with temperature 1006 (i.e., a temperature of 73° F.); and
- temp skill 988 (available from distributed actor 956) may provide assigned distributed actor 962 with temperature 1008 (i.e., a temperature of 78° F.).

As discussed above, information process 10 may form 1176 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 1178 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 1176 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 1178 bespoke response 1010 to that party (e.g., user 996).

Additionally and as discussed above, information process 10 may effectuate 1180, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1176 bespoke response 1010 that may identify "the first available flight from Boston, MA to Washington DC", wherein information process 10 may provide 1178 bespoke response 1010 to user 996 and may effectuate 1180 bespoke response 1010 by booking "the first available flight from Boston, MA to Washington DC".

ParaNet (Sub-Actors)

As will be discussed below, information process 10 may enable assigned distributed actors to assign at least a portion of an unfulfilled need to one or more distributed sub-actors, wherein these one or more distributed sub-actors may address at least a portion of the unfulfilled need.

Figure 23:
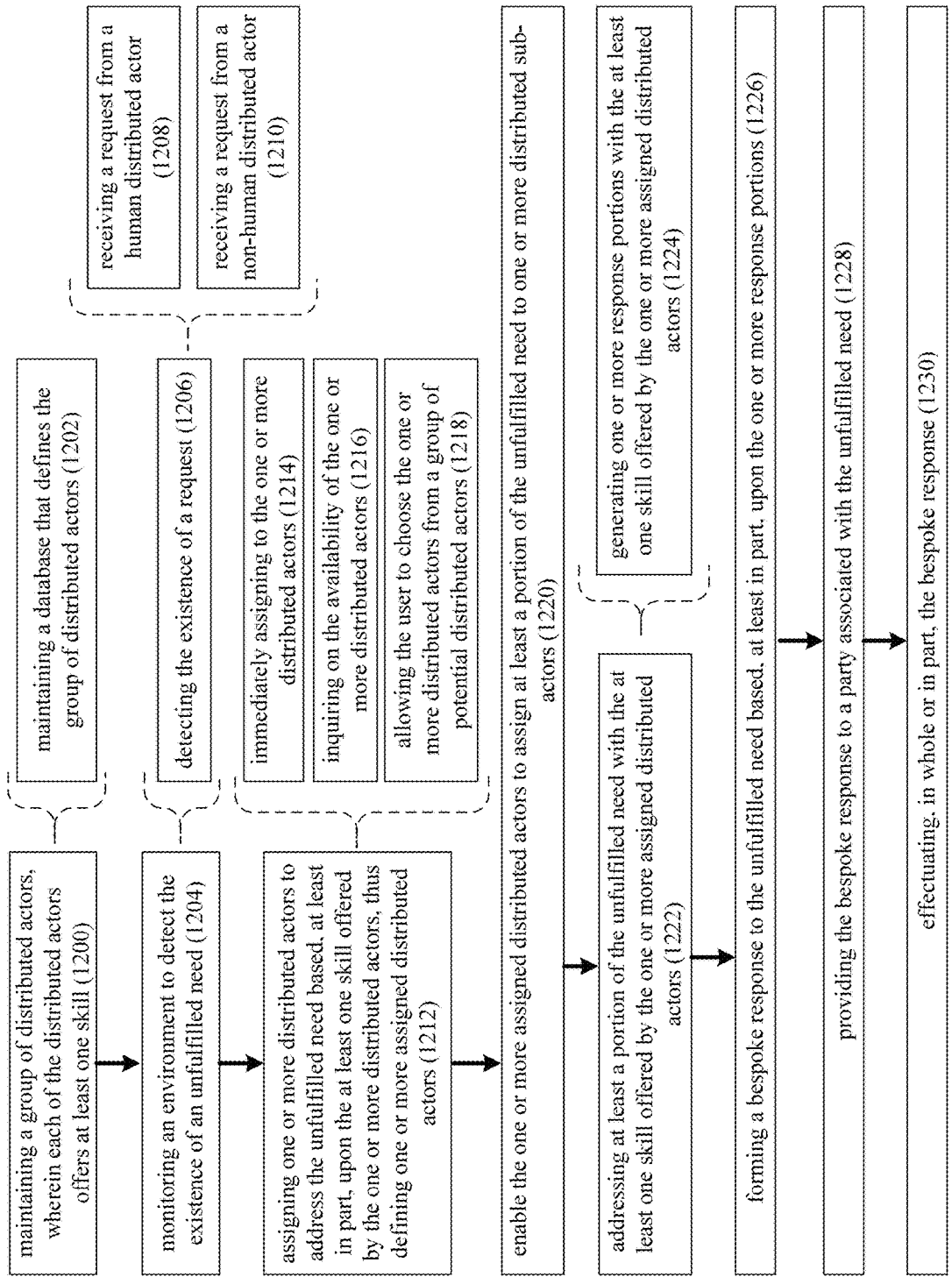
FIG. 23 is another flowchart of the information process of FIG. 1 according to an embodiment of the present disclosure.

As discussed above and referring also to FIG. 23, information process 10 may maintain 1200 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

As also discussed above and when maintaining 1200 a group of distributed actors (e.g., distributed actors 950, 952, 954, 956, 958, 960, 962, 964, 966, 968), information process 10 may: maintain 1202 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968).

As also discussed above, the group of distributed actors (e.g., distributed actors 950, 952, 954, 956, 958, 960, 962, 964, 966, 968) may include one or more of: a software platform; a software application; a virtual machine; and a web-based service.

As discussed above, information process 10 may monitor 1204 an environment (e.g., network 14) to detect the existence of an unfulfilled need. For example and when monitoring 1204 an environment to detect the existence of an unfulfilled need, information process 10 may detect 1206 the existence of a request. For this example, assume that a user (e.g., user 996) is an amateur weather researcher and is looking for information on temperature conditions. Accordingly, information process 10 may monitor 1204 an environment (e.g., network 14) to detect 1206 request 998 issued by user 996. For example, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest".

As discussed above, when detecting 1206 the existence of a request (e.g., request 998), information process 10 may: receive 1208 a request (e.g., request 998) from a human distributed actor (e.g., user 996) and/or receive 1210 a request (e.g., request 998) from a non-human distributed actor (e.g., distributed actor 966).

Once the request (e.g., request 998) is detected 1206, information process 10 may assign 1212 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest") based, at least in part, upon the at least one skill (e.g., at least one of skills 970, 972, 974, 976, 980, 982, 986, 988, 992, 994) offered by the one or more distributed actors (e.g., chosen from the group of distributed actors 950, 952, 954, 956, 958, 960, 962, 964, 966, 968), thus defining one or more assigned distributed actors.

When assigning 1212 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest"), information process 10 may: immediately assign 1214 to the one or more distributed actors (e.g., chosen from the group of distributed actors 950, 952, 954, 956, 958, 960, 962, 964, 966, 968); inquire 1216 on the availability of the one or more distributed actors (e.g., chosen from the group of distributed actors 950, 952, 954, 956, 958, 960, 962, 964, 966, 968); and/or allow 1218 the user (e.g., user 996) to choose the one or more distributed actors from a group of potential distributed actors (e.g., chosen from the group of distributed actors 950, 952, 954, 956, 958, 960, 962, 964, 966, 968).

Further and as will be discussed below in greater detail, information process 10 may enable 1220 the one or more assigned distributed actors to assign at least a portion of the unfulfilled need (e.g., "Please provide temperature information in Fahrenheit from numerous locations in the Pacific Northwest") to one or more distributed sub-actors, wherein these one or more distributed sub-actors may address at least a portion of the unfulfilled need.

Assume for this example that information process 10 immediately assigns 1214 distributed actor 962 to address the unfulfilled need (e.g., "Please provide temperature information in Fahrenheit from numerous locations in the Pacific Northwest"), thus defining distributed actor 962 as an assigned distributed actor (wherein such an assignment is represented by dashed arrow 1000).

As discussed above, distributed actor 962 offers all four of the identified skills (e.g., outdoor temp skill 994 through distributed actor 958, temp skill 972 through distributed actor 950, temp skill 982 through distributed actor 954, and temp skill 988 through distributed actor 956); even though distributed actor 962 does not organically offer any of these identified skills.

Accordingly, information process 10 may enable 1220 the one or more assigned distributed actors (e.g., distributed actor 962) to assign at least a portion of the unfulfilled need (e.g., "Please provide temperature information in Fahrenheit from numerous locations in the Pacific Northwest") to one or more distributed sub-actors (e.g., distributed sub-actors 958, 950, 954, 956), wherein these one or more distributed sub-actors (e.g., distributed sub-actors 958, 950, 954, 956) may address at least a portion of the unfulfilled need (e.g., "Please provide temperature information in Fahrenheit from numerous locations in the Pacific Northwest"). Generally speaking and when assigning at least a portion of the unfulfilled need to one or more distributed sub-actors, such an assignment may be a direct assignment (if the distributed actor has the ability to assign) or the assigned distributed actors (e.g., distributed actor 962) may utilize information process 10 to reassign at least a portion of the unfulfilled need to one or more distributed sub-actors.

Specifically:
- distributed sub-actors 958 may address at least a portion of the unfulfilled need by providing outdoor temp skill 994 to distributed actor 962;
- distributed sub-actors 950 may address at least a portion of the unfulfilled need by providing temp skill 972 to distributed actor 962;
- distributed sub-actors 954 may address at least a portion of the unfulfilled need by providing temp skill 982 to distributed actor 962; and
- distributed sub-actors 956 may address at least a portion of the unfulfilled need by providing temp skill 988 to distributed actor 962.

As discussed above, information process 10 may address 1222 at least a portion of the unfulfilled need (e.g., "Please provide temperature information in Fahrenheit from numerous locations in the Pacific Northwest") with the at least one skill offered by the one or more assigned distributed actors. Specifically, information process 10 may address 1222 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

As discussed above and in some implementations, information process 10 may recursively assign or reassign at least a portion of the unfulfilled need to one or more distributed sub-actors until each portion of the unfulfilled need is resolved.

As discussed above, when addressing 1222 at least a portion of the unfulfilled need (e.g., "Please provide temperature information in Fahrenheit from numerous locations in the Pacific Northwest") with the at least one skill offered by the one or more assigned distributed actors, information process 10 may: generate 1224 one or more response portions with the at least one skill offered by the one or more assigned distributed actors.

Specifically:
- outdoor temp skill 994 (available from distributed actor 958) may provide assigned distributed actor 962 with temperature 1002 (i.e., a temperature of 72° F.);
- temp skill 972 (available from distributed actor 950) may provide assigned distributed actor 962 with temperature 1004 (i.e., a temperature of 74° F.);
- temp skill 982 (available from distributed actor 954) may provide assigned distributed actor 962 with temperature 1006 (i.e., a temperature of 73° F.); and
- temp skill 988 (available from distributed actor 956) may provide assigned distributed actor 962 with temperature 1008 (i.e., a temperature of 78° F.).

As discussed above, information process 10 may form 1226 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 1228 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 1226 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 1228 bespoke response 1010 to that party (e.g., user 996).

Additionally and as discussed above, information process 10 may effectuate 1230, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1226 bespoke response 1010 that may identify "the first available flight from Boston, MA to Washington DC", wherein information process 10 may provide 1228 bespoke response 1010 to user 996 and may effectuate 1230 bespoke response 1010 by booking "the first available flight from Boston, MA to Washington DC".

ParaNet (Mapping)

As will be discussed below, information process 10 may map portions of a request concerning an unfulfilled need to one or more skills offered by the group of distributed actors, thus defining one or more skill mappings.

Figure 24:
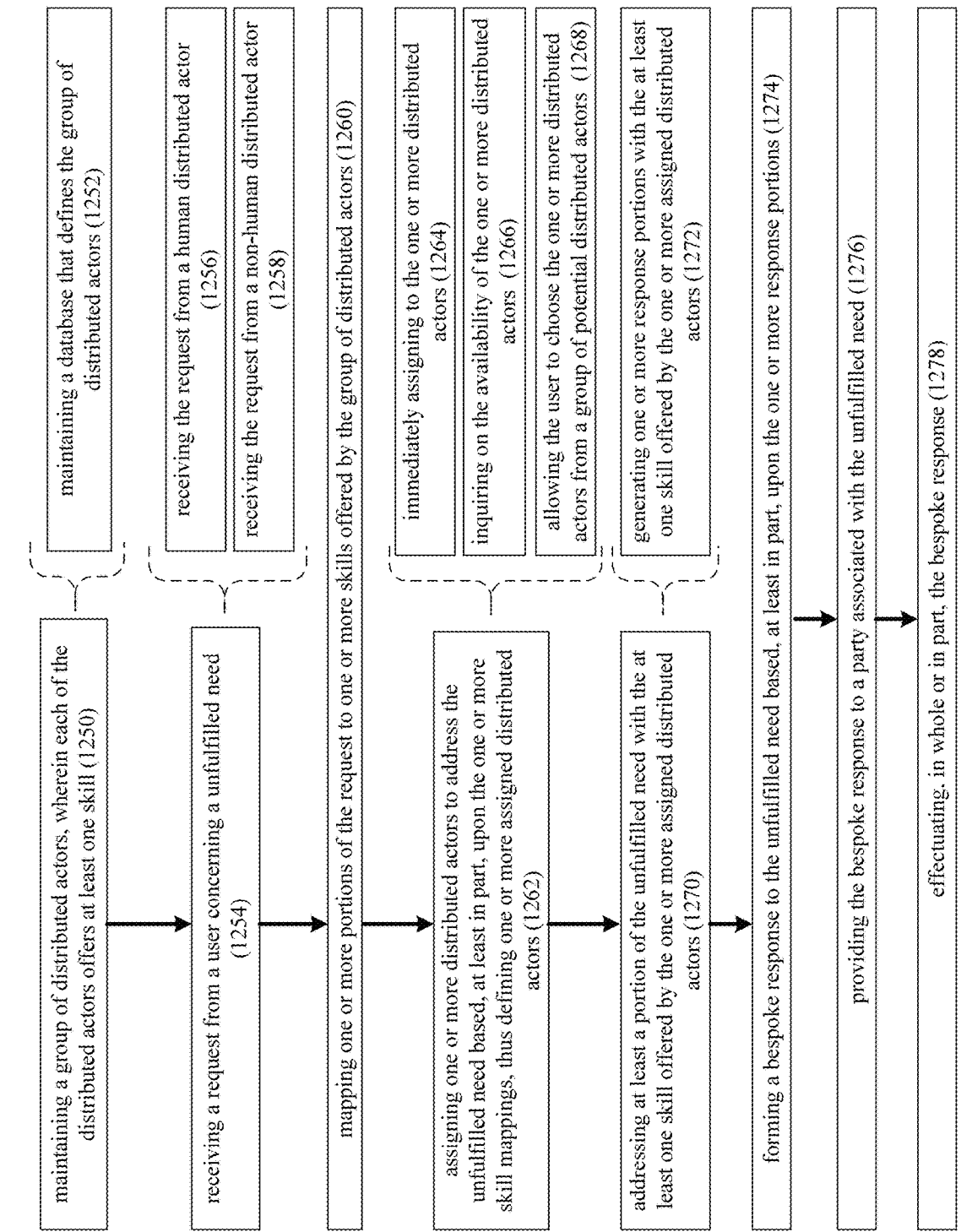
FIG. 24 is another flowchart of the information process of FIG. 1 according to an embodiment of the present disclosure.

As discussed above and referring also to FIG. 24, information process 10 may maintain 1250 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

As also discussed above and when maintaining 1250 a group of distributed actors (e.g., distributed actors 950, 952, 954, 956, 958, 960, 962, 964, 966, 968), information process 10 may: maintain 1252 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968).

As also discussed above, the group of distributed actors (e.g., distributed actors 950, 952, 954, 956, 958, 960, 962, 964, 966, 968) may include one or more of: a software platform; a software application; a virtual machine; and a web-based service.

As discussed above, information process 10 may monitor an environment (e.g., network 14) to detect the existence of an unfulfilled need. For example and while monitoring the environment, information process 10 may receive 1254 a request (e.g., request 998) from a user (e.g., user 996) concerning a unfulfilled need (e.g., "Please provide temperature information in Fahrenheit from numerous locations in the Pacific Northwest").

If the request (e.g., request 998) received 1254 is a text-based request and/or a speech-based request, information process 10 may process request 998 using Natural Language Processing (NLP) and/or Natural Language Understanding (NLU).

While the above-described example concerns request 998 being generated by a human being (e.g., user 996), this is for illustrative purposes only and is not intended to be a limitation of this disclosure, as other configurations are possible and are considered to be within the scope of this disclosure. For example and when receiving 1254 request 998, information process 10 may: receive 1256 the request (e.g., request 998) from a human distributed actor (e.g., user 996) and/or receive 1258 the request (e.g., request 998) from a non-human distributed actor (e.g., distributed actor 966).

Information process 10 may map 1260 one or more portions of the request (e.g., request 998) to one or more skills (e.g., skills 970, 972, 974, 976, 980, 982, 986, 988, 992, 994) offered by the group of distributed actors (e.g., distributed actors 950, 952, 954, 956, 958, 960, 962, 964, 966, 968), thus defining one or more skill mappings. For example and when mapping 1260 request 998 to the skills (e.g., skills 970, 972, 974, 976, 980, 982, 986, 988, 992, 994) offered by the group of distributed actors (e.g., distributed actors 950, 952, 954, 956, 958, 960, 962, 964, 966, 968), information process 10 may process request 998 to break the request down into various components (e.g., subject, verb, input requirements and output constraints).

Subject: In English grammar, the subject of a request (e.g., request 998) is the person, thing, or idea that the desired skill is applied to as described in the request (e.g., request 998). It usually comes at the beginning of the request (e.g., request 998), after the verb. For example, in the request (e.g., request 998) "I want a hamburger", the subject is "hamburger", as the desired result of the request is to obtain a hamburger. However, not all requests have a clear subject-verb-object structure. In some cases, the subject may come after the verb, or there may be multiple subjects in one request.

Verb: In English grammar, the verb is a key element of a request (e.g., request 998) that expresses an action, occurrence, or state of being. It is typically the word that follows the subject of the request (e.g., request 998) and helps to convey the meaning of the request (e.g., request 998). For example, in the request (e.g., request 998) "I want a hamburger", the verb is "want". It's important to note that not all requests (e.g., request 998) have an explicit verb, and some requests (e.g., request 998) may have multiple verbs. For example and with respect to the request (e.g., "Please provide temperature information in Fahrenheit from numerous locations in the Pacific Northwest"), the verb is the "provide", as it conveys the meaning of the request (e.g., request 998).

Input Requirements: The input requirements of a request (e.g., request 998) may generally define constraints on the distributed actor to be assigned to address the unfulfilled need. For example and with respect to the request (e.g., "Please provide temperature information in Fahrenheit from numerous locations in the Pacific Northwest"), the input requirements are "numerous locations" and "Pacific Northwest". In this example, distributed actors to be assigned to address the unfulfilled need must provide temperature information associated with locations within the Pacific Northwest.

Output Constraints: The output constraints of a request (e.g., request 998) may generally define limitations on what the requester (e.g., user 996) is seeking as an output from the distributed actor(s) assigned to address the unfulfilled need. For example and with respect to the request (e.g., "Please provide temperature information in Fahrenheit from numerous locations in the Pacific Northwest"), the output constraint is Fahrenheit temperature.

So for the request (e.g., "Please provide temperature information in Fahrenheit from numerous locations in the Pacific Northwest"), information process 10 may process the same to break the request down into the following components: Subject "temperature information", Verb "provide", Input Requirements "numerous locations" and "Pacific Northwest" and Output Constraint "Fahrenheit". In some implementations, requests may be formatted as natural language requests or as structured requests. For example, a non-human distributed actor using the paranet may provide request 998 as "subject: weather; action: fetch; input: locations: [{zip: xyz}, {city:seattle}, . . . ]; format: Fahrenheit". Accordingly, it will be appreciated that the structure of request 998 may vary depending on the user.

Distributed actors may have constraints that are used for skill mapping. For instance and continuing with the above example, assume (for this example) that all temperature skills offered by the group of distributed actors (e.g., distributed actors 950, 952, 954, 956, 958, 960, 962, 964, 966, 968) concern the "Pacific Northwest". Accordingly and with respect to the request (e.g., "Please provide temperature information in Fahrenheit from numerous locations in the Pacific Northwest"), information process 10 may map 1260 one or more portions of the request (e.g., request 998) to certain skills (e.g., skills 972, 982, 988, 994) that are offered by certain distributed actors (e.g., distributed actors 950, 954, 956, 958), thus defining one or more skill mappings (e.g., a skill mapping from request 998 to each of skills 972, 982, 988, 994). In this example, information process 10 may use these constraints to identify candidate distributed actors and to filter distributed actors with incompatible constraints when compared to the request (e.g., request 998). For example, information process 10 may filter distributed actors with a location outside of the Pacific Northwest from consideration for addressing the unfulfilled need of request 998.

Once the request (e.g., request 998) is mapped 1260, information process 10 may assign 1262 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest") based, at least in part, upon the one or more skill mappings (e.g., a skill mapping from request 998 to each of skills 972, 982, 988, 994), thus defining one or more assigned distributed actors (e.g., chosen from the group of distributed actors 950, 952, 954, 956, 958, 960, 962, 964, 966, 968).

While skills 972, 982, 988, 994 are provided organically by distributed actors (e.g., distributed actors 950, 954, 956, 958 respectively), other distributed actors may bundle skills that are provided by others. As discussed above, distributed actor 962 may be a temperature distributed actor (e.g., an actor that aggregates the temperature skills exposed by other actors). As distributed actor 962 is essentially a skill "bundler", the "skills" available via distributed actor 962 may include but are not limited to: outdoor temp skill 994 available from distributed actor 958, temp skill 972 available from distributed actor 950, temp skill 982 available from distributed actor 954, and temp skill 988 available from distributed actor 956.

When assigning 1262 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest"), information process 10 may: immediately assign 1264 to the one or more distributed actors (e.g., chosen from the group of distributed actors 950, 952, 954, 956, 958, 960, 962, 964, 966, 968); inquire 1266 on the availability of the one or more distributed actors (e.g., chosen from the group of distributed actors 950, 952, 954, 956, 958, 960, 962, 964, 966, 968); and/or allow 1268 the user (e.g., user 996) to choose the one or more distributed actors from a group of potential distributed actors (e.g., chosen from the group of distributed actors 950, 952, 954, 956, 958, 960, 962, 964, 966, 968).

Assume for this example that information process 10 immediately assigns 1264 distributed actor 962 (i.e., the "bundler") to address the unfulfilled need (e.g., "Please provide temperature information in Fahrenheit from numerous locations in the Pacific Northwest"). Accordingly, one or more of the assigned distributed actors (e.g., distributed actor 962) may interact, directly or indirectly, with one or more distributed sub-actors to address at least a portion of the unfulfilled need (e.g., "Please provide temperature information in Fahrenheit from numerous locations in the Pacific Northwest").

Specifically:
distributed actor 962 may interact, directly or indirectly, with distributed actor 958 to obtain outdoor temp skill 994;
distributed actor 962 may interact, directly or indirectly, with distributed actor 950 to obtain temp skill 972;
distributed actor 962 may interact, directly or indirectly, with distributed actor 954 to obtain temp skill 982; and
distributed actor 962 may interact, directly or indirectly, with distributed actor 956 to obtain temp skill 988.

As discussed above, information process 10 may address 1270 at least a portion of the unfulfilled need (e.g., "Please provide temperature information in Fahrenheit from numerous locations in the Pacific Northwest") with the at least one skill offered by the one or more assigned distributed actors. Specifically, information process 10 may address 1270 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

As discussed above, when addressing 1270 at least a portion of the unfulfilled need (e.g., "Please provide temperature information in Fahrenheit from numerous locations in the Pacific Northwest") with the at least one skill offered by the one or more assigned distributed actors, information process 10 may: generate 1272 one or more response portions with the at least one skill offered by the one or more assigned distributed actors.

Specifically:
outdoor temp skill 994 (available from distributed actor 958) may provide assigned distributed actor 962 with temperature 1002 (i.e., a temperature of 72° F.);
temp skill 972 (available from distributed actor 950) may provide assigned distributed actor 962 with temperature 1004 (i.e., a temperature of 74° F.);
temp skill 982 (available from distributed actor 954) may provide assigned distributed actor 962 with temperature 1006 (i.e., a temperature of 73° F.); and
temp skill 988 (available from distributed actor 956) may provide assigned distributed actor 962 with temperature 1008 (i.e., a temperature of 78° F.).

As discussed above, information process 10 may form 1274 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 1276 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 1274 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 1276 bespoke response 1010 to that party (e.g., user 996).

Additionally and as discussed above, information process 10 may effectuate 1278, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1274 bespoke response 1010 that may identify "the first available flight from Boston, MA to Washington DC", wherein information process 10 may provide 1276 bespoke response 1010 to user 996 and may effectuate 1278 bespoke response 1010 by booking "the first available flight from Boston, MA to Washington DC".

ParaNet (Initial Skill Definition)

As will be discussed below, information process 10 may enable the processing of a website (e.g., website 100) to identify one or more skills available within that website (e.g., website 100) so that such skills may be exposed and made available for use by distributed actors and/or users.

Figure 25:
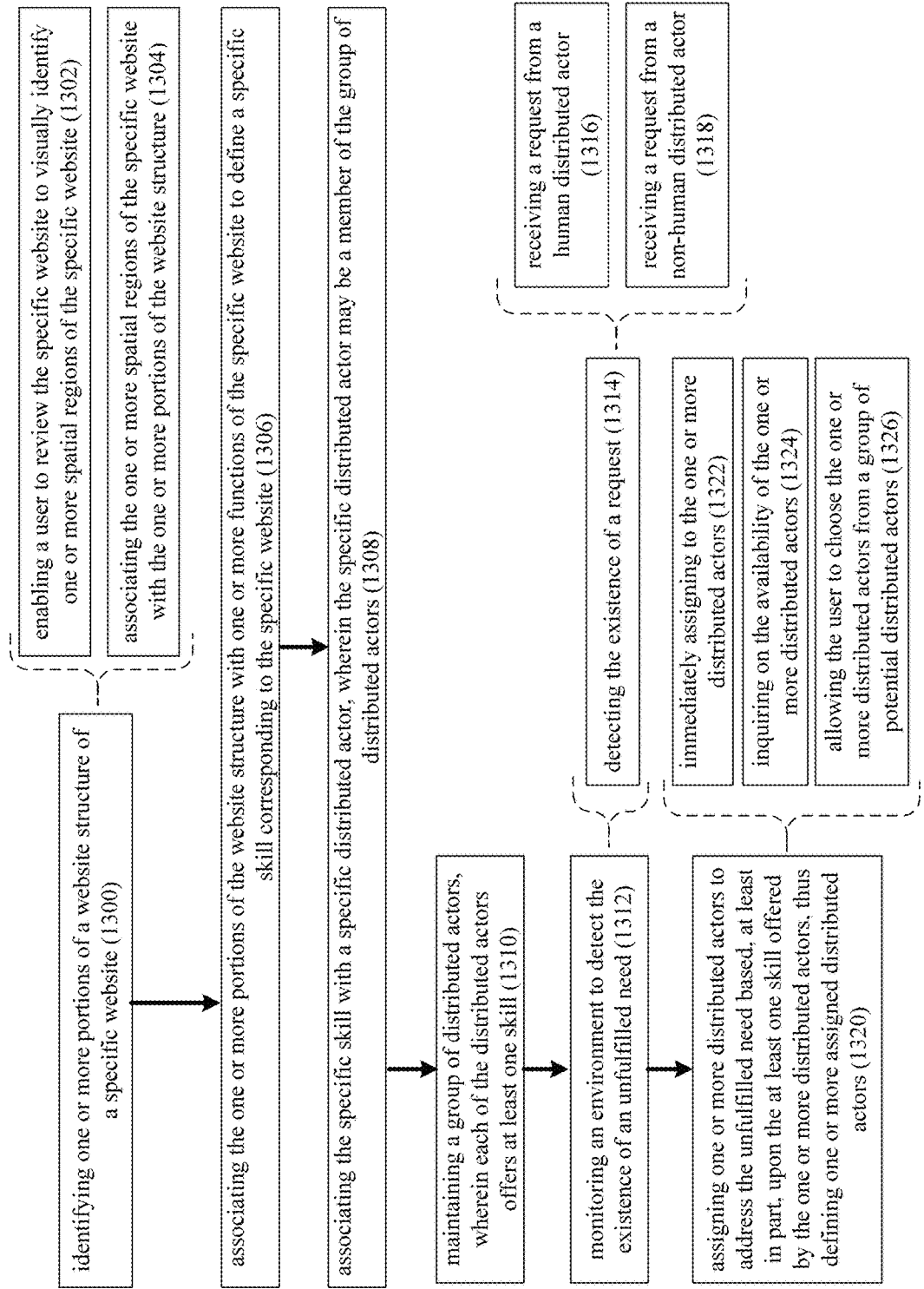
FIG. 25 is another flowchart of the information process of FIG. 1 according to an embodiment of the present disclosure.

Referring also to FIG. 25 and referring again to FIG. 2, information process 10 may enable a user (e.g., user 36) to review various websites (e.g., website 100), examples of which may include but are not limited to ecommerce websites, informational websites, news websites, and travel websites. Information process 10 may identify 1300 one or more portions of a website structure (e.g., website structure 54) of a specific website (e.g., website 100). Examples of such a website structure (e.g., website structure 54) may include one or more of: a HTML website structure; a javascript website structure; and a CSS website structure.

HTML Website Structure: The HyperText Markup Language (i.e., HTML) is the standard markup language for documents designed to be displayed in a web browser. It may be assisted by technologies such as Cascading Style Sheets (CSS) and scripting languages. Web browsers may receive HTML documents from a web server or from local storage and render the documents into multimedia web pages. HTML may describe the structure of a web page semantically and originally included cues for the appearance of the document. HTML elements may be the building blocks of HTML pages. With HTML constructs, images and other objects such as interactive forms may be embedded into the rendered page. HTML may provide a means to create structured documents by denoting structural semantics for text such as headings, paragraphs, lists, links, quotes and other items. HTML elements may be delineated by tags, written using angle brackets. Tags such as <img /> and <input /> directly introduce content into the page. Other tags such as <p> may surround and provide information about document text and may include other tags as sub-elements. Browsers do not display the HTML tags, but use them to interpret the content of the page.

Javascript Website Structure: JavaScript (JS) is a programming language that conforms to the ECMAScript specification. JavaScript is high-level, often just-in-time compiled, and multi-paradigm. It may have curly-bracket syntax, dynamic typing, prototype-based object-orientation, and first-class functions. Alongside HTML and CSS, JavaScript is one of the core technologies of the World Wide Web. Over 97% of websites use it client-side for web page behavior, often incorporating third-party libraries. All major web browsers have a dedicated JavaScript engine to execute the code on the user's device. As a multi-paradigm language, JavaScript may support event-driven, functional, and imperative programming styles. It may have application programming interfaces (APIs) for working with text, dates, regular expressions, standard data structures, and the Document Object Model (DOM).

CSS Website Structure: Cascading Style Sheets (CSS) is a style sheet language used for describing the presentation of a document written in a markup language such as HTML. CSS is a cornerstone technology of the World Wide Web, alongside HTML and JavaScript. CSS is designed to enable the separation of presentation and content, including layout, colors, and fonts. This separation can improve content accessibility, provide more flexibility and control in the specification of presentation characteristics, enable multiple web pages to share formatting by specifying the relevant CSS in a separate .css file which reduces complexity and repetition in the structural content as well as enabling the .css file to be cached to improve the page load speed between the pages that share the file and its formatting. Separation of formatting and content may make it feasible to present the same markup page in different styles for different rendering methods, such as on-screen, in print, by voice (via speech-based browser or screen reader), and on Braille-based tactile devices. CSS may also have rules for alternate formatting if the content is accessed on a mobile device.

When identifying 1300 one or more portions of a website structure (e.g., website structure 54) of a specific website (e.g., website 100), information process 10 may: enable 1302 a user (e.g., user 36) to review the specific website (e.g., website 100) to visually identify one or more spatial regions of the specific website (e.g., website 100); and/or associate 1304 the one or more spatial regions of the specific website (e.g., website 100) with the one or more portions of the website structure (e.g., website structure 54).

For example, information process 10 may enable 1302 user 36 to review website 100 to visually identify spatial regions 102, 104 of website 100 (via selection with a mouse, not shown) and associate 1304 spatial regions 102, 104 of website 100 with structure portions 106, 108 (respectively) of website structure 54. In some implementations, when user 36 visually identifies a spatial region (e.g., one of spatial regions 102, 104) of website 100, information process 10 may automatically associate 1304 the identified spatial region (e.g., one of spatial regions 102, 104) with the corresponding portion (e.g., one of structure portions 106, 108 respectively) of the website structure (e.g., website structure 54) of the specific website (e.g., website 100).

Additionally, information process 10 may associate 1306 the one or more portions (e.g., structure portions 106, 108) of the website structure (e.g., website structure 54) with one or more functions of the specific website (e.g., website 100) to define a specific skill corresponding to the specific website (e.g., website 100). For example and with respect to website 100, the specific skills concern e-commerce functions. Specifically, spatial regions 102 concerns the "price selection" skill (as defined within structure portion 106) and spatial region 104 concerns the "size selection" skill (as defined within structure portion 108). However, the type of skills defined on a website will vary depending upon the type of website. Accordingly, one or more portions of the structure of weather website 950 may be associated 1306 with weather-related skills (e.g., forecast skill 970 & temp skill 972); while one or more portions of the structure of travel website 952 may be associated 1306 with travel-related skills (e.g., tickets skill 974 & refunds skill 976).

Information process 10 may associate 1308 the specific skill with a specific distributed actor, wherein the specific distributed actor may be a member of the group of distributed actors (e.g., chosen from the group of distributed actors 950, 952, 954, 956, 958, 960, 962, 964, 966, 968). For example and as discussed above, information process 10 may: enable 1302 a user (e.g., user 1016) to review a specific website (e.g., travel website 952) to visually identify one or more spatial regions (e.g., spatial region 1016) of the specific website (e.g., travel website 952); and/or associate 1304 the one or more spatial regions (e.g., spatial region 1016) of the specific website (e.g., travel website 952) with the one or more portions (e.g., portion 1018) of the website structure (e.g., HTML website structure; a javascript website structure; and a CSS website structure) of travel website 952. Assume that through the above-described process of enabling 1302 and associating 1304, a new skill is identified within travel website 952, namely hotel skill 1020. Accordingly, information process 10 may associate 1308 this specific skill (e.g., hotel skill 1020) with a specific distributed actor (e.g., distributed actor 960), wherein this specific distributed actor (e.g., distributed actor 960) may be a member of the group of distributed actors (e.g., chosen from the group of distributed actors 950, 952, 954, 956, 958, 960, 962, 964, 966, 968); thus exposing this specific skill (e.g., hotel skill 1020) and enabling others (e.g., other distributed actors or users) to use this specific skill (e.g., hotel skill 1020).

As discussed above, information process 10 may maintain 1310 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill. As discussed above, the group of distributed actors (e.g., distributed actors 950, 952, 954, 956, 958, 960, 962, 964, 966, 968) may include one or more of: a software platform; a software application; a virtual machine; and a web-based service. In this example, the group of distributed actors may include distributed actors (e.g., distributed actors 952) associated with the specific website (e.g., respective websites) that offer the specific skill (e.g., hotel skill 1020) corresponding to the specific website.

As discussed above, information process 10 may monitor 1312 an environment (e.g., network 14) to detect the existence of an unfulfilled need. For example and when monitoring 1312 an environment to detect the existence of an unfulfilled need, information process 10 may: detect 1314 the existence of a request. For this example, assume that a user (e.g., user 996) is an amateur weather researcher and is looking for information on temperature conditions. Accordingly, information process 10 may monitor 1312 an environment (e.g., network 14) to detect 1314 request 998 issued by user 996. For example, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest".

As discussed above, when detecting 1314 the existence of a request (e.g., request 998), information process 10 may: receive 1316 a request (e.g., request 998) from a human distributed actor (e.g., user 996) and/or receive 1318 a request (e.g., request 998) from a non-human distributed actor (e.g., distributed actor 966).

Once the request (e.g., request 998) is detected 1314, information process 10 may assign 1320 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest") based, at least in part, upon the at least one skill offered by the one or more distributed actors 950, 952, 954, 956, 958, 960, 962, 964, 966, 968), thus defining one or more assigned distributed actors.

When assigning 1320 one or more distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest"), information process 10 may: immediately assign 1322 to the one or more distributed actors (e.g., chosen from the group of distributed actors 950, 952, 954, 956, 958, 960, 962, 964, 966, 968); inquire 1324 on the availability of the one or more distributed actors (e.g., chosen from the group of distributed actors 950, 952, 954, 956, 958, 960, 962, 964, 966, 968); and/or allow 1326 the user (e.g., user 996) to choose the one or more distributed actors from a group of potential distributed actors (e.g., chosen from the group of distributed actors 950, 952, 954, 956, 958, 960, 962, 964, 966, 968).

Assume for this example that information process 10 immediately assigns 1322 distributed actor 962 to address the unfulfilled need (e.g., "Please provide temperature information in Fahrenheit from numerous locations in the Pacific Northwest"), thus defining distributed actor 962 as an assigned distributed actor (wherein such an assignment is represented by dashed arrow 1000).

As discussed above, distributed actor 962 offers all four of the identified skills (e.g., outdoor temp skill 994 through distributed actor 958, temp skill 972 through distributed actor 950, temp skill 982 through distributed actor 954, and temp skill 988 through distributed actor 956); even though distributed actor 962 does not organically offer any of these identified skills.

Accordingly, one or more assigned distributed actors (e.g., distributed actor 962) may interact, directly or indirectly, with one or more distributed sub-actors (e.g., distributed sub-actors 958, 950, 954, 956) to address at least a portion of the unfulfilled need (e.g., "Please provide temperature information in Fahrenheit from numerous locations in the Pacific Northwest").

Specifically:
  distributed sub-actors 958 may address at least a portion of the unfulfilled need by providing outdoor temp skill 994 to distributed actor 962;
  distributed sub-actors 950 may address at least a portion of the unfulfilled need by providing temp skill 972 to distributed actor 962;
  distributed sub-actors 954 may address at least a portion of the unfulfilled need by providing temp skill 982 to distributed actor 962; and
  distributed sub-actors 956 may address at least a portion of the unfulfilled need by providing temp skill 988 to distributed actor 962.

ParaNet (New Skill Generation)

As will be discussed below, information process 10 may enable the generation of a new skill in response to an unfulfilled need requiring a skill that is currently not available.

Figure 26:
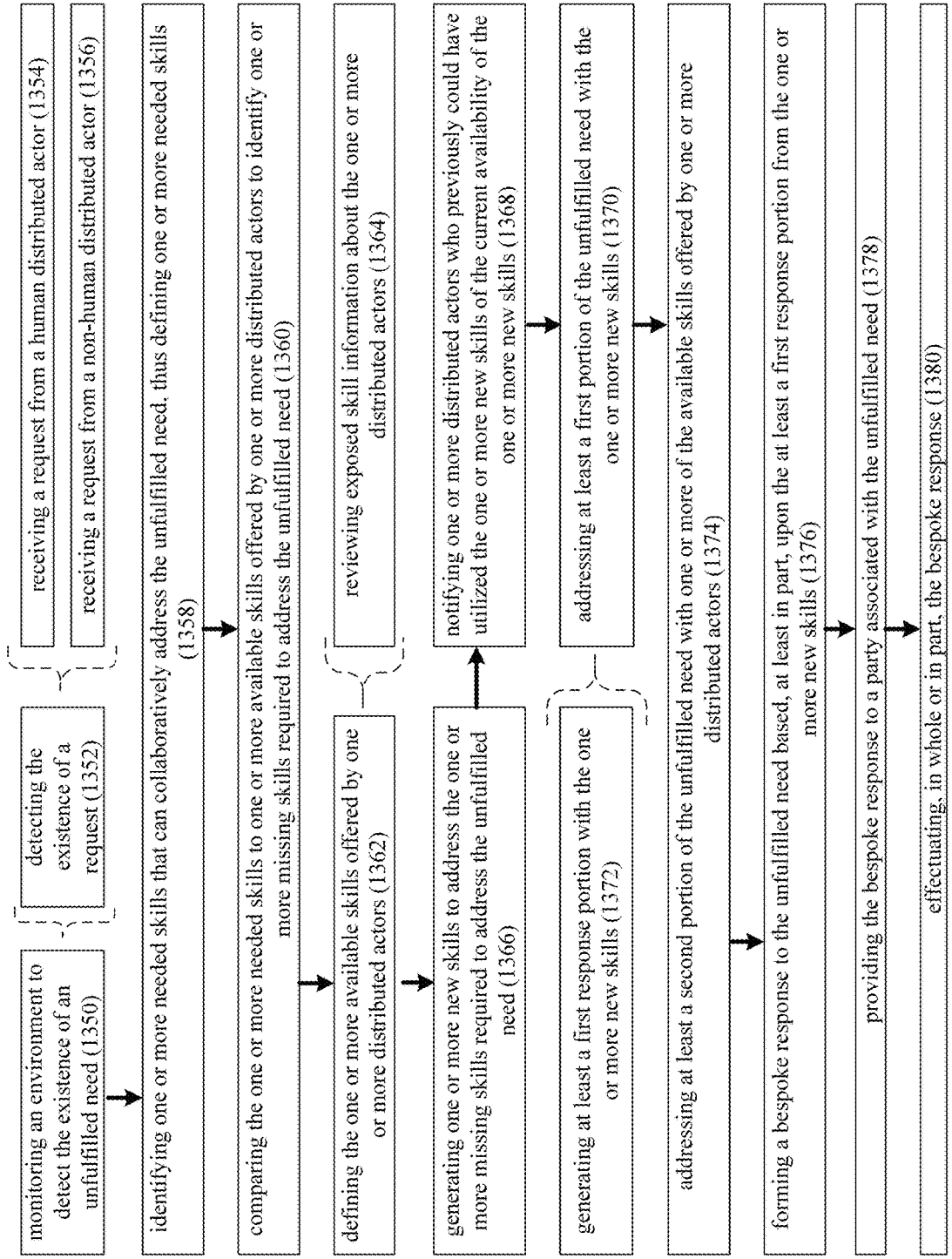
FIG. 26 is another flowchart of the information process of FIG. 1 according to an embodiment of the present disclosure.

Referring also to FIG. 26 and as discussed above, information process 10 may monitor 1350 an environment (e.g., network 14) to detect the existence of an unfulfilled need. For example and when monitoring 1350 an environment to detect the existence of an unfulfilled need, information process 10 may: detect 1352 the existence of a request. For this example, assume that a user (e.g., user 996) is an amateur weather researcher and is looking for information on temperature conditions. Accordingly, information process 10 may monitor 1350 an environment (e.g., network 14) to detect 1352 request 998 issued by user 996. For example, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest and in Western Europe".

As discussed above, when detecting 1352 the existence of a request (e.g., request 998), information process 10 may: receive 1354 a request (e.g., request 998) from a human distributed actor (e.g., user 996) and/or receive 1356 a request (e.g., request 998) from a non-human distributed actor (e.g., distributed actor 966).

Information process 10 may identify 1358 one or more needed skills that can collaboratively address the unfulfilled need (e.g., "Please provide temperature information in Fahrenheit from numerous locations in the Pacific Northwest and in Western Europe"), thus defining one or more needed skills. Accordingly, information process 10 may identify 1358 that "Pacific Northwest" temperature skills and "Western Europe" temperature skills would be needed to collaboratively address the unfulfilled need (e.g., "Please provide temperature information in Fahrenheit from numerous locations in the Pacific Northwest and in Western Europe"), thus defining one or more needed skills (e.g., "Pacific Northwest" temperature skills and "Western Europe" temperature skills).

Information process 10 may compare 1360 the one or more needed skills (e.g., "Pacific Northwest" temperature skills and "Western Europe" temperature skills) to one or more available skills offered by one or more distributed actors (e.g., chosen from the group of distributed actors 950, 952, 954, 956, 958, 960, 962, 964, 966, 968) to identify one or more missing skills required to address the unfulfilled need (e.g., "Please provide temperature information in Fahrenheit from numerous locations in the Pacific Northwest and in Western Europe"). As discussed above, the group of distributed actors (e.g., distributed actors 950, 952, 954, 956, 958, 960, 962, 964, 966, 968) may include one or more of: a software platform; a software application; a virtual machine; and a web-based service.

Accordingly and in response to such a comparison 1360, information process 10 may define 1362 the one or more available skills (e.g., "Pacific Northwest" temperature skills) offered by one or more distributed actors (e.g., distributed actors 950, 952, 954, 956, 958, 960, 962, 964, 966, 968). When defining 1362 the one or more available skills (e.g., "Pacific Northwest" temperature skills) offered by one or more distributed actors, information process 10 may: review 1364 exposed skill information about the one or more distributed actors (e.g., distributed actors 950, 952, 954, 956, 958, 960, 962, 964, 966, 968). For example, information process 10 may review 1364 exposed skill information about the one or more distributed actors (e.g., distributed actors 950, 952, 954, 956, 958, 960, 962, 964, 966, 968). As discussed above and with respect to "Pacific Northwest" temperature skills: outdoor temp skill 994 is available from distributed actor 958, temp skill 972 is available from distributed actor 950, temp skill 982 is available from distributed actor 954, and temp skill 988 is available from distributed actor 956.

Therefore and when comparing 1360 the one or more needed skills (e.g., "Pacific Northwest" temperature skills and "Western Europe" temperature skills) to one or more available skills ("Pacific Northwest" temperature skills 994, 972, 982, 988) offered by the group of distributed actors (e.g., distributed actors 950, 952, 954, 956, 958, 960, 962, 964, 966, 968) to identify one or more missing skills required to address the unfulfilled need (e.g., "Please provide temperature information in Fahrenheit from numerous locations in the Pacific Northwest and in Western Europe"), information process 10 may determine that "Western Europe" temperature skills are missing and are required to address the unfulfilled need (e.g., "Please provide temperature information in Fahrenheit from numerous locations in the Pacific Northwest and in Western Europe").

Accordingly, information process 10 may generate 1366 one or more new skills to address the one or more missing skills (e.g., "Western Europe" temperature skills) required to address the unfulfilled need (e.g., "Please provide temperature information in Fahrenheit from numerous locations in the Pacific Northwest and in Western Europe"), wherein these one or more new skills may include one or more machine-generated skills and/or one or more human-generated skills.

For example, information process 10 may generate 1366 one or more new skills (e.g., "Western Europe" temperature skills) to address the unfulfilled need (e.g., "Please provide temperature information in Fahrenheit from numerous locations in the Pacific Northwest and in Western Europe") by e.g., combing the internet (e.g., via machines or humans) to identify one or more websites that offer "Western Europe" temperature skills and/or one or more distributed actors that offer "Western Europe" temperature skills. And if such "Western Europe" temperature skills are not currently available from any websites or distributed actors, information process 10 may process (via machines or humans) information sources using the above-described process of enabling 1302 and associating 1304 to generate 1366 "Western Europe" temperature skills and/or a distributed actor to address the unfulfilled need (e.g., "Please provide temperature information in Fahrenheit from numerous locations in the Pacific Northwest and in Western Europe").

Assume that information process 10 generates 1366 the new skill (e.g., European temps skill 1022) via information available of European weather website 1024. Once this new skill (e.g., European temps skill 1022) is generated 1366, information process 10 may notify 1368 one or more distributed actors who previously could have utilized this new skill (e.g., European temps skill 1022) of the current availability of European temps skill 1022. Therefore, assume it took a week for this new skill (e.g., European temps skill 1022) to be generated 1366. Accordingly and once generated 1366, information process 10 may notify 1368 user 996 (e.g., the original requester of the skill via their unfulfilled need) that European temps skill 1022 is currently available. Generally speaking and as used in this disclosure, European weather website 1024 may be a website that includes functionality (e.g., via an applet or a plugin) that enables the website to effectuate the above-described functionality of a distributed actor. Additionally/alternatively and if the website is to remain unmodified, the website may utilize a decoupled interface (e.g., interface 1021) to effectuate such distributed actor functionality (without needing to modify the website).

Information process 10 may address 1370 at least a first portion (e.g., the "Western Europe" temperature portion) of the unfulfilled need (e.g., "Please provide temperature information in Fahrenheit from numerous locations in the Pacific Northwest and in Western Europe") with the one or more new skills (e.g., European temps skill 1022).

When addressing 1370 at least a first portion (e.g., the "Western Europe" temperature portion) of the unfulfilled need (e.g., "Please provide temperature information in Fahrenheit from numerous locations in the Pacific Northwest and in Western Europe") with the one or more new skills (e.g., European temps skill 1022), information process 10 may generate 1372 at least a first response portion (e.g., temperature 1026 defining a temperature of 68° F.) with the one or more new skills (e.g., European temps skill 1022).

Information process 10 may address 1374 at least a second portion (e.g., the "Pacific Northwest" temperature portion) of the unfulfilled need (e.g., "Please provide temperature information in Fahrenheit from numerous locations in the Pacific Northwest and in Western Europe") with one or more of the available skills offered by one or more distributed actors (e.g., distributed actors 950, 952, 954, 956, 958, 960, 962, 964, 966, 968).

Examples of such available skills offered by the one or more distributed actors include:
- outdoor temp skill 994 (available from distributed actor 958) that provides temperature 1002 (i.e., a temperature of 72° F.);
- temp skill 972 (available from distributed actor 950) that provides temperature 1004 (i.e., a temperature of 74° F.);
- temp skill 982 (available from distributed actor 954) that provides temperature 1006 (i.e., a temperature of 73° F.); and
- temp skill 988 (available from distributed actor 956) that provides temperature 1008 (i.e., a temperature of 78° F.).

Information process 10 may form 1376 a bespoke response (e.g., bespoke response 1010) to the unfulfilled need (e.g., "Please provide temperature information in Fahrenheit from numerous locations in the Pacific Northwest and in Western Europe") based, at least in part, upon the at least a first response portion (e.g., temperature 1026 defining a temperature of 68° F.) from the one or more new skills (e.g., European temps skill 1022).

Information process 10 may provide 1378 the bespoke response (e.g., bespoke response 1010) to a party (e.g., user 996) associated with the unfulfilled need (e.g., "Please provide temperature information in Fahrenheit from numerous locations in the Pacific Northwest and in Western Europe").

Additionally and as discussed above, information process 10 may effectuate 1380, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1376 bespoke response 1010 that may identify "the first available flight from Boston, MA to Washington DC", wherein information process 10 may provide 1378 bespoke response 1010 to user 996 and may effectuate 1380 response 1010 by booking "the first available flight from Boston, MA to Washington DC".

In some implementations, information process 10 may generate new distributed actors for new or existing skills. For example, new distributed actors may be generated to fulfill the above-described unfulfilled need (e.g., "Please provide temperature information in Fahrenheit from numerous locations in the Pacific Northwest") but using a different resource or website to provide faster/more reliable results. In this manner, distributed actors may be added to address limitations in existing distributed actors, limitations in QoS characteristics, and/or in response to new unfulfilled needs.

ParaNet (SubNet Actors)

As will be discussed below, information process 10 may enable the group of distributed actors to be compartmentalized into a plurality of network groups, thus enabling enhanced security and/or privacy.

Figure 27:
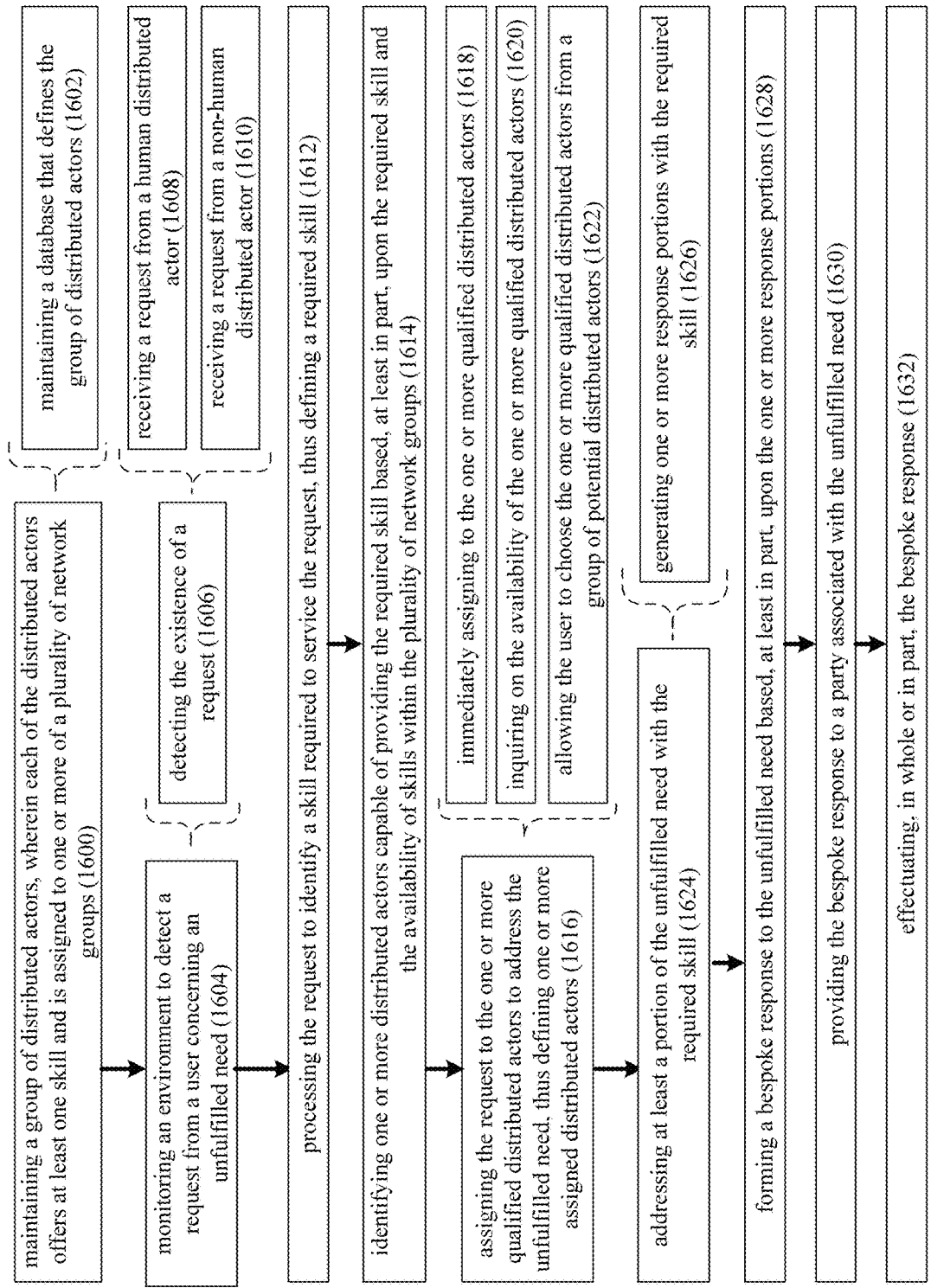
FIG. 27 is another flowchart of the information process of FIG. 1 according to an embodiment of the present disclosure.

As discussed above and referring also to FIG. 27, information process 10 may maintain 1600 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

As also discussed above and when maintaining 1600 a group of distributed actors (e.g., distributed actors 950, 952, 954, 956, 958, 960, 962, 964, 966, 968), information process 10 may: maintain 1602 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968).

As also discussed above, the group of distributed actors (e.g., distributed actors 950, 952, 954, 956, 958, 960, 962, 964, 966, 968) may include one or more of: a software platform; a software application; a virtual machine; and a web-based service.

Further, each of the distributed actors (e.g., distributed actors 950, 952, 954, 956, 958, 960, 962, 964, 966, 968) may be assigned to one or more of a plurality of network groups (e.g., plurality of network groups 1028). Each of this plurality of network groups 1028 may be thought of as a subnet.

As is known in the art, a subnet is a portion of a larger network that has been divided for the purpose of improving network performance, security, and organization. Subnetting is the process of dividing a single network into multiple smaller subnetworks, each with its own unique network address. By creating subnets, network administrators can efficiently manage the flow of traffic and optimize network performance by reducing broadcast traffic, minimizing network congestion, and improving security.

Accordingly, a first network group (e.g., network group 1030) within plurality of network groups 1028 may be configured for the exclusive use of XYZ Corporation, while a second network group (e.g., network group 1032) within plurality of network groups 1028 may be configured for the exclusive use of ABC Corporation.

As discussed above, information process 10 may monitor 1604 an environment (e.g., network 14) to detect a request (e.g., request 998) from a user (e.g., user 996) concerning an unfulfilled need (e.g., "Please provide temperature information in Fahrenheit from numerous locations in the Pacific Northwest"). For example, assume that when monitoring 1604 an environment (e.g., network 14) to detect a request (e.g., request 998) from a user (e.g., user 996) concerning an unfulfilled need (e.g., "Please provide temperature information in Fahrenheit from numerous locations in the Pacific Northwest"), information process 10 detects 1606 the existence of request 998, namely "Please provide temperature information in Fahrenheit from numerous locations in the Pacific Northwest". As discussed above, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest".

While the above-described example concerns request 998 being generated by a human being (e.g., user 996), this is for illustrative purposes only and is not intended to be a limitation of this disclosure, as other configurations are possible and are considered to be within the scope of this disclosure. For example and when detecting 1606 the existence of a request (e.g., request 998), information process 10 may: receive 1608 a request (e.g., request 998) from a human distributed actor (e.g., user 996) and/or receive 1610 a request (e.g., request 998) from a non-human distributed actor (e.g., distributed actor 966).

Information process 10 may process 1612 the request (e.g., request 998) to identify a skill required to service the request (e.g., request 998), thus defining a required skill. As discussed above, request 998 concerns temperatures in the Pacific Northwest.

Examples of such applicable skills may include:
outdoor temp skill 994 (available from distributed actor 958) that provides temperature 1002 (i.e., a temperature of 72° F.);
temp skill 972 (available from distributed actor 950) that provides temperature 1004 (i.e., a temperature of 74° F.);
temp skill 982 (available from distributed actor 954) that provides temperature 1006 (i.e., a temperature of 73° F.); and
temp skill 988 (available from distributed actor 956) that provides temperature 1008 (i.e., a temperature of 78° F.).

Information process 10 may identify 1614 one or more distributed actors capable of providing the required skill (e.g., temperature skills in the Pacific Northwest) based, at least in part, upon the required skill (e.g., temperature skills in the Pacific Northwest) and the availability of skills within the plurality of network groups (e.g., plurality of network groups 1028), thus defining one or more qualified distributed actors.

For example and concerning the qualified distributed actors:
distributed actor 958 offers outdoor temp skill 994 that provides temperature 1002 (i.e., a temperature of 72° F.);
distributed actor 950 offers temp skill 972 that provides temperature 1004 (i.e., a temperature of 74° F.);
distributed actor 954 offers temp skill 982 that provides temperature 1006 (i.e., a temperature of 73° F.); and
distributed actor 956 offers temp skill 988 that provides temperature 1008 (i.e., a temperature of 78° F.).

As discussed above, information process 10 may identify 1614 one or more distributed actors capable of providing the required skill (e.g., temperature skills in the Pacific Northwest) based, at least in part, upon the required skill (e.g., temperature skills in the Pacific Northwest) AND the availability of skills (e.g., temperature skills in the Pacific Northwest) within the plurality of network groups (e.g., plurality of network groups 1028). Accordingly, if distributed actors 950, 954, 956, 958 are all members of network group 1030 and user 996 is a member of (or has access to) network group 1030, all of skills 972, 982, 988, 994 may be available to user 996. However, if distributed actors 950, 954, 956, 958 are all members of network group 1030 and user 996 is not a member of (nor has access to) network group 1030, none of skills 972, 982, 988, 994 will be available to user 996. Further, if distributed actors 950, 954 are members of network group 1030, distributed actors 956, 958 are members of network group 1032, and user 996 is a member of (or has access to) network group 1030 but is not a member of (nor has access to) network group 1032, only skills 972, 982 will be available to user 996 (as skills 972, 982 are offered by distributed actors 950, 954 (respectively)).

Information process 10 may assign 1616 the request (e.g., request 998) to the one or more qualified distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest"), thus defining one or more assigned distributed actors.

Assume for this example that distributed actors 950, 954, 956, 958 are all members of network group 1030 and user 996 is a member of (or has access to) network group 1030. Accordingly, all of skills 972, 982, 988, 994 may be available to user 996. Therefore, the one or more assigned distributed actors may include distributed actors 950, 954, 956, 958.

When assigning 1616 the request (e.g., request 998) to the one or more qualified distributed actors (e.g., distributed actors 950, 954, 956, 958) to address the unfulfilled need (e.g., "Please provide temperature information in Fahrenheit from numerous locations in the Pacific Northwest"), information process 10 may: immediately assign 1618 to the one or more qualified distributed actors (e.g., distributed actors 950, 954, 956, 958); inquire 1620 on the availability of the one or more qualified distributed actors (e.g., distributed actors 950, 954, 956, 958); and/or allow 1622 the user to choose the one or more qualified distributed actors from a group of potential distributed actors (e.g., distributed actors 950, 954, 956, 958).

Assume for this example that information process 10 immediately assigns 1618 distributed actor 962 to address the unfulfilled need (e.g., "Please provide temperature information in Fahrenheit from numerous locations in the Pacific Northwest") based, at least in part, upon distributed actor 962 offering all four of the identified skills (e.g., outdoor temp skill 994 through distributed actor 958, temp skill 972 through distributed actor 950, temp skill 982 through distributed actor 954, and temp skill 988 through distributed actor 956), thus defining distributed actor 962 as an assigned distributed actor (wherein such an assignment is represented by dashed arrow 1000). Also assume that distributed actor 962 is a member of network group 1030.

Accordingly, one or more of the assigned distributed actors (e.g., distributed actor 962) may interact, directly or indirectly, with one or more distributed sub-actors to address at least a portion of the unfulfilled need (e.g., "Please provide temperature information in Fahrenheit from numerous locations in the Pacific Northwest").

Specifically:
distributed actor 962 may interact, directly or indirectly, with distributed actor 958 to obtain outdoor temp skill 994;

distributed actor 962 may interact, directly or indirectly, with distributed actor 950 to obtain temp skill 972;

distributed actor 962 may interact, directly or indirectly, with distributed actor 954 to obtain temp skill 982; and distributed actor 962 may interact, directly or indirectly, with distributed actor 956 to obtain temp skill 988.

As discussed above, information process 10 may address 1624 at least a portion of the unfulfilled need (e.g., "Please provide temperature information in Fahrenheit from numerous locations in the Pacific Northwest") with the required skill. Specifically, information process 10 may address 1624 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

As discussed above, when addressing 1624 at least a portion of the unfulfilled need (e.g., "Please provide temperature information in Fahrenheit from numerous locations in the Pacific Northwest") with the required skill, information process 10 may generate 1626 one or more response portions with the required skill. Specifically:

outdoor temp skill 994 (available from distributed actor 958) may provide assigned distributed actor 962 with temperature 1002 (i.e., a temperature of 72° F.);

temp skill 972 (available from distributed actor 950) may provide assigned distributed actor 962 with temperature 1004 (i.e., a temperature of 74° F.);

temp skill 982 (available from distributed actor 954) may provide assigned distributed actor 962 with temperature 1006 (i.e., a temperature of 73° F.); and temp skill 988 (available from distributed actor 956) may provide assigned distributed actor 962 with temperature 1008 (i.e., a temperature of 78° F.).

As discussed above, information process 10 may form 1628 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 1630 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 1628 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 1630 bespoke response 1010 to that party (e.g., user 996).

Additionally and as discussed above, information process 10 may effectuate 1632, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1628 bespoke response 1010 that may identify "the first available flight from Boston, MA to Washington DC", wherein information process 10 may provide 1630 bespoke response 1010 to user 996 and may effectuate 1632 bespoke response 1010 by booking "the first available flight from Boston, MA to Washington DC".

ParaNet (Reviewing Conversations)

As will be discussed below, information process 10 may enable the assigned distributed actors to review previous content authored by a user (requests, conversations, etc.) to define preferences so that responses to unfulfilled needs may be more tightly tailored.

Figure 28:
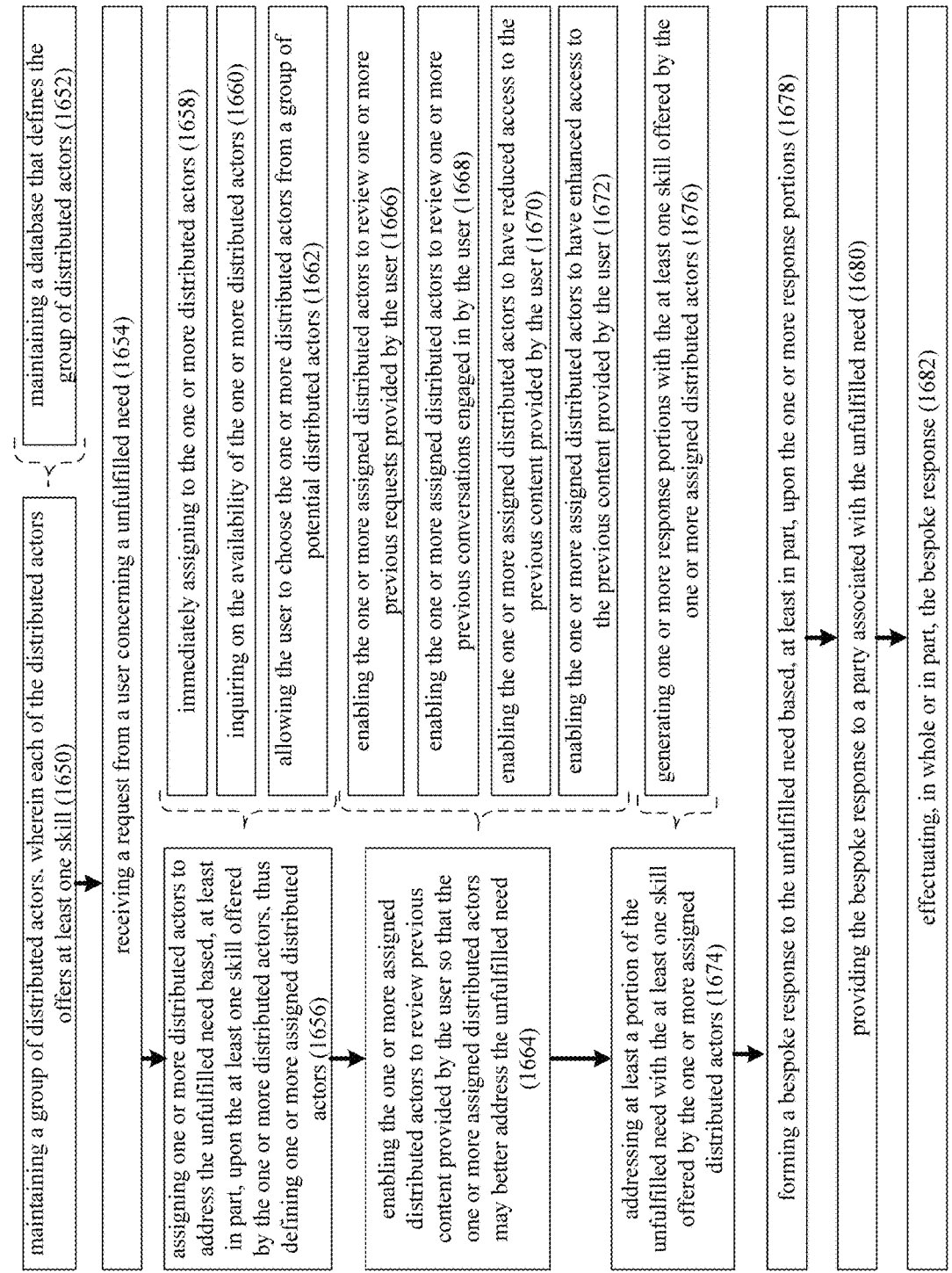
FIG. 28 is another flowchart of the information process of FIG. 1 according to an embodiment of the present disclosure.

As discussed above and referring also to FIG. 28, information process 10 may maintain 1650 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

As also discussed above and when maintaining 1650 a group of distributed actors (e.g., distributed actors 950, 952, 954, 956, 958, 960, 962, 964, 966, 968), information process 10 may: maintain 1652 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968). As also discussed above, the group of distributed actors (e.g., distributed actors 950, 952, 954, 956, 958, 960, 962, 964, 966, 968) may include one or more of: a software platform; a software application; a virtual machine; and a web-based service.

As discussed above, information process 10 may monitor an environment (e.g., network 14) to detect the existence of an unfulfilled need. For example and while monitoring the environment, information process 10 may receive 1654 a request (e.g., request 998) from a user (e.g., user 996) concerning a unfulfilled need (e.g., "Please provide temperature information in Fahrenheit from numerous locations in the Pacific Northwest").

Information process 10 may assign 1656 one or more qualified distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest") based, at least in part, upon the at least one skill offered by the one or more distributed actors, thus defining one or more assigned distributed actors When assigning 1656 one or more qualified distributed actors (e.g., chosen from the group of distributed actors 950, 952, 954, 956, 958, 960, 962, 964, 966, 968) to address the unfulfilled need (e.g., "Please provide temperature information in Fahrenheit from numerous locations in the Pacific Northwest"), information process 10 may: immediately assign 1658 the one or more qualified distributed actors (e.g., distributed actors 950, 954, 956, 958); inquire 1660 on the availability of the one or more qualified distributed actors (e.g., distributed actors 950, 954, 956, 958); and/or allow 1662 the user to choose the one or more qualified distributed actors from a group of potential distributed actors (e.g., chosen from the group of distributed actors 950, 952, 954, 956, 958, 960, 962, 964, 966, 968).

As discussed above and for this example, assume that information process 10 immediately assigns 1658 distributed actor 962 to address the unfulfilled need (e.g., "Please provide temperature information in Fahrenheit from numerous locations in the Pacific Northwest") based, at least in part, upon distributed actor 962 offering all four of the identified skills (e.g., outdoor temp skill 994 through distributed actor 958, temp skill 972 through distributed actor 950, temp skill 982 through distributed actor 954, and temp skill 988 through distributed actor 956), thus defining distributed actor 962 as an assigned distributed actor (wherein such an assignment is represented by dashed arrow 1000).

Accordingly, one or more of the assigned distributed actors (e.g., distributed actor 962) may interact, directly or indirectly, with one or more distributed sub-actors to address at least a portion of the unfulfilled need (e.g., "Please provide temperature information in Fahrenheit from numerous locations in the Pacific Northwest"). Specifically:

distributed actor 962 may interact, directly or indirectly, with distributed actor 958 to obtain outdoor temp skill 994;

distributed actor 962 may interact, directly or indirectly, with distributed actor 950 to obtain temp skill 972;

distributed actor 962 may interact, directly or indirectly, with distributed actor 954 to obtain temp skill 982; and distributed actor 962 may interact, directly or indirectly, with distributed actor 956 to obtain temp skill 988.

As discussed above, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest". As is also known in the art, such search engines may save your search history so that your previous searches are available for review at a later date.

Accordingly, information process 10 may enable 1664 the one or more assigned distributed actors (e.g., distributed actors 950, 954, 956, 958) to review previous content (e.g., previous content 1034) provided by the user (e.g., user 996) so that the one or more assigned distributed actors (e.g., distributed actors 950, 954, 956, 958) may better address the unfulfilled need (e.g., "Please provide temperature information in Fahrenheit from numerous locations in the Pacific Northwest").

When enabling 1664 the one or more assigned distributed actors (e.g., distributed actors 950, 954, 956, 958) to review previous content (e.g., previous content 1034) provided by the user (e.g., user 996) so that the one or more assigned distributed actors (e.g., distributed actors 950, 954, 956, 958) may better address the unfulfilled need (e.g., "Please provide temperature information in Fahrenheit from numerous locations in the Pacific Northwest"), information process 10 may:

enable 1666 the one or more assigned distributed actors (e.g., distributed actors 950, 954, 956, 958) to review one or more previous requests provided by the user (e.g., user 996). For example, the previous content (e.g., previous content 1034) provided by the user (e.g., user 996) may provide a history of the requests made by user 996 (or a portion thereof) so that the personal preferences of the user (e.g., user 996) may be identified; and/or enable 1668 the one or more assigned distributed actors (e.g., distributed actors 950, 954, 956, 958) to review one or more previous conversations engaged in by the user (e.g., user 996). For example, the previous content (e.g., previous content 1034) provided by the user (e.g., user 996) may provide a history of the conversations engaged in by user 996 (or a portion thereof) so that the personal preferences of the user (e.g., user 996) may be identified.

For example, suppose such previous requests and/or conversations included within the previous content (e.g., previous content 1034) provided by the user (e.g., user 996) indicate preferences concerning air travel (e.g., window seat, aisle seat, front of plane, back of place); hotels (e.g., early check in, high floor); etc.

Further and when enabling 1664 the one or more assigned distributed actors (e.g., distributed actors 950, 954, 956, 958) to review previous content (e.g., previous content 1034) provided by the user (e.g., user 996) so that the one or more assigned distributed actors (e.g., distributed actors 950, 954, 956, 958) may better address the unfulfilled need (e.g., "Please provide temperature information in Fahrenheit from numerous locations in the Pacific Northwest"), information process 10 may:

enable 1670 the one or more assigned distributed actors (e.g., distributed actors 950, 954, 956, 958) to have reduced access to the previous content (e.g., previous content 1034) provided by the user (e.g., user 996) if looser results to the unfulfilled need (e.g., "Please provide temperature information in Fahrenheit from numerous locations in the Pacific Northwest") are acceptable to the user (e.g., user 996); and/or enable 1672 the one or more assigned distributed actors (e.g., distributed actors 950, 954, 956, 958) to have enhanced access to the previous content (e.g., previous content 1034) provided by the user (e.g., user 996) if tighter results to the unfulfilled need (e.g., "Please provide temperature information in Fahrenheit from numerous locations in the Pacific Northwest") are acceptable to the user (e.g., user 996).

For example, assume that such previous requests and/or conversations included within the previous content (e.g., previous content 1034) provided by the user (e.g., user 996) indicate that user 996 prefers window seats in the front of a plane and high floors in a hotel. Accordingly, if user 996 enables 1672 e.g., distributed actors 950, 954, 956, 958 to have enhanced access to previous content 1034 provided by user 996, tighter results may be achieved (e.g., often getting window seats in the front of the plane and high floors in the hotel). However, if user 996 enables 1670 e.g., distributed actors 950, 954, 956, 958 to have reduced access to previous content 1034 provided by user 996, looser results may be achieved (e.g., often not getting window seats in the front of the plane and lower floors in the hotel).

As discussed above, information process 10 may address 1674 at least a portion of the unfulfilled need (e.g., "Please provide temperature information in Fahrenheit from numerous locations in the Pacific Northwest") with the at least one skill offered by the one or more assigned distributed actors (e.g., distributed actors 950, 954, 956, 958). Specifically, information process 10 may address 1674 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

As discussed above, when addressing 1674 at least a portion of the unfulfilled need (e.g., "Please provide temperature information in Fahrenheit from numerous locations in the Pacific Northwest") with the at least one skill offered by the one or more assigned distributed actors (e.g., distributed actors 950, 954, 956, 958), information process 10 may: generate 1676 one or more response portions with the at least one skill offered by the one or more assigned distributed actors (e.g., distributed actors 950, 954, 956, 958).

Specifically:
- outdoor temp skill 994 (available from distributed actor 958) may provide assigned distributed actor 962 with temperature 1002 (i.e., a temperature of 72° F.);
- temp skill 972 (available from distributed actor 950) may provide assigned distributed actor 962 with temperature 1004 (i.e., a temperature of 74° F.);
- temp skill 982 (available from distributed actor 954) may provide assigned distributed actor 962 with temperature 1006 (i.e., a temperature of 73° F.); and
- temp skill 988 (available from distributed actor 956) may provide assigned distributed actor 962 with temperature 1008 (i.e., a temperature of 78° F.).

As discussed above, information process 10 may form 1678 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 1680 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 1678 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 1680 bespoke response 1010 to that party (e.g., user 996).

Additionally and as discussed above, information process 10 may effectuate 1682, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1678 bespoke response 1010 that may identify "the first available flight from Boston, MA to Washington DC", wherein information process 10 may provide 1680 bespoke response 1010 to user 996 and may effectuate 1682 bespoke response 1010 by booking "the first available flight from Boston, MA to Washington DC".

In some implementations, enabling 1664 the one or more assigned distributed actors (e.g., distributed actors 950, 954, 956, 958) to review previous content (e.g., previous content 1034) includes enabling the one or more assigned distributed actor to review previous content received from the ParaNet and/or from other distributed actors. For example, when distributed actor 950 interacts with another distributed actor (e.g., distributed actor 960), information process 10 may enable distributed actor 950 to review previous content associated with distributed actor 960. In some implementations, information process 10 may limit access to particular portions of previous content for a specific distributed actor based upon, at least in part, permissions or privacy constraints defined for each distributed actor.

In some implementations, enabling 1664 the one or more assigned distributed actors (e.g., distributed actors 950, 954, 956, 958) to review previous content (e.g., previous content 1034) includes enabling the one or more assigned distributed actor to review previous content (e.g., previous content 1034) concerning other distributed actors in an observational or managerial manner. For example, suppose the one or more assigned distributed actors include software agent-based large language models (LLMs) or other generative machine learning models. In this example, information process 10 may manage these distributed actors by determining whether or not such distributed actors have observable conversations (e.g., previous content 1034). If information process 10 is unable to observe or access the conversations of a particular distributed actor, information process 10 may label that distributed actor as "rogue". Accordingly, information process 10 may regulate these LLM-based distributed actors by using a network of observing distributed actors that can access conversations (e.g., previous content 1034) associated with the LLM-based distributed actor (and any other type of distributed actor). In this manner, information process 10 may prevent any LLM-based distributed actor from running standalone on the Internet for anything sensitive and subject to misuse.

In some implementations, information process 10 may provide a protocol for the previous content by persisting conversation data between distributed actors and allowing distributed actors to access these conversations. For example, as distributed actor 962 interacts, directly or indirectly, with distributed actor 958 to obtain outdoor temp skill 994, information process 10 may generate conversation data and persist this conversation data for access by distributed actor 962, distributed actor 958, or other distributed actors. In another example, as distributed actor 962 interacts, directly or indirectly, with distributed actor 950 to obtain temp skill 972, information process 10 may generate conversation data and persist this conversation data for access by distributed actor 962, distributed actor 950, or other distributed actors. Similarly, as distributed actor 962 interacts, directly or indirectly, with distributed actor 954 to obtain temp skill 982, information process 10 may generate conversation data and persist this conversation data for access by distributed actor 962, distributed actor 954, or other distributed actors. Accordingly, information process 10 may persist each portion of conversation data separately. In this manner, the operations and interactions of distributed actors may be transparent to, or regulated by information process 10.

ParaNet (Paywall)

As will be discussed below, information process 10 may enable some distributed actors to be positioned behind a paywall, thus requiring a user to make payment in order to access some skills and enabling the monetization of a portion of a network.

Figure 29:
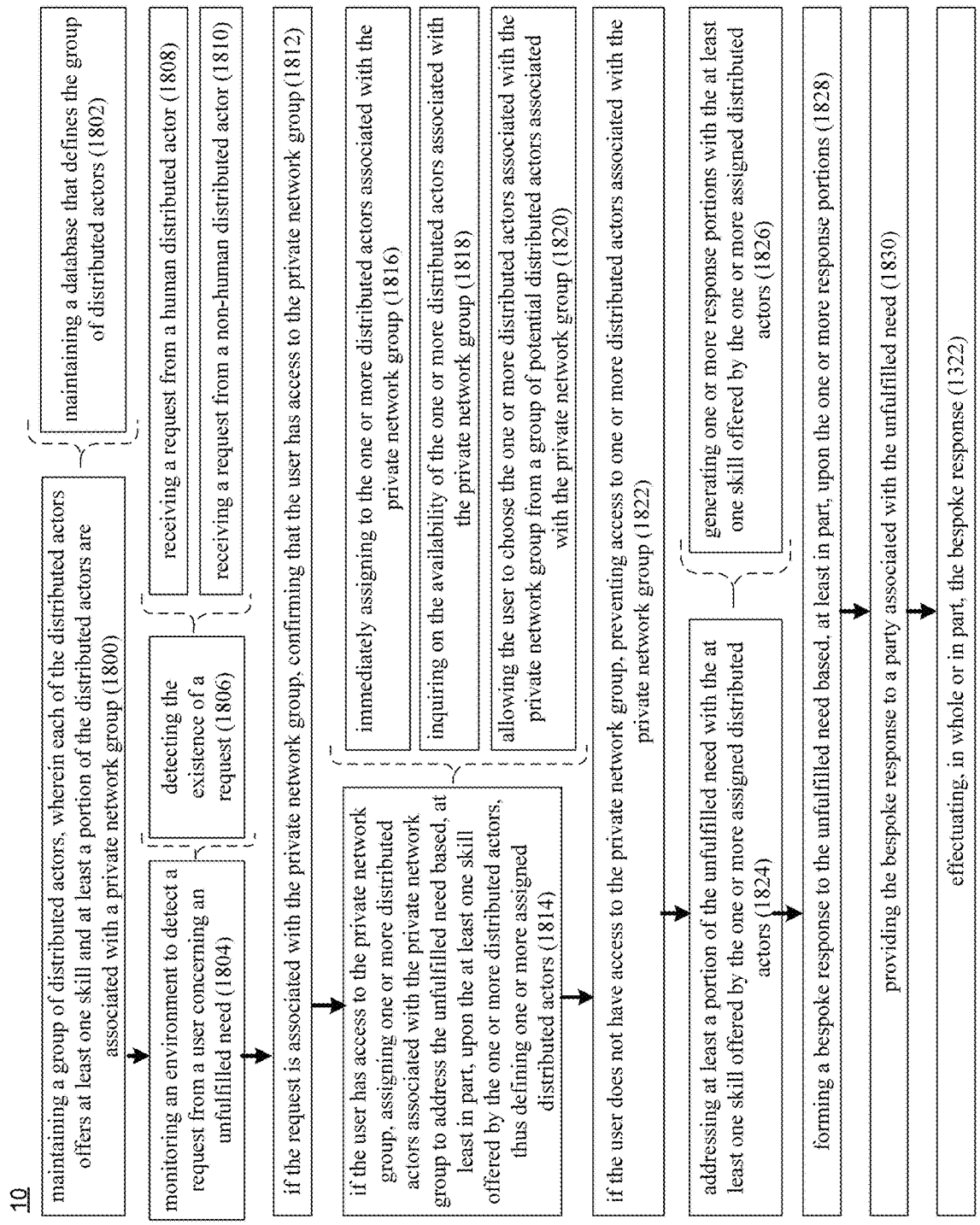
FIG. 29 is another flowchart of the information process of FIG. 1 according to an embodiment of the present disclosure.

As discussed above and referring also to FIG. 29, information process 10 may maintain 1800 a group of distributed actors (e.g., distributed actors 950, 952, 954, 956, 958, 960, 962, 964, 966, 968), wherein each of the distributed actors (e.g., distributed actors 950, 952, 954, 956, 958, 960, 962, 964, 966, 968) may offers at least one skill.

As also discussed above and when maintaining 1800 a group of distributed actors (e.g., distributed actors 950, 952, 954, 956, 958, 960, 962, 964, 966, 968), information process 10 may: maintain 1802 a database (e.g., database 80) that defines the group of distributed actors (e.g., distributed actors 950, 952, 954, 956, 958, 960, 962, 964, 966, 968). For example, database 80 may define plurality of records 82, wherein each record within database 80 may define the "skills" available from and/or exposed by the group of distributed actors (e.g., distributed actors 950, 952, 954, 956, 958, 960, 962, 964, 966, 968).

As also discussed above, the group of distributed actors (e.g., distributed actors 950, 952, 954, 956, 958, 960, 962, 964, 966, 968) may include one or more of: a software platform; a software application; a virtual machine; and a web-based service.

At least a portion of the group of distributed actors (e.g., distributed actors 950, 952, 954, 956, 958, 960, 962, 964, 966, 968) may be associated with a private network group (e.g., private network group 1034). Examples of such a private network group (e.g., private network group 1034) may include but are not limited to a network that is behind a paywall.

As is known in the art, a paywall is a digital system used by publishers to restrict access to certain content on their website, mobile application or other digital platforms, typically requiring users to pay a fee or subscription in order to access the content. Paywalls can take various forms, such as metered paywalls that allow users to view a limited number of articles for free before requiring payment, or hard paywalls which block all content until payment is made. Paywalls are commonly used by news publishers, academic publishers, and other content creators as a way to monetize their content and generate revenue.

As discussed above, information process 10 may monitor 1804 an environment (e.g., network 14) to detect a request (e.g., request 998) from a user (e.g., user 996) concerning an unfulfilled need (e.g., "Please provide temperature information in Fahrenheit from numerous locations in the Pacific Northwest"). For example, assume that when monitoring 1804 an environment (e.g., network 14) to detect a request (e.g., request 998) from a user (e.g., user 996) concerning an unfulfilled need (e.g., "Please provide temperature information in Fahrenheit from numerous locations in the Pacific Northwest"), information process 10 detects 1806 the existence of request 998, namely "Please provide temperature information in Fahrenheit from numerous locations in the Pacific Northwest". As discussed above, user 996 may access information process 10 to generate request 998 in a fashion similar to the manner in which a user may enter a query into a search engine. Therefore, user 996 may define request 998 via the query "Please provide temperature information in Fahrenheit from numerous locations in the Pacific Northwest".

While the above-described example concerns request 998 being generated by a human being (e.g., user 996), this is for illustrative purposes only and is not intended to be a limitation of this disclosure, as other configurations are possible and are considered to be within the scope of this disclosure. For example and when detecting 1806 the existence of a request (e.g., request 998), information process 10 may: receive 1808 a request (e.g., request 998) from a human distributed actor (e.g., user 996) and/or receive 1810 a request (e.g., request 998) from a non-human distributed actor (e.g., distributed actor 966).

If the request (e.g., request 998) is associated with the private network group (e.g., private network group 1034), information process 10 may confirm 1812 that the user (e.g., user 996) has access to the private network group (e.g., private network group 1034). For example and if the private network group (e.g., private network group 1034) is a network behind a paywall, the user (e.g., user 996) may be required to e.g., enter credentials to access the private network group (e.g., private network group 1034).

If the user (e.g., user 996) has access to the private network group (e.g., private network group 1034), information process 10 may assign 1814 one or more distributed actors (e.g., distributed actors 950, 952, 954, 956, 958, 960, 962, 964, 966, 968) associated with the private network group (e.g., private network group 1034) to address the unfulfilled need (e.g., "Please provide temperature information in Fahrenheit from numerous locations in the Pacific Northwest") based, at least in part, upon the at least one skill offered by the one or more distributed actors (e.g., distributed actors 950, 952, 954, 956, 958, 960, 962, 964, 966, 968), thus defining one or more assigned distributed actors.

Assume for this example that distributed actors 950, 954, 956, 958 are all associated with the private network group (e.g., private network group 1034) and user 996 is a member of (or has access to) the private network group (e.g., private network group 1034) and all of skills 972, 982, 988, 994 may be available to user 996. Accordingly, the one or more assigned distributed actors may include distributed actors 950, 954, 956, 958.

As stated above, when assigning 1814 one or more qualified distributed actors (e.g., chosen from the group of distributed actors 950, 952, 954, 956, 958, 960, 962, 964, 966, 968) associated with the private network group (e.g., private network group 1034) to address the unfulfilled need (e.g., "Please provide temperature information in Fahrenheit from numerous locations in the Pacific Northwest"), information process 10 may: immediately assign 1816 the one or more qualified distributed actors (e.g., distributed actors 950, 954, 956, 958) associated with the private network group; inquire 1818 on the availability of the one or more qualified distributed actors (e.g., distributed actors 950, 954, 956, 958) associated with the private network group; and/or allow 1820 the user to choose the one or more qualified distributed actors associated with the private network group from a group of potential distributed actors (e.g., chosen from the group of distributed actors 950, 952, 954, 956, 958, 960, 962, 964, 966, 968).

Assume for this example that information process 10 immediately assigns 1816 distributed actor 962 to address the unfulfilled need (e.g., "Please provide temperature information in Fahrenheit from numerous locations in the Pacific Northwest") based, at least in part, upon distributed actor 962 offering all four of the identified skills (e.g., outdoor temp skill 994 through distributed actor 958, temp skill 972 through distributed actor 950, temp skill 982 through distributed actor 954, and temp skill 988 through distributed actor 956), thus defining distributed actor 962 as an assigned distributed actor (wherein such an assignment is represented by dashed arrow 1000). Also assume that distributed actor 962 is also associated with the private network group (e.g., private network group 1034).

Accordingly, one or more of the assigned distributed actors (e.g., distributed actor 962) may interact, directly or indirectly, with one or more distributed sub-actors to address at least a portion of the unfulfilled need (e.g., "Please provide temperature information in Fahrenheit from numerous locations in the Pacific Northwest"). Specifically:

distributed actor 962 may interact, directly or indirectly, with distributed actor 958 to obtain outdoor temp skill 994;
  distributed actor 962 may interact, directly or indirectly, with distributed actor 950 to obtain temp skill 972;
  distributed actor 962 may interact, directly or indirectly, with distributed actor 954 to obtain temp skill 982; and
  distributed actor 962 may interact, directly or indirectly, with distributed actor 956 to obtain temp skill 988.

As discussed above, if user 996 has access to private network group 1034, information process 10 may assign 1814 one or more distributed actors (e.g., distributed actors 950, 954, 956, 958) associated with private network group 1034 to address the unfulfilled need (e.g., "Please provide temperature information in Fahrenheit from numerous locations in the Pacific Northwest") based, at least in part, upon the at least one skill offered by the one or more distributed actors (e.g., distributed actors 950, 954, 956, 958). Conversely, if the user (e.g., user 996) does not have access to private network group 1034, information process 10 may prevent 1822 access to one or more distributed actors (e.g., distributed actors 950, 954, 956, 958) associated with private network group 1034.

As discussed above, information process 10 may address 1824 at least a portion of the unfulfilled need (e.g., "Please provide temperature information in Fahrenheit from numerous locations in the Pacific Northwest") with the at least one skill offered by the one or more assigned distributed actors. Specifically, information process 10 may address 1824 the unfulfilled need (e.g., "Please provide temperature information in Fahrenheit from numerous locations in the Pacific Northwest") with outdoor temp skill 994 (available from distributed actor 958), temp skill 972 (available from distributed actor 950), temp skill 982 (available from distributed actor 954), and temp skill 988 (available from distributed actor 956) offered by the assigned distributed actor 962.

As discussed above, when addressing 1824 at least a portion of the unfulfilled need (e.g., "Please provide temperature information in Fahrenheit from numerous locations in the Pacific Northwest") with the at least one skill offered by the one or more assigned distributed actors, information process 10 may: generate 1826 one or more response portions with the at least one skill offered by the one or more assigned distributed actors.

Specifically:
  outdoor temp skill 994 (available from distributed actor 958) may provide assigned distributed actor 962 with temperature 1002 (i.e., a temperature of 72° F.);
  temp skill 972 (available from distributed actor 950) may provide assigned distributed actor 962 with temperature 1004 (i.e., a temperature of 74° F.);
  temp skill 982 (available from distributed actor 954) may provide assigned distributed actor 962 with temperature 1006 (i.e., a temperature of 73° F.); and
  temp skill 988 (available from distributed actor 956) may provide assigned distributed actor 962 with temperature 1008 (i.e., a temperature of 78° F.).

As discussed above, information process 10 may form 1828 a bespoke response (e.g., bespoke response 1010) to the unfulfilled need (e.g., "Please provide temperature information in Fahrenheit from numerous locations in the Pacific Northwest") based, at least in part, upon the one or more response portions (e.g., temperatures 1002, 1004, 1006, 1008) and may provide 1830 the bespoke response (e.g., bespoke response 1010) to a party (e.g., user 996) associated with the unfulfilled need (e.g., "Please provide temperature information in Fahrenheit from numerous locations in the Pacific Northwest"). For example, information process 10 may form 1828 bespoke response 1010 (e.g., a webpage that lists temperatures 1002, 1004, 1006, 1008) to the unfulfilled need (e.g., "Please provide temperature information in Fahrenheit from numerous locations in the Pacific Northwest") and may provide 1830 bespoke response 1010 to that party (e.g., user 996).

Additionally and as discussed above, information process 10 may effectuate 1832, in whole or in part, the bespoke response (e.g., bespoke response 1010). For example, certain types of unfulfilled needs may require an action (e.g., "I need to be booked on the first available flight from Boston, MA to Washington DC"). Accordingly and in such a situation, information process 10 may form 1828 bespoke response 1010 that may identify "the first available flight from Boston, MA to Washington DC", wherein information process 10 may provide 1830 bespoke response 1010 to user 996 and may effectuate 1832 bespoke response 1010 by booking "the first available flight from Boston, MA to Washington DC".

ParaBrowser:

As will be discussed below, information process 10 may enable a user to review an addressable datasource to see what skills/distributed actors are currently available via that addressable datasource; as well as define new skills/distributed actors for the addressable datasource.

Figure 30:
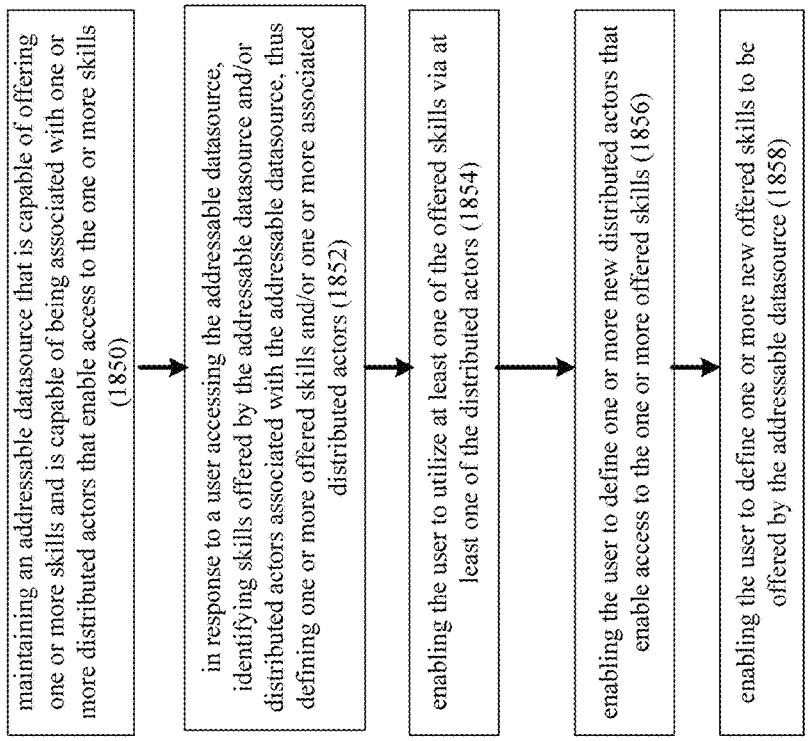
FIG. 30 is another flowchart of the information process of FIG. 1 according to an embodiment of the present disclosure.
Figure 31:
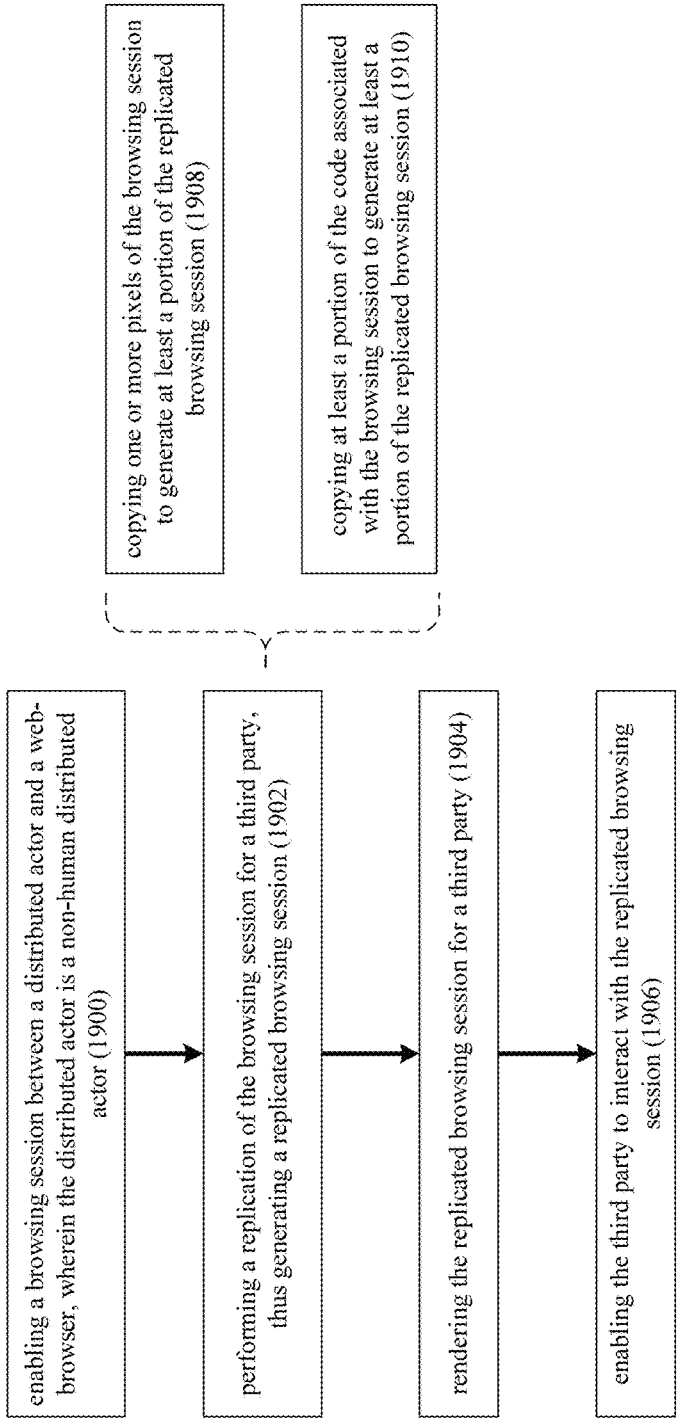
FIG. 31 is another flowchart of the information process of FIG. 1 according to an embodiment of the present disclosure.

As discussed above and referring also to FIG. 30, information process 10 may maintain 1850 an addressable datasource that is capable of offering one or more skills and is capable of being associated with one or more distributed actors that enable access to the one or more skills. Examples of such an addressable data source may include but are not limited to: a website (e.g., websites 950, 952, 1024) that is addressable via an http protocol and a data system (e.g., weather station system 956, construction equipment 968) that is addressable via a MAC address and/or a TCP-IP address.

As is known in the art, Hypertext Transfer Protocol (HTTP) is a protocol that is used for communication between web servers and clients (usually web browsers). It is the foundation of data communication on the World Wide Web. When a user requests a web page or resource using a web browser, the browser sends an HTTP request to the server, and the server responds with an HTTP response that contains the requested resource, such as a web page, image, or video. HTTP is a stateless protocol, meaning that it does not keep track of previous requests or responses between a client and server. Instead, each HTTP request and response is treated as an independent transaction. HTTP is designed to be extensible, allowing it to support new features and technologies as they emerge.

As is known in the art, TCP/IP (Transmission Control Protocol/Internet Protocol) is a suite of communication protocols that enables two or more devices to communicate with each other over a network. It is the most widely used communication protocol in the world and is used to connect devices over the internet and local networks. TCP/IP consists of two main protocols: TCP and IP. IP (Internet Protocol) is responsible for routing data packets from the source device to the destination device, while TCP (Transmission Control Protocol) provides a reliable, ordered, and error-checked delivery of data between applications running on different devices. TCP/IP is used for a wide variety of applications, including email, file transfer, web browsing, and remote access. It is also used as the underlying protocol for many other networking protocols and technologies, such as DHCP, DNS, FTP, HTTP, HTTPS, SSH, and Telnet.

As is known in the art, a MAC (Media Access Control) address, also known as a physical address, is a unique identifier assigned to a network interface controller (NIC) for use as a network address in communications within a network segment. It is a 48-bit address composed of six pairs of hexadecimal digits separated by colons or hyphens (e.g., 00:1A:2B:3C:4D:5E). Every network device, such as a computer, router, or smartphone, has a unique MAC address assigned to its network interface. The MAC address is hard-coded into the device's hardware and cannot be changed, unlike an IP address, which can be assigned dynamically or changed manually. MAC addresses are used to identify devices on a network at the data link layer of the network protocol stack. When a device sends a message on a network, it includes its MAC address in the packet header so that other devices can identify the source of the message.

A plurality of distributed actors were discussed above (e.g., distributed actors 950, 952, 954, 956, 958, 960, 962, 964, 966, 968, 1024), wherein these distributed actors offered one or more skills. Specifically:

Distributed actor 950 is an addressable datasource (i.e., a weather website) that is HTTP addressable and organically offers forecast skill 970 and temp skill 972 to other distributed actors and/or users;

Distributed actor 952 is an addressable datasource (i.e., a travel website) that is HTTP addressable and organically offers ticket skill 974, refunds skill 976 and hotel skill 1020 to other distributed actors and/or users;

Distributed actor 954 is an addressable datasource (i.e., a traffic camera system) that is MAC and/or a TCP-IP addressable and organically offers video skill 980 and temp skill 982 to other distributed actors and/or users;

Distributed actor 956 is an addressable datasource (i.e., a weather station system) that is MAC and/or a TCP-IP addressable and organically offers wind speed skill 986 and temp skill 988 to other distributed actors and/or users;

Distributed actor 958 is an addressable datasource (i.e., a piece of construction equipment) that is MAC and/or a TCP-TP addressable and organically offers fuel level skill 992 and outdoor temp skill 994 to other distributed actors and/or users;

Distributed actor 960 is an addressable datasource (i.e., a "bundling" distributed actor) that is HTTP addressable and bundles forecast skill 970, ticket skill 974, refunds skill 976 and hotel skill 1020 and offers them to other distributed actors and/or users;

Distributed actor 962 is an addressable datasource (i.e., a "bundling" distributed actor) that is HTTP addressable and bundles outdoor temp skill 994, temp skill 972, temp skill 982 and temp skill 988 and offers them to other distributed actors and/or users;

Distributed actor 964 is an addressable datasource (i.e., a "bundling" distributed actor) that is HTTP addressable and bundles video skill 980, temp skill 982, wind speed skill 986 and temp skill 988 and offers them to other distributed actors and/or users;

Distributed actor 966 is an addressable datasource (i.e., a "bundling" distributed actor) that is HTTP addressable and bundles the skills offered by distributed actors 960, 962 and offers them to other distributed actors and/or users;

Distributed actor 968 is an addressable datasource (i.e., a "bundling" distributed actor) that is HTTP addressable and bundles the skills offered by distributed actor 964 and offers them to other distributed actors and/or users; and Distributed actor 1024 is an addressable datasource (i.e., a European weather travel website) that is HTTP addressable and organically offers European temp skill 1022 to other distributed actors and/or users.

As discussed above, the group of distributed actors (e.g., distributed actors 950, 952, 954, 956, 958, 960, 962, 964, 966, 968, 1024) may include one or more of: a software platform; a software application; a virtual machine; and a web-based service.

As is known in the art:

A Software Platform is a set of software components, tools, and technologies that provide a foundation for developing and deploying software applications.

A Software Application is a computer program (or set of programs) that is designed to perform specific tasks or functions for the user.

A Virtual Machine (VM) is a software-based emulation of a physical computer that can run multiple operating systems or applications.

A Web-Based Service is a software service or application that is accessible over the internet through a web browser or other web-based interface.

In response to a user (e.g., user 996) accessing an addressable datasource (e.g., distributed actors 950, 952, 954, 956, 958, 960, 962, 964, 966, 968, 1024), information process 10 may identify 1852 skills offered by the addressable datasource and/or distributed actors associated with the addressable datasource, thus defining one or more offered skills and/or one or more associated distributed actors. Examples of the user (e.g., user 1016) may include but is not limited to a human user.

For example, suppose that user 1016 decides to visit distributed actor 950 (i.e., a weather website). Upon such a visit, information process 10 may identify 1852 skills offered by this addressable datasource and/or distributed actors associated with this addressable datasource. Being this weather website organically offers forecast skill 970 and temp skill 972, such skills (e.g., skills 970, 972) will be identified 1852 to user 1016 by information process 10. Further, being "travel" distributed actor 960, "temperature" distributed actor 962 and "travel" distributed actor 966 bundle (either directly or indirectly) one or more of skills 970, 972, such distributed actors (e.g., distributed actors 950, 960, 962, 966) will be identified 1852 to user 1016 by information process 10.

Information process 10 may enable 1854 the user (e.g., user 1016) to utilize at least one of the offered skills (e.g., skills 970, 972) via at least one of the distributed actors (e.g., distributed actors 950, 960, 962, 966).

As discussed above, one or more of the distributed actors may interact, directly or indirectly, with one or more distributed sub-actors. For example, distributed actor 966 may interact with distributed actors 960, 962 and/or distributed actors 960, 962 may interact with distributed actor 950).

Additionally, information process 10 may enable 1856 the user (e.g., user 1016) to define one or more new distributed actors (e.g., "new" distributed actor 1036) that enable access to the one or more offered skills (e.g., forecast skill 970 and/or temp skill 972), wherein these one or more new distributed actors (e.g., "new" distributed actor 1036) may include one or more of: publicly available new distributed actors (e.g., a new distributed actor that is available to any distributed actors and/or users); and privately available new distributed actors (e.g., a new distributed actor that is only available to certain distributed actors and/or users that are members of a private network or group).

Further, information process 10 may enable 1858 the user (e.g., user 1016) to define one or more new offered skills (e.g., "new" skill 1038) to be offered by the addressable datasource (e.g., the weather website), wherein these one or more new offered skills (e.g., "new" skill 1038) may include one or more of: publicly available new offered skills (e.g., a new offered skill that is available to any distributed actors and/or users); and privately available new offered skills (e.g., a new offered skill that is only available to certain distributed actors and/or users that are members of a private network or group).

In some implementations, a human user may become a human distributed actor by using a paranet medium that allows the human user's skills to be identified in the paranet as described above. In this manner, human users may be assigned unique identifiers that are addressable within the paranet in a similar manner as addressable datasources described above.

In some implementations and as described above, previous content (e.g., previous content 1034) may include conversations between distributed actors that are persisted by information process 10. In response to a user (e.g., user 996) accessing an addressable datasource (e.g., distributed actors 950, 952, 954, 956, 958, 960, 962, 964, 966, 968, 1024), information process 10 may provide the previous content (e.g., conversation) associated with the addressable datasources and/or the distributed actors associated with the addressable datasources.

AATP Non-Human Distributed Actor Session

As will be discussed below in greater detail, Information process 10 provides an Actor-Actor Telemission Protocol (i.e., AATP) as a bi-directional streaming protocol that enables a first distributed actor that operates on a web browser window to replicate portions of the browser to a second distributed actor. Referring also to FIGS. 31-34 and in some implementations, information process 10 may enable 1900 a browsing session between a distributed actor and a web-browser, wherein the distributed actor is a non-human distributed actor. Information process 10 may perform 1902 a replication of the browsing session for a third party, thus generating a replicated browsing session. The replicated browsing session may be rendered 1904 for a third party.

Information process 10 may enable 1900 a browsing session between a distributed actor and a web-browser, wherein the distributed actor is a non-human distributed actor. As discussed above, a distributed actor is a computational entity capable of autonomous activity, representing its unique identity, and performing one or more skills. For example, a distributed actor is autonomous in its ability to identify unfulfilled needs and seek another distributed actor with requisite skills on the ParaNet that can fulfill that need, and to respond to requests for its skills by performing the requested task(s) to fulfill an unfulfilled need from another distributed actor. In this manner, each distributed actor is capable of autonomously communicating with other distributed actors to resolve unfulfilled needs, and to use its skills to fulfill specific needs without direct, human intervention. As discussed above and as shown in FIG. 20, a plurality of distributed actors (e.g., distributed actors 950, 952, 954, 956, 958, 960, 962, 964, 966, 968) are computational entities across a ParaNet (i.e., a system that maintains a database of distributed actors) capable of communicating with one another to publish requests for skills from other distributed actors to resolve unfulfilled needs.

In some implementations, the distributed actor is a non-human distributed actor. A non-human distributed actor is a computational entity that operates without any direct human involvement or interaction. As will be discussed in greater detail below, implementations of AATP allow non-human distributed actors to work with human assistance. In some implementations, the non-human distributed actor is a software agent. As is known in the art, a software agent is a program or software component that performs tasks autonomously, without continuous human intervention. It can interact with its environment, other agents, and human users, and it may be programmed to take actions on behalf of its users or owners. Software agents may be designed to perform a wide variety of tasks, from simple data retrieval to complex decision-making and problem-solving tasks. Software agents may be programmed to operate in a variety of environments, including the internet, local networks, and individual devices. Some examples of software agents may include but are not limited to chatbots, search engines, recommendation engines, automated trading systems, machine learning models, large language models (LLMs) (e.g., Chat Generative Pre-trained Transformer (ChatGPT) or Bard™) and personal assistants (e.g., Siri™ or Alexa™). The use of software agents is becoming increasingly prevalent in many areas of business and technology, including e-commerce, finance, healthcare, and logistics.

Figure 32:
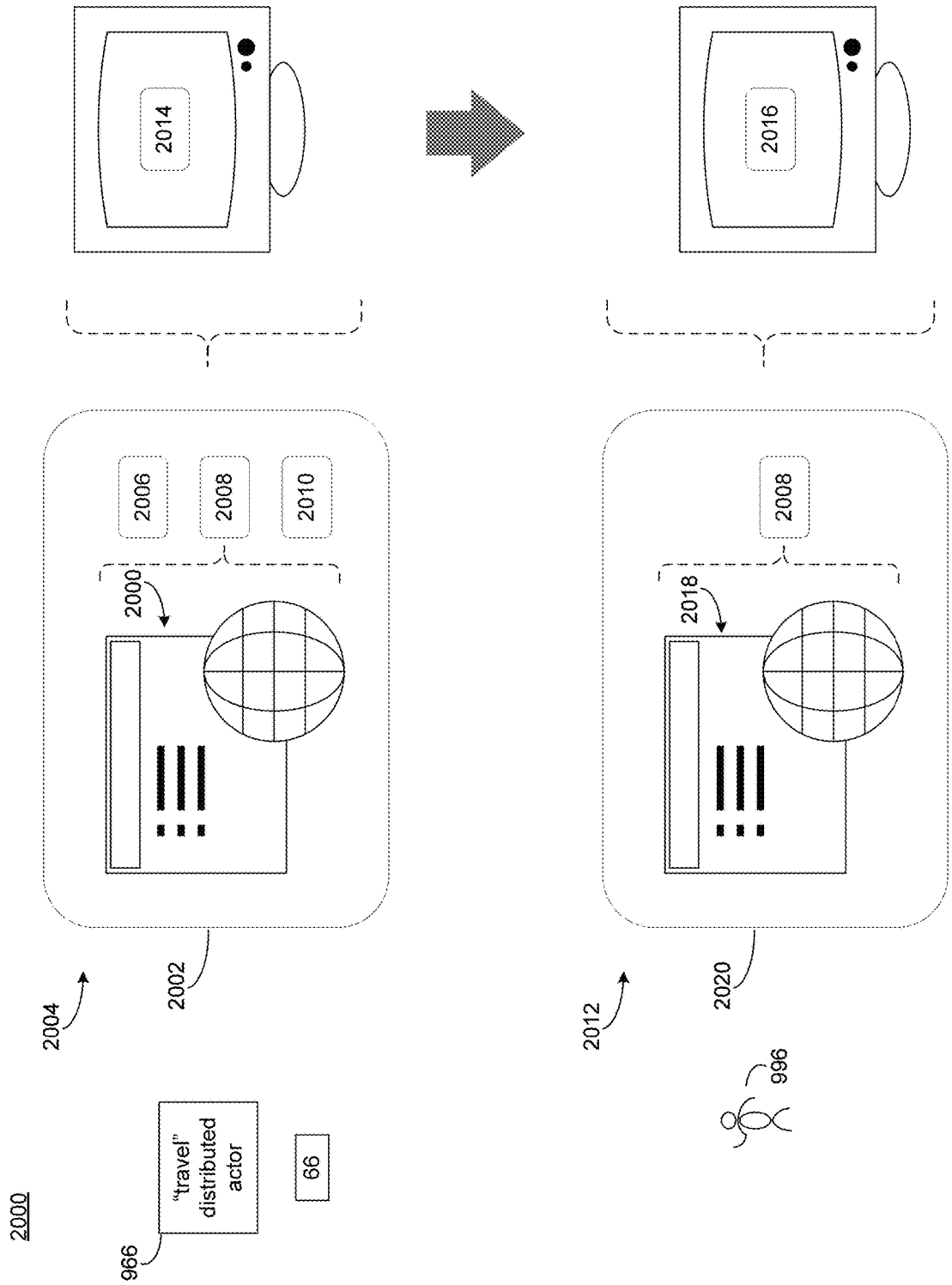
FIG. 32 is a diagrammatic view of an image-driven replication of a browsing session effectuated by the information process of FIG. 1 according to an embodiment of the present disclosure.
Figure 33:
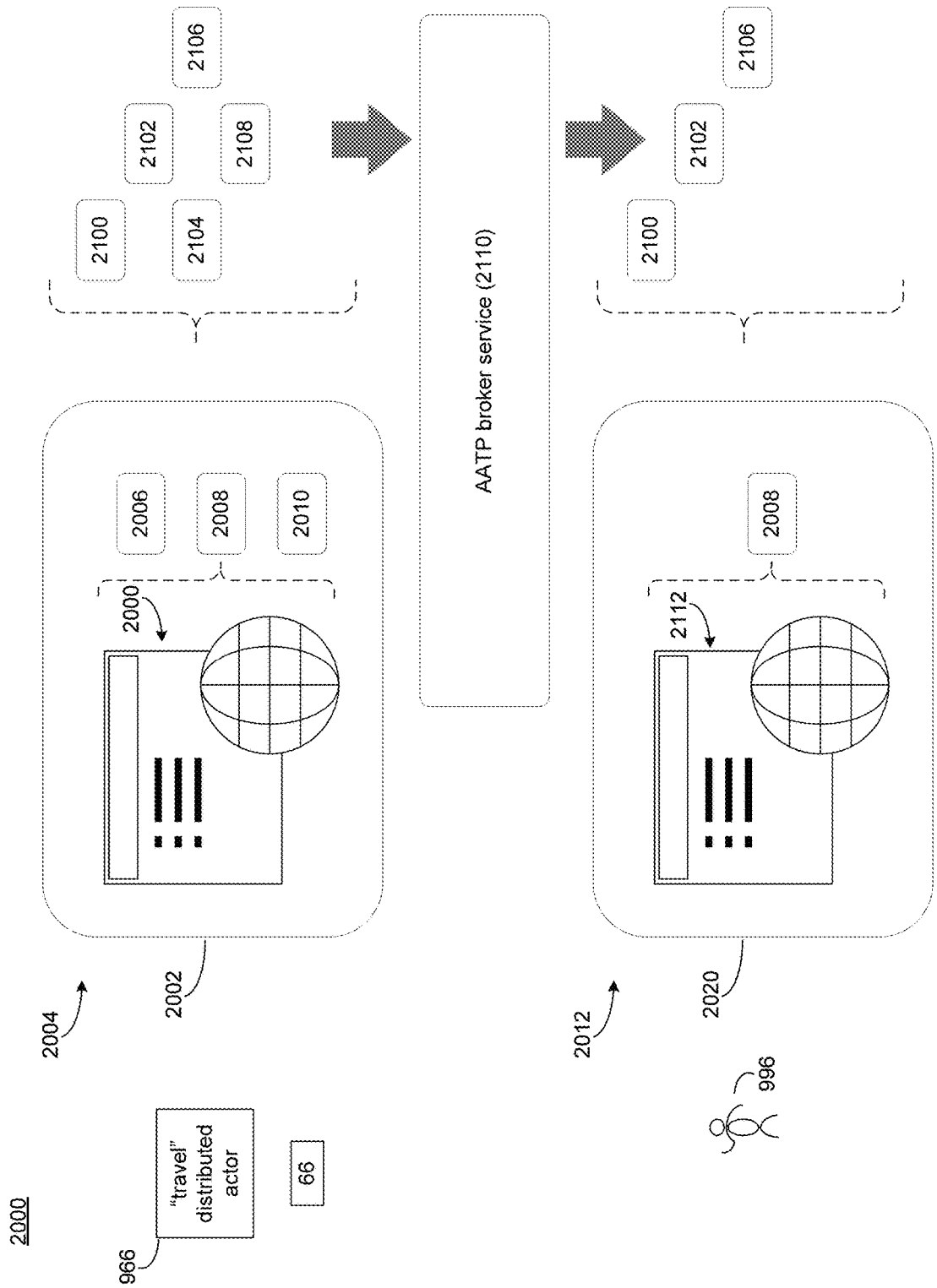
FIGS. 33-34 are diagrammatic views of code-driven replication of a browsing session using an Actor-Actor Telemission Protocol system effectuated by the information process of FIG. 1 according to an embodiment of the present disclosure.

In some implementations, a non-human distributed actor has skills associated with the navigation of a web browser. For example and as shown in FIGS. 32-33, suppose a non-human distributed actor (e.g., distributed actor 966) is a travel distributed actor (e.g., an actor that aggregates the travel skills exposed by other actors). As discussed above, distributed actor 966 is essentially a skill "bundler", the "skills" available via distributed actor 966 may include but are not limited to: the skills available from distributed actor 960 (e.g., forecast skill 970 available from distributed actor 950, tickets skill 974 available from distributed actor 952, and refunds skill 976 available from distributed actor 952) and distributed actor 962 (e.g., outdoor temp skill 994 available from distributed actor 958, temperature skill 972 available from distributed actor 950, temperature skill 982 available from distributed actor 954, and temp skill 988 available from distributed actor 956). Suppose that distributed actor 966 has independent skills to navigate through a website (e.g., website 2000) within a web-browser (e.g., web-browser 2002). Accordingly, information process 10 enables 1900 a browsing session (e.g., browsing session 2004) between a non-human distributed actor (e.g., distributed actor 966) and a web-browser (e.g., web-browser 2002).

However, suppose that distributed actor 966 encounters particular functionality or requests within website 2000 that distributed actor 966 is unable to resolve. In this example, suppose that various functionality of website 2000 is represented as features 2006, 2008, 2010 and that distributed actor 966 has skills to interface with features 2006 and 2010 but not feature 2008. In this example, the non-human distributed actor (e.g., distributed actor 966) can use the ParaNet and AATP to resolve this need by interfacing with another distributed actor. Specifically and as will be discussed below, information process 10 can replicate browsing session 2004 to another distributed actor.

Conventional approaches to replicating or "sharing" browsing sessions are generally limited to human users interfacing with screen bitmaps from the graphical browsers to access website functionality. In these approaches, a user initiates a web browsing session and provides permission for another human user to access their web-browsing session. In another example, conventional approaches record a user's interactions with the web browsing session to provide a recording of the web browsing session. Accordingly, conventional approaches are limited to use with human users and/or to recording-based videos representative of web browsing sessions. Implementations of the present disclosure allow non-human distributed actors to replicate a web browsing session initiated by the non-human distributed actor to a third party. Accordingly, information process 10 is able to replicate active browsing sessions initiated by a non-human distributed actor to a third party in real time.

Information process 10 may perform 1902 a replication of the browsing session for a third party, thus generating a replicated browsing session. As will be discussed in greater detail below, performing 1902 a replication of a browsing session includes providing a third party with a representation of the browsing session initiated by the non-human distributed actor such that the third party is able to "see" the browsing session initiated by the non-human distributed actor. In one example, the non-human distributed actor can oversee the third party as it performs a skill. In another example, the non-human distributed actor can use the third party's interactions to develop or modify its own skill. For example, information process 10 can use the replication of the browsing session and the third party's interactions to "learn" how to perform a particular skill demonstrated in the third party's interactions with the replication of the browsing session.

In some implementations, a third party is a distributed actor that is separate from the initiating distributed actor. In one example, the third party may be a human distributed actor. As discussed above, a human distributed actor is a computational entity representation of a human user having one or more skills. Like a non-human distributed actor, a human distributed actor has a unique identity and is autonomous. However, the identity for the human distributed actor is associated with the human user and the autonomous functionality of the distributed actor is provided by the human user. In some implementations, the skill(s) of the human distributed actor may be user-defined (e.g., using a user interface) or determined automatically by information process 10. In another example, the third party may be a non-human distributed actor. For example, a non-human distributed actor third party may be a non-human distributed actor with particular skills that an initiating distributed actor may need to resolve unfulfilled needs. As such, it will be appreciated that various third parties may receive and interact with replicated browsing sessions within the scope of the present disclosure. In some implementations, information process 10 provides an interface (e.g., a user interface) to select or designate a third party. Continuing with the above example, suppose non-human distributed actor encounters feature 2008 in website 2000 and uses the ParaNet to identify a third party (e.g., human distributed actor 996) to replicate the browsing session to. As will be discussed in greater detail below, information process 10 enables 1900 the third party (e.g., human distributed actor 996) to interact with a replicated browsing session (e.g., replicated browsing session 2012).

In some implementations, performing 1902 the replication of the browsing session may include performing an image-driven replication. An image-driven replication is a visual replication of a browsing session provided to a third party. For example, when performing 1902 a replication of the browsing session for a third party, information process 10 may copy 1908 one or more pixels of the browsing session to generate at least a portion of the replicated browsing session. Referring to FIG. 32, suppose that website 2000 is visually represented as a plurality of pixels (e.g., pixel information 2014). In this example, information process 10 performs 1902 replication of browsing session 2004 by copying 1908 pixel information 2014 from the browsing session to the third party (e.g., third party 996). In this example, information process 10 copies pixel information 2014 to replicated browsing session 2012 (shown as copied pixel information 2016). In some implementations, information process 10 copies 1908 pixel information 2014 in a stream of pixels and/or in batches of pixels.

In some implementations, performing 1902 the replication of the browsing session may include performing a code-driven replication. A code-driven replication is a replication of a browsing session generated by identifying code portions from the browsing session and replicating these code portions to a third party. As will be discussed in greater detail below, code portions may include document object model (DOM) objects and/or data description models as discussed above. When performing 1902 a replication of the browsing session for a third party, information process 10 may copy 1910 at least a portion of the code associated with the browsing session to generate at least a portion of the replicated browsing session. Referring also to FIG. 33, suppose that web-browser 2002 includes a plurality of code portions (e.g., code portions 2100, 2102, 2104, 2106, 2108). In some implementations, information process 10 copies at least a portion of the plurality of code portions (e.g., code portions 2100, 2102, 2104, 2106, 2108) from browsing session 2004 to the third party using an AATP broker service (e.g., AATP broker service 2110). As will be discussed in greater detail below, AATP broker service 2110 is a software module/component configured to manage bi-directional streaming between an initiating distributed actor and a third party.

In some implementations, the code associated with the browsing session may include at least a portion of the document object model associated with the browsing session. As is known in the art, a document object model (i.e., DOM) is a programming interface for HTML/XML documents, which represents the document so that programs may change the document structure, style, and content. The document object model represents the document as nodes and objects, so that e.g., programming languages may interact with the document. For example, with the document object model, JavaScript may access and change all the elements of an HTML/XML document, add or delete elements, and change styles and attributes. The document object model may provide a standard set of objects for HTML/XML documents, and a standard way to access and manipulate those objects.

In some implementations, performing 1902 code-driven replication with the copying of at least a portion of the document object model associated with a browsing session may be implemented with a browser extension. For example and as will be discussed in greater detail below, when the replication process begins, information process 10 may tag each document object model (DOM) node with a unique identifier, the parent node's unique identifier, and may produce an event in the stream indicating that the third party is to render a document object model node with the same content. After this, information process 10 may attach a listener to the document object model that may track any additions, changes, or removals of content in the document object model tree and may send events corresponding to each of these event types to the stream. Referring again to FIG. 33, suppose code portions 2100, 2102, 2104, 2106, 2108 are document object model nodes of a document object model tree associated with website 2000. In this example, information process 10 uses AATP broker service 2110 to replicate at least a portion of the document object model nodes (e.g., code portions 2100, 2102, 2106) to the third party. As will be described in greater detail below, information process 10 may manage/limit the document object model nodes replicated from the browsing session to the replicated browsing session.

In some implementations, information process 10 begins a stream of particular code portions (e.g., document object model nodes) by post processing the document object model nodes by removing all JavaScript code and event hooks, and rewrites URL references to be relative to AATP broker service 2110. In this example, AATP broker service 2110 creates a "clean" document object model that can be rendered in the third party's browser without the third party's browser performing any code execution.

The code associated with the browsing session may include at least a portion of webpage structure associated with the browsing session. For example and as discussed above, code portions 2100, 2102, 2104, 2106, 2108 may include data description models or references to data description models accessible by the third party. In another example, code associated with other webpage structural representations may be copied by information process 10 for replication at the third party. While examples of data description models and document object model nodes have been provided for code associated with a browsing session, it will be appreciated that other types of browser session code may be used within the scope of the present disclosure.

Information process 10 may render 1904 the replicated browsing session for a third party. Rendering 1904 the replicated browsing session for the third party includes processing pixel information for image-driven replication and/or processing copied code portions (e.g., document object model nodes) received from the initiating non-human distributed actor. For example, suppose non-human distributed actor 966 encounters a feature (e.g., feature 2008) of website 2000 for which non-human distributed actor 966 does not have the requisite skills to use. In this example, assume that feature 2008 is a CAPTCHA challenge. CAPTCHA (Completely Automated Public Turing test to tell Computers and Humans Apart) is a type of security measure known as challenge-response authentication used to distinguish human users from computer users. In this example, non-human distributed actor 966 may use AATP and ParaNet to identify a third party (e.g., third party 996) with skills to fulfill the CAPTCHA challenge. Specifically, a human distributed actor (e.g., human distributed actor 996) may be identified with a skill for resolving the CAPTCHA challenge of feature 2008.

Continuing with the above example, suppose that information process 10 copies document object model nodes associated with the CAPTCHA (e.g., code portions 2100, 2102, 2106). In this example, replicated browser 2012 renders a copy of the document object model window (e.g., within in an embedded iframe (e.g., iframe 2112)) by rendering the nodes received from the AATP stream (e.g., code portions 2100, 2102, 2106). As shown in FIG. 33, with code portions 2100, 2102, 2106 associated with the CAPTCHA challenge, information process 10 renders the CAPTCHA challenge (e.g., feature 2008) within replicated browsing session 2012.

Referring again to FIG. 32, suppose that information process 10 performs 1902 replication of browsing session 2004 by copying one or more pixels (e.g., pixel information 2014) to third party 996. In this example, information process 10 renders 1904 the received pixel information 2016 to generate replicated browsing session 2012. In this example, suppose feature 2008 is a CAPTCHA challenge. Information process 10 may render 1904 feature 2008 within website portion 2018 of web-browser 2020 using pixel information 2016 replicated to third party 996.

Figure 34:
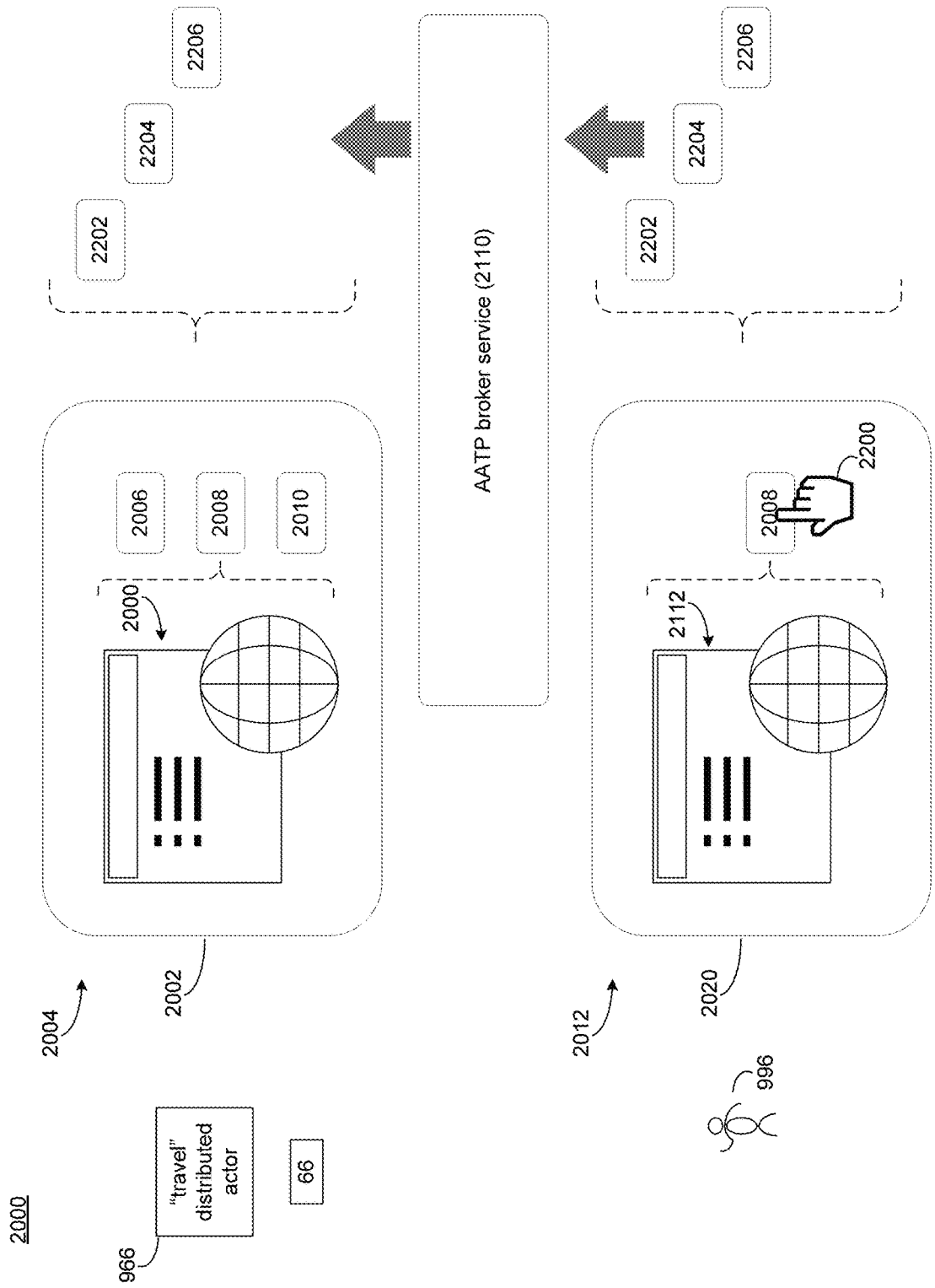

In some implementations, information process 10 may enable 1906 the third party to interact with the replicated browsing session. For example, information process 10 may enable interaction between third party 996 with replicated browsing session 2012 to be captured as events which can be provided to the browsing session via websocket through AATP broker service 2110. For example and as shown in FIG. 34, information process 10 may enable 1906 third party 996 to interact with replicated browsing session 2012. In this example, suppose third party 996 uses a cursor (e.g., cursor 2200) to navigate within replicated browsing session 2012. Further, assume that third party 996 resolves the CAPTCHA challenge (e.g., feature 2008). In this example, modified code portions (e.g., code portions 2202, 2204, 2206) are generated/modified by replicated browsing session 2012. As will be discussed in greater detail below, modified code portions 2202, 2204, 2206 are provided to browsing session 2004. With the modified code portions, the CAPTCHA challenge (e.g., feature 2008) is resolved and non-human distributed actor 966 can continue navigating website 2000.

In another example and referring again to FIG. 32, suppose that information process 10 renders 2004 the CAPTCHA challenge (e.g., feature 2008) using pixel information 2016. In this example, as third party 996 interacts with feature 2008, information process 10 may stream the third party interaction(s) back to browsing session 2004 using modified pixel information 2016.

In some implementations and as will be discussed in greater detail below concerning code-driven replication, information process 10 can terminate replicated browsing session 2012 at any time. For example, non-human distributed actor 966 may use a function description model (e.g., function description model 66) to determine when and how browsing session 2004 is replicated and the conditions for terminating replicated browsing session 2012. In this manner, non-human distributed actor 966 may autonomously replicate browsing session 2000 using function description model 66.

AATP Code-Driven Replication

Figure 35:
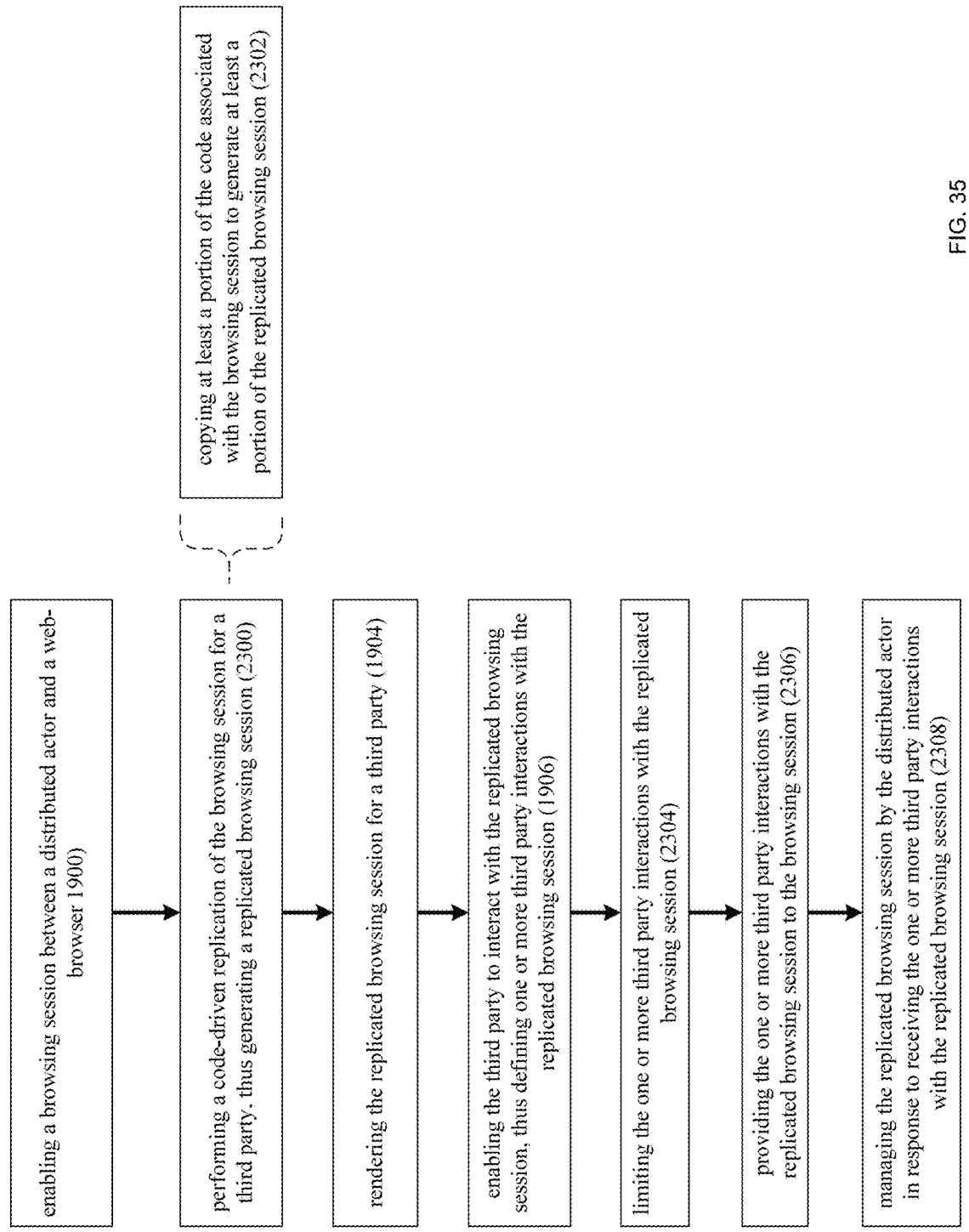
FIG. 35 is another flowchart of the information process of FIG. 1 according to an embodiment of the present disclosure.
Figure 36:
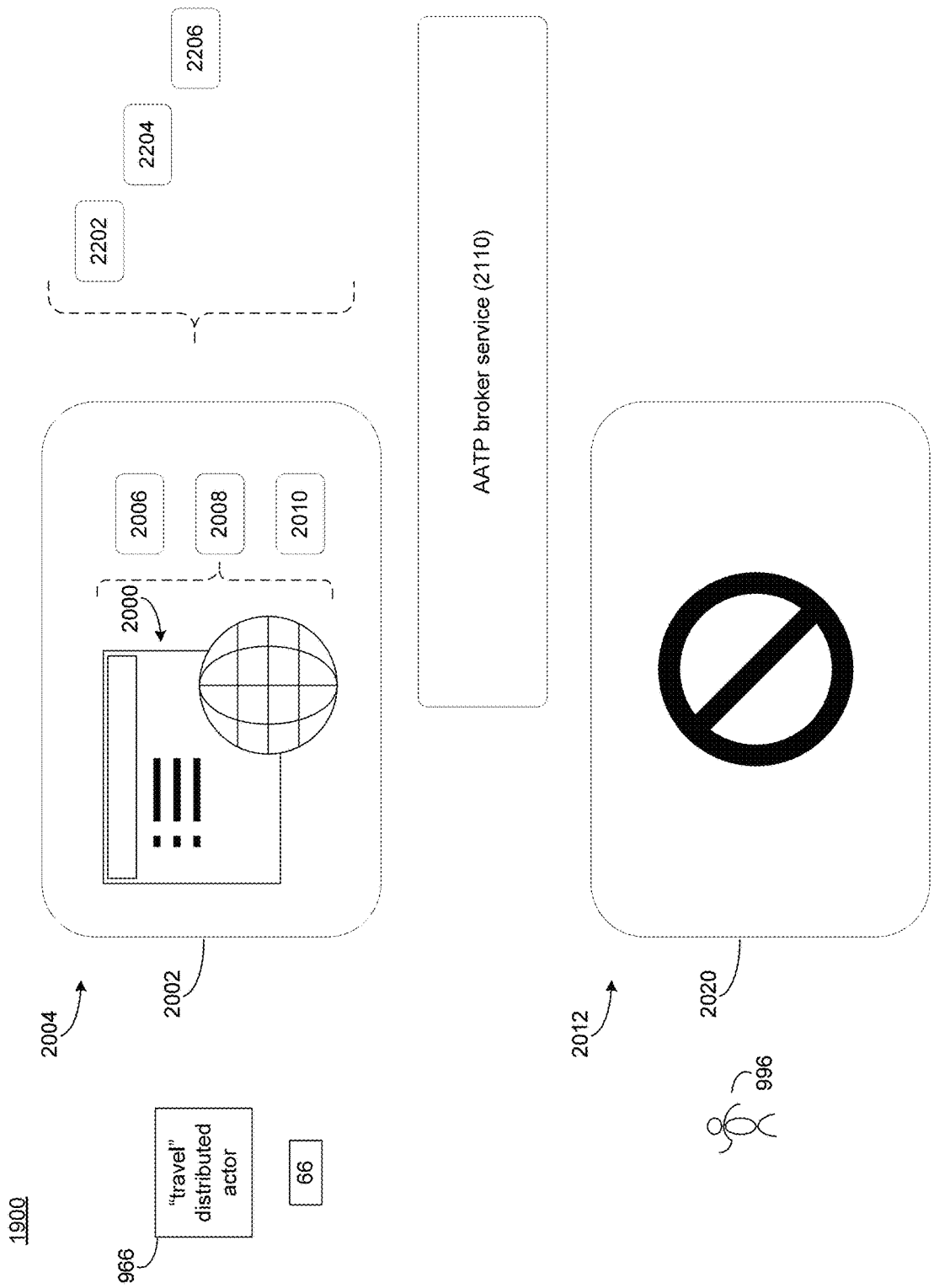
FIG. 36 is a diagrammatic view of code-driven replication of a browsing session using an Actor-Actor Telemission Protocol system effectuated by the information process of FIG. 1 according to an embodiment of the present disclosure.

Referring also to FIGS. 35-36, information process 10 may enable 1900 a browsing session between a distributed actor and a web-browser. A code-driven replication of the browsing session for a third party may be performed 1902, thus generating a replicated browsing session. The replicated browsing session may be rendered 1904 for the third party.

For example and as discussed above, information process 10 provides an Actor-Actor Telemission Protocol (i.e., AATP) as a bi-directional streaming protocol that enables a first distributed actor that operates on a web browser window to replicate portions of the browser to a second distributed actor. Generally speaking, AATP is an actor-controlled streaming replication protocol that is enabled by information process 10. For example, an initiating distributed actor may be the primary driver and initiator of an AATP session.

In one example, the initiation distributed actor may wish to show a third party (e.g., a second distributed actor) the steps being taken during an automated process. Information process 10 may then provide an AATP session where all user inputs are disabled, and the session terminates when the initiating distributed actor completes its task. In another example, the third party may render code portions from the initiating distributed actor's browsing session to display to the user, and (as the user may interact with this replicated session), information process 10 may track the user's input actions and may stream them back via AATP to the initiating distributed actor that may then apply the input actions of the user to its browser window. The combination of these functions create a protocol to allow the third party to remotely interface with the browser window of the initiating distributed actor, or to see the actions being taken by the initiating distributed actor (e.g., if the initiating distributed actor is a non-human distributed actor).

As will be discussed in greater detail below, code-driven replication may be used to specify which portions of the code of the initiating distributed actor's browsing session should be replicated, when the session should be terminated, and which types of inputs the receiving third party is permitted to perform during the session. This allows the replicated browsing session to be limited to particular portions or features of an initiating distributed actor's browsing session and does not require the third party's browser session to execute any code portions from the initiating distributed actor.

In some implementations, information process 10 may enable 1900 a browsing session between a distributed actor and a web-browser. As discussed above, a distributed actor is a computational entity capable of autonomous activity, representing its unique identity, and performing one or more skills. For example, a distributed actor is autonomous in its ability to identify unfulfilled needs and seek another distributed actor with requisite skills on the ParaNet that can fulfill that need, and to respond to requests for its skills by performing the requested task(s) to fulfill an unfulfilled need from another distributed actor. In this manner, each distributed actor is capable of autonomously communicating with other distributed actors to resolve unfulfilled needs, and to use its skills to fulfill specific needs without direct, human intervention. As discussed above and as shown in FIG. 20, a plurality of distributed actors (e.g., distributed actors 950, 952, 954, 956, 958, 960, 962, 964, 966, 968) are computational entities across a ParaNet (i.e., a system that maintains a database of distributed actors) capable of communicating with one another to publish requests for skills from other distributed actors to resolve unfulfilled needs.

In some implementations, the distributed actor may be a human distributed actor. For example and as discussed above, a human distributed actor is a computational entity representation of a human user having one or more skills. Like a non-human distributed actor, a human distributed actor has a unique identity and is autonomous. However, the identity for the human distributed actor is associated with the human user and the autonomous functionality of the distributed actor is provided by the human user. As shown in FIG. 20, examples of human distributed actors include human distributed actors 996 and 1016.

In some implementations, the distributed actor may be a non-human distributed actor. For example and as discussed above, a non-human distributed actor is a computational entity that operates without any direct human involvement or interaction. In some implementations, the non-human distributed actor is a software agent. As is known in the art, a software agent is a program or software component that performs tasks autonomously, without continuous human intervention. It can interact with its environment, other agents, and human users, and it may be programmed to take actions on behalf of its users or owners.

In some implementations, the browsing session may be initiated by the distributed actor. For example and as shown in FIG. 33, suppose a distributed actor (e.g., distributed actor 966) is a travel distributed actor (e.g., an actor that aggregates the travel skills exposed by other actors). As discussed above, distributed actor 966 is essentially a skill "bundler", the "skills" available via distributed actor 966 may include but are not limited to: the skills available from distributed actor 960 (e.g., forecast skill 970 available from distributed actor 950, tickets skill 974 available from distributed actor 952, and refunds skill 976 available from distributed actor 952) and distributed actor 962 (e.g., outdoor temp skill 994 available from distributed actor 958, temperature skill 972 available from distributed actor 950, temperature skill 982 available from distributed actor 954, and temp skill 988 available from distributed actor 956). Suppose that distributed actor 966 has independent skills to navigate through a website (e.g., website 2000) within a web-browser (e.g., web-browser 2002). Accordingly, information process 10 enables 1900 a browsing session (e.g., browsing session 2004) between a distributed actor (e.g., distributed actor 966) and a web-browser (e.g., web-browser 2002).

Referring again FIG. 33, suppose distributed actor 966 responds to a request for an unfulfilled need using its skill concerning navigating website 2000. In this example, information process 10 enables distributed actor 966 to initiate browsing session 2004 between distributed actor 966 and web-browser 2002. As shown in FIG. 33, distributed actor 966 may navigate to a travel website (e.g., website 2000) within web-browser 2002.

In some implementations, the browsing session may be an active browsing session. For example, information process 10 may enable 1900 distributed actor 966 to connect to the Internet using web-browser 2002 to initiate an active browsing session. In another example, information process 10 may enable distributed actor 966 to access an inactive or previous browsing session. For example, information process 10 may enable distributed actor 966 to replicate a browsing session to enable distributed actor 966 to "learn" a skill or to better navigate a website. In this example, distributed actor 966 may not perform the functionality as demonstrated by a third party during the replicated browsing session but may process the third party interactions for subsequent browsing sessions.

Information process 10 may perform 2300 a code-driven replication of the browsing session for a third party, thus generating a replicated browsing session. In some implementations, a third party is a distributed actor that is separate from the initiating distributed actor. In one example, the third party may be a human distributed actor. As discussed above, a human distributed actor is a computational entity representation of a human user having one or more skills. Like a non-human distributed actor, a human distributed actor has a unique identity and is autonomous. However, the identity for the human distributed actor is associated with the human user and the autonomous functionality of the distributed actor is provided by the human user. In some implementations, the skill(s) of the human distributed actor may be user-defined (e.g., using a user interface) or determined automatically by information process 10. In another example, the third party may be a non-human distributed actor. For example, a non-human distributed actor third party may be a non-human distributed actor with particular skills that an initiating distributed actor may need to resolve unfulfilled needs. As such, it will be appreciated that various third parties may receive and interact with replicated browsing sessions within the scope of the present disclosure.

A code-driven replication is a replication of a browsing session generated by identifying code portions from the browsing session and replicating these code portions to a third party. As will be discussed in greater detail below, code portions may include document object model (DOM) objects and/or data description models as discussed above. When performing 2300 a replication of the browsing session for a third party, information process 10 may copy 2302 at least a portion of the code associated with the browsing session to generate at least a portion of the replicated browsing session. Referring again to FIG. 33, suppose that web-browser 2002 includes a plurality of code portions (e.g., code portions 2100, 2102, 2104, 2106, 2108). In some implementations, information process 10 copies 2302 at least a portion of the plurality of code portions (e.g., code portions 2100, 2102, 2104, 2106, 2108) from browsing session 2004 to the third party using an AATP broker service 2110.

As discussed above, AATP broker service 2110 is a software module/component configured to manage bi-directional streaming between an initiating distributed actor and a third party. In some implementations, AATP broker service 2110 acts principally as a go-between for third party 996 and the initiating distributed actor (e.g., distributed actor 966). The AATP broker service has two primary purposes: 1) create a stable address for sessions between arbitrary third party (e.g., third party 996) and the distributed actor pairs; and 2) route a session's downloaded assets to a local address to resolve cross-origin resource sharing (CORS) issues. In some implementations, AATP broker service 2110 maintains unique session identifiers and signals the start of the session when both parties (e.g., distributed actor 966 and third party 996) are connected.

As discussed above, suppose browser session 2004 includes a website (e.g., website 2000) with e.g., three features (e.g., features 2006, 2008, 2010). As shown in FIG. 33, code associated with browsing session 2004 is represented with a plurality of code portions (e.g., code portions 2100, 2102, 2104, 2106, 2108). As will be discussed in greater detail below, the copying 2302 of at least a portion of the code associated with browsing session 2004 (e.g., code portions 2100, 2102, 2104, 2106, 2108) may include copying at least a portion of a document object model and/or at least a portion of webpage structure associated with the browsing session.

In some implementations, the code associated with the browsing session may include at least a portion of the document object model associated with the browsing session. As is known in the art, a document object model (i.e., DOM) is a programming interface for HTML/XML documents, which represents the document so that programs may change the document structure, style, and content. The document object model represents the document as nodes and objects, so that e.g., programming languages may interact with the document.

In some implementations, performing 2300 code-driven replication with the copying of a least a portion of the document object model associated with a browsing session may be implemented with a browser extension. For example, when the replication process begins, information process 10 may tag each document object model (DOM) node with a unique identifier, the parent node's unique identifier, and may produce an event in the stream indicating that the third party is to render a document object model node with the same content. After this, information process 10 may attach a listener to the document object model that may track any additions, changes, or removals of content in the document object model tree and may send events corresponding to each of these event types to the stream. Referring again to FIG. 33, suppose code portions 2100, 2102, 2104, 2106, 2108 are document object model nodes of a document object model tree associated with website 2000. In this example, information process 10 uses AATP broker service 2210 to replicate at least a portion of the document object model nodes (e.g., code portions 2100, 2102, 2106) to the third party. In some implementations, information process 10 uses unique identifiers and parent identifiers associated with each document object model node to determine where a node should be inserted into its replicated document object model tree, or which node(s) should be removed. This allows information process 10 to keep the replicated document object model up to date in real-time. As shown in FIG. 33, information process 10 may specify that only feature 2008 and its corresponding code portions (e.g., code portions 2100, 2102, 2106) are replicated to replicated browsing session 2012 of third party.

In some implementations, AATP may be integrated into the GROKit programming language Paralogue, where Paralogue may be used to specify which portions of the document object model should be replicated, when the session should be terminated, and which types of inputs the third party is permitted to perform during the session. For example, a Paralogue model (e.g., function description model 66) may define an AATP session that 1) replicates the portion of the screen containing a CAPTCHA challenge window; 2) permits the user to move the mouse and click the left mouse button only; and 3) concludes the session once the CAPTCHA has been successfully verified. In this manner, function description model 66 may indicate particular document object model nodes to replicate to a third party.

As discussed above and in some implementations, the code associated with the browsing session may include at least a portion of webpage structure associated with the browsing session. For example and as shown in FIG. 33, code portions 2100, 2102, 2104, 2106, 2108 may include data description models or references to data description models accessible by the third party. In another example, code associated with other webpage structural representations may be copied by information process 10 for replication at the third party. While examples of data description models and document object model nodes have been provided for code associated with a browsing session, it will be appreciated that other types of browser session code may be used within the scope of the present disclosure.

Information process 10 may render 1904 the replicated browsing session for the third party. Rendering 1904 the replicated browsing session for the third party includes processing copied code portions (e.g., document object model nodes) received from the initiating distributed actor. For example, suppose distributed actor 966 encounters a feature (e.g., feature 2008) of website 2008 for which distributed actor 966 does not have the requisite skills to use. In this example, assume that feature 2008 is a login page. In this example, distributed actor 966 may use AATP and ParaNet to identify a third party (e.g., third party 996) with skills to provide the login information. Specifically, a human distributed actor (e.g., human distributed actor 996) may be identified with a skill for resolving the login information request.

Continuing with the above example, suppose that information process 10 copies document object model nodes associated with the login information (e.g., code portions 2100, 2102, 2106). In this example, replicated browser 2020 renders a copy of the document object model (e.g., within an embedded iframe) by rendering the document object model nodes received from the AATP stream (e.g., code portions 2100, 2102, 2106). As shown in FIG. 33, with code portions 2100, 2102, 2106 associated with the login information, information process 10 renders the login information (e.g., feature 2008) within replicated browsing session 2012.

Information process 10 may enable 1906 the third party to interact with the replicated browsing session, thus defining one or more third party interactions with the replicated browsing session. In one example, replicated browser session 2012 may listen to all input events from the third party (e.g., third party 996). For example, this may include key press/release, mouse movement, mouse button press/release, and/or scroll wheel events. In some implementations, these events may be captured and translated to AATP input events and sent via websocket to the AATP broker service. The replicated browser session 2012 may capture all input related events in an iframe window and disables them.

In some implementations, AATP broker service 2110 forwards input events received from replicated browser session 2012 to browsing session 2004 via websocket. When the browsing session receives an input event, information process 10 compares them with the session configuration, filtering out any disabled input types, and then translates the remaining AATP input events into a sequence of webdriver input events and applies them to browser window 2002.

In another example, when the replication process begins, information process 10 may tag each document object model (DOM) node with a unique identifier, the parent node's unique identifier, and may produce an event in the stream indicating that the third party is to render a document object model node with the same content. For example, instead of replicated browser session 2012 tracking mouse movement, press/release, information process 10 instead tracks movement and clicking based on document object model node identifiers. The event type (e.g., mouse move/mouse button click) along with the unique identifier generated by information process 10, are sent by replicated browser session 2012 to browsing session 2004. When the browsing session receives the event, it looks up the identifier in the document object model and issues its own generated sequence of mouse moves and clicks on the event. This approach allows replicated browsing session 2012 to render the document object model nodes differently from browsing session 2004. This also allows for different devices. For example, if the third party is using a mobile device for rendering replicated browsing session 2012, the input signals are taps instead of mouse clicks.

In some implementations, enabling 1906 the third party to interact with the replicated browsing session includes providing event hooks for overriding the behavior of the stream of document object model nodes/portions of the code by translating events, filtering out events, sending additional events, and/or otherwise executing arbitrary code in response to events. For example, the AATP permits hooking input events, document object model events from browsing session 2004, a stream initialization event, transforming an event into a different event, or instructing the stream to shut down. In some implementations, this gives a tremendous amount of control over the protocol to custom applications, opening a wide variety of use cases for AATP.

Information process 10 may limit 2304 the one or more third party interactions with the replicated browsing session. For example, information process 10 may provide limitations on the types of third party interactions, the timing for receiving third party interactions, and/or may define certain permitted values or input for the third party interactions. For example, suppose that information process 10 copies document object model nodes associated with the login information to generate a login window (e.g., feature 2008) within replicated browser session 2012. In this example, information process 10 may limit 2304 third party interactions by defining a predefined period of time for providing third party interactions and/or a limited subset of possible alphanumerical values. For example, suppose that the login information of feature 2008 requires a particular formatting for entering a user name and password. In this example, information process 10 may limit third party interactions from accepting certain alphanumerical characters from being entered. In this manner, information process 10 may limit 2304 third party interactions to help direct the third party to provide desirable actions.

In some implementations, AATP includes events that instruct the third party to write custom user interface elements and the data that is to be sent back to the initiating distributed actor when they are interacted with. This allows the initiating distributed actor to specify custom user interface elements to be presented to third parties and the custom data. The browsing session of the initiating distributed agent is then capable of executing arbitrary code in response to these events. These user interface elements may be rendered by the replicated browsing session outside of the embedded iframe window, making a clear distinction between them and the replicated document object model. Examples of custom user interface events include but are not limited to:

UIButton: A simple button to be rendered on the page.
UIText: A generic text label.
UIInput: Free text input field.
UISelect: Drop-down menu with a fixed list of options to choose from.
UIGroup: A generic "grouping" element to guide the replicated browsing session on how to render the elements.

Information process 10 may provide 2306 the one or more third party interactions with the replicated browsing session to the browsing session. Referring again to FIG. 34, suppose third party 996 provides various third party interactions using replicated browser session 2012. In this example and as discussed above, information process 10 copies these third party interactions to the replicated code portions (e.g., code portions 2202, 2204, 2206) of replicated browser session 2012 and uses AATP broker service 2110 to copy the third party interactions to browsing session 2004 (e.g., in the form of code portions 2202, 2204, 2206). In this example, information process 10 uses the copied code portions to update browsing session 2004.

Information process 10 may manage 2308 the replicated browsing session by the distributed actor in response to receiving the one or more third party interactions with the replicated browsing session. As shown in FIG. 36 and continuing with the above information, suppose third party 996 provides login information to replicated browsing session 2012. In this example, information process 10 may manage the replicated browsing session in response to receiving the third party interactions (e.g., the login information from third party 996) by terminating replicated browsing session 2012 available to third party 996. For example and as shown in FIG. 36, replicated browsing session 2012 may become unavailable to third party 996 in response to the initiating distributed actor obtaining the one or more third party interactions with replicated browsing session 2012 and applying those interactions to browsing session 2004. In this example, the login information may allow distributed actor 966 to continue performing one or more skills on website 2000.

In another example, managing 2308 the replicated browsing session may include sending subsequent requests for additional third party interactions with a replicated browsing session. For example, suppose login information provided with third party interactions from third party 996's interactions with replicated browsing session 2012 results in additional authorization requests (e.g., two factor authorization). In this example, information process 10 may provide additional requests to third party 996 to resolve subsequent needs associated with browsing session 2004.

As discussed above, when the code-driven replication/rendering and input replication/application are all put together, information process 10 may create the effect of a remote protocol that has a true document object model rendering, and not just a pixel level replication. This produces a unique result where the document object model can be inspected, stored in a database, and manipulated using all the normal means of a web browser to change what the user sees in the end. Furthermore, the initiating distributed actor is always the one in control of the session, and not the third party. This creates a unique, light-weight remote replication protocol with many applications.

In one example, implementations of the present disclosure allow the rendering a screenshot of the initiating distributed actor's browsing session to compare for use in debugging the third party's rendering. In another example, information process 10 captures user inputs and saves them to a database for machine learning training data. In yet another example, information process 10 provides the ability to capture document object model events and to save them to a database for the purpose of having a replayable sequence of an automated task. This allows for debugging automated tests made with function description models, as the document object model can be inspected throughout the replay. In another example, information process 10 provides an application for human-assisted automated building of data description models. Additionally, information process 10 allows a user to specify which elements on a page correspond to required fields in a data description model (e.g., a third party can click on the "title" element to guide the application). Accordingly, information process 10 provides a code-driven replication of a browsing session to enhance the synergistic efforts of distributed actors, both human and non-human.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    enabling a browsing session between a distributed actor and a web-browser;
    performing a code-driven replication of the browsing session for a third party, thus generating a replicated browsing session, performing the code-drive replication of the browsing session for the third party includes:
        defining one or more portions of a document object model associated with the browsing session to replicate to the replicated browsing session, thus defining one or more replicated portions of the document object model, wherein defining the one or more portions of the document object model associated with the browsing session to replicate to the replicated browsing session includes:
            tagging each node of the document object model with a unique identifier and a unique identifier associated with a parent node of the document object model as defined in a document object model tree for the document object model; and
            attaching a listener to the one or more replicated portions of the document object model that track changes of content in the document object model tree and send events corresponding to the changes;
        defining one or more portions of the document object model associated with the browsing session not to replicate to the replicated browsing session, thus defining one or more non-replicated portions of the document object model; and
        defining one or more permissible inputs for interacting with the one or more replicated portions of the document object model by limiting at least one input performed on the one or more replication portions of the document object model;
    rendering the replicated browsing session for the third party; and
    enabling the third party to interact with the one or more replicated portions of the document object model within the replicated browsing session, thus defining one or more third party interactions with the replicated browsing session, wherein enabling the third party to interact with the one or more replicated portions of the document object model within the replicated browsing session includes modifying a replicated document object model tree in real-time using the unique identifier of each node and the unique identifier associated with each parent node of the document object model.

2. The computer-implemented method of claim 1 wherein the browsing session is initiated by the distributed actor.

3. The computer-implemented method of claim 1 wherein the distributed actor is a human distributed actor.

4. The computer-implemented method of claim 1 wherein the distributed actor is a non-human distributed actor.

5. The computer-implemented method of claim 1 wherein performing a code-driven replication of the browsing session for a third party includes:
    copying at least a portion of the code associated with the browsing session to generate at least a portion of the replicated browsing session.

6. The computer-implemented method of claim 5 wherein the code associated with the browsing session includes at least a portion of the document object model associated with the browsing session.

7. The computer-implemented method of claim 5 wherein the code associated with the browsing session includes at least a portion of webpage structure associated with the browsing session.

8. The computer-implemented method of claim 1 wherein the third party is a human distributed actor.

9. The computer-implemented method of claim 1 wherein the third party is a non-human distributed actor.

10. The computer-implemented method of claim 1 further comprising:
    limiting the one or more third party interactions with the replicated browsing session.

11. The computer-implemented method of claim 1 further comprising:
    providing the one or more third party interactions with the replicated browsing session to the browsing session.

12. The computer-implemented method of claim 11 further comprising:
    managing the replicated browsing session by the distributed actor in response to receiving the one or more third party interactions with the replicated browsing session.

13. The computer-implemented method of claim 1 wherein the browsing session is an active browsing session.

14. A computer program product residing on a non-transitory computer readable medium having a plurality of instructions stored thereon which, when executed by a processor, cause the processor to perform operations comprising:

enabling a browsing session between a distributed actor and a web-browser;

performing a code-driven replication of the browsing session for a third party, thus generating a replicated browsing session, performing the code-drive replication of the browsing session for the third party includes:

defining one or more portions of a document object model associated with the browsing session to replicate to the replicated browsing session, thus defining one or more replicated portions of the document object model, wherein defining the one or more portions of the document object model associated with the browsing session to replicate to the replicated browsing session includes:

tagging each node of the document object model with a unique identifier and a unique identifier associated with a parent node of the document object model as defined in a document object model tree for the document object model; and attaching a listener to the one or more replicated portions of the document object model that track changes of content in the document object model tree and send events corresponding to the changes;

defining one or more portions of the document object model associated with the browsing session not to replicate to the replicated browsing session, thus defining one or more non-replicated portions of the document object model; and defining one or more permissible inputs for interacting with the one or more replicated portions of the document object model by limiting at least one input performed on the one or more replication portions of the document object model;

rendering the replicated browsing session for the third party; and enabling the third party to interact with the one or more replicated portions of the document object model within the replicated browsing session, thus defining one or more third party interactions with the replicated browsing session, wherein enabling the third party to interact with the one or more replicated portions of the document object model within the replicated browsing session includes modifying a replicated document object model tree in real-time using the unique identifier of each node and the unique identifier associated with each parent node of the document object model.

15. The computer program product of claim 14 wherein the browsing session is initiated by the distributed actor.

16. The computer program product of claim 14 wherein the distributed actor is a human distributed actor.

17. The computer program product of claim 14 wherein the distributed actor is a non-human distributed actor.

18. The computer program product of claim 14 wherein performing a code-driven replication of the browsing session for a third party includes:

copying at least a portion of the code associated with the browsing session to generate at least a portion of the replicated browsing session.

19. The computer program product of claim 18 wherein the code associated with the browsing session includes at least a portion of the document object model associated with the browsing session.

20. The computer program product of claim 18 wherein the code associated with the browsing session includes at least a portion of webpage structure associated with the browsing session.

21. The computer program product of claim 14 wherein the third party is a human distributed actor.

22. The computer program product of claim 14 wherein the third party is a non-human distributed actor.

23. The computer program product of claim 14 further comprising:

limiting the one or more third party interactions with the replicated browsing session.

24. The computer program product of claim 15 further comprising:

providing the one or more third party interactions with the replicated browsing session to the browsing session.

25. The computer program product of claim 24 further comprising:

managing the replicated browsing session by the distributed actor in response to receiving the one or more third party interactions with the replicated browsing session.

26. The computer program product of claim 14 wherein the browsing session is an active browsing session.

27. A computing system including a processor and memory configured to perform operations comprising:

enabling a browsing session between a distributed actor and a web-browser;

performing a code-driven replication of the browsing session for a third party, thus generating a replicated browsing session, performing the code-drive replication of the browsing session for the third party includes:

defining one or more portions of a document object model associated with the browsing session to replicate to the replicated browsing session, thus defining one or more replicated portions of the document object model, wherein defining the one or more portions of the document object model associated with the browsing session to replicate to the replicated browsing session includes:

tagging each node of the document object model with a unique identifier and a unique identifier associated with a parent node of the document object model as defined in a document object model tree for the document object model; and attaching a listener to the one or more replicated portions of the document object model that track changes of content in the document object model tree and send events corresponding to the changes;

defining one or more portions of the document object model associated with the browsing session not to replicate to the replicated browsing session, thus defining one or more non-replicated portions of the document object model; and defining one or more permissible inputs for interacting with the one or more replicated portions of the document object model by limiting at least one input performed on the one or more replication portions of the document object model;

rendering the replicated browsing session for the third party;

enabling the third party to interact with the one or more replicated portions of the document object model within the replicated browsing session, thus defining one or more third party interactions with the replicated browsing session, wherein enabling the third party to interact with the one or more replicated portions of the document object model within the replicated browsing session includes modifying a replicated document object model tree in real-time using the unique identifier of each node and the unique identifier associated with each parent node of the document object model.

28. The computing system of claim 27 wherein the browsing session is initiated by the distributed actor.

* * * * *